(12) United States Patent
Yi et al.

(10) Patent No.: US 12,389,417 B2
(45) Date of Patent: Aug. 12, 2025

(54) PREEMPTION INDICATION WITH MULTI-BEAM

(71) Applicant: Ofinno, LLC, Reston, VA (US)

(72) Inventors: Yunjung Yi, Vienna, VA (US); Kai Xu, Great Falls, VA (US); Esmael Hejazi Dinan, McLean, VA (US); Hua Zhou, Vienna, VA (US); Bing Hui, Herndon, VA (US); Hyukjin Chae, San Diego, CA (US)

(73) Assignee: Ofinno, LLC, Reston, VA (US)

( * ) Notice: Subject to any disclaimer, the term of this patent is extended or adjusted under 35 U.S.C. 154(b) by 330 days.

(21) Appl. No.: 17/882,320

(22) Filed: Aug. 5, 2022

(65) Prior Publication Data
US 2022/0386355 A1 Dec. 1, 2022

Related U.S. Application Data

(63) Continuation of application No. PCT/US2021/017070, filed on Feb. 8, 2021.

(60) Provisional application No. 62/970,959, filed on Feb. 6, 2020.

(51) Int. Cl.
*H04W 72/23* (2023.01)
*H04L 5/00* (2006.01)

(52) U.S. Cl.
CPC .......... *H04W 72/23* (2023.01); *H04L 5/0053* (2013.01)

(58) Field of Classification Search
None
See application file for complete search history.

(56) References Cited

U.S. PATENT DOCUMENTS

| | | | |
|---|---|---|---|
| 2019/0098649 A1 | 3/2019 | Baghel et al. | |
| 2019/0306700 A1* | 10/2019 | Lin | H04W 72/23 |
| 2019/0363843 A1* | 11/2019 | Gordaychik | H04W 72/044 |
| 2022/0159629 A1* | 5/2022 | Sengupta | H04L 5/0053 |
| 2022/0183039 A1* | 6/2022 | Matsumura | H04W 16/28 |

FOREIGN PATENT DOCUMENTS

| | | |
|---|---|---|
| EP | 3547783 A1 | 10/2019 |
| KR | 20190107141 A | 9/2019 |

OTHER PUBLICATIONS

3GPP TS 38.212 V16.0.0 (Dec. 2019); Technical Specification; 3rd Generation Partnership Project; Technical Specification Group Radio Access Network; NR; Multiplexing and channel coding; (Release 16).

(Continued)

*Primary Examiner* — Clemence S Han
(74) *Attorney, Agent, or Firm* — Patrick Moon; Kavon Nasabzadeh; Jacob L. Mangan

(57) ABSTRACT

A wireless device receives one or more radio resource control (RRC) messages that indicate uplink transmission configuration indicator (TCI) states associated with cancellation indications (CIs). The wireless device receives a first DCI scheduling a transmission via uplink resources and indicating a first uplink TCI state. The wireless device receives a second DCI that includes a cancellation indication (CI) indicating cancellation resources that overlaps with the uplink resources. The wireless device drops the transmission via the uplink resources in response to the uplink TCI states including the first uplink TCI state of the transmission.

20 Claims, 31 Drawing Sheets

(56) References Cited

OTHER PUBLICATIONS

3GPP TS 38.213 V15.7.0 (Sep. 2019); Technical Specification; 3rd Generation Partnership Project; Technical Specification Group Radio Access Network; NR; Physical layer procedures for control; (Release 15).
3GPP TS 38.214 V16.0.0 (Dec. 2019); Technical Specification; 3rd Generation Partnership Project; Technical Specification Group Radio Access Network; NR; Physical layer procedures for data; (Release 16).
3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).
3GPP TS 38.331 V15.8.0 (Dec. 2019); Technical Specification; 3rd Generation Partnership Project; Technical Specification Group Radio Access Network; NR; Radio Resource Control (RRC) protocol specification; (Release 15).
International Search Report and Written Opinion of the International Searching Authority mailed Apr. 20, 2021, in International Application No. PCT/US2021/017070.

\* cited by examiner

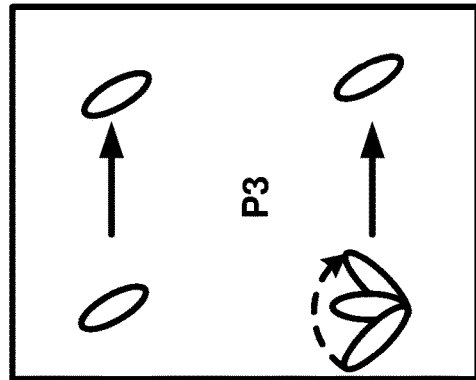
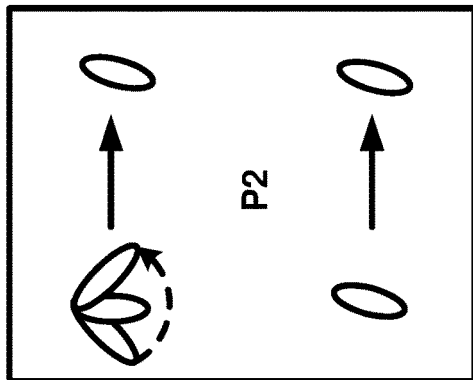
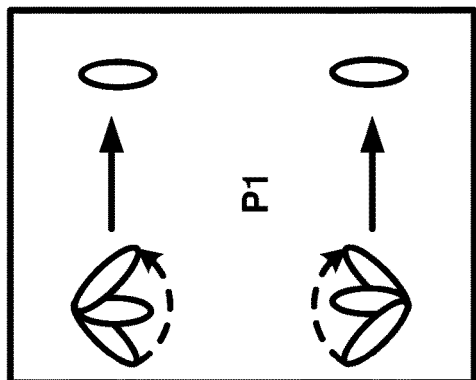
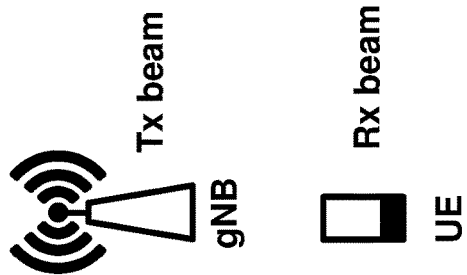
FIG. 12A
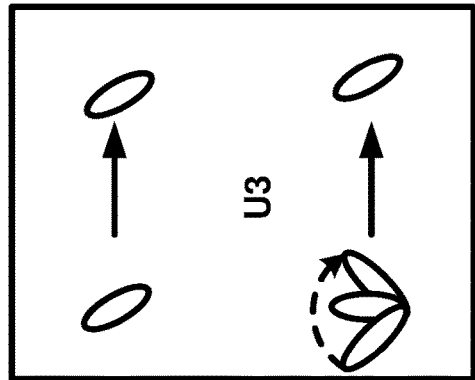
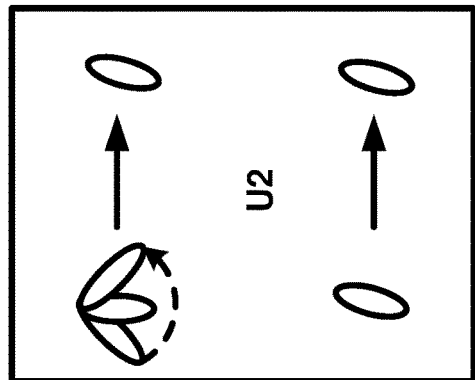
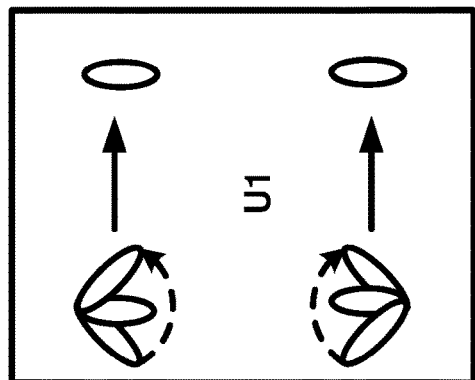
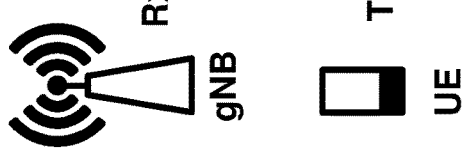
FIG. 12B

PREEMPTION INDICATION WITH MULTI-BEAM

CROSS-REFERENCE TO RELATED APPLICATIONS

This application is a continuation of International Application No. PCT/US2021/017070, filed Feb. 8, 2021, which claims the benefit of U.S. Provisional Application No. 62/970,959, filed Feb. 6, 2020, all of which are hereby incorporated by reference in their entireties.

BRIEF DESCRIPTION OF THE DRAWINGS

Examples of several of the various embodiments of the present disclosure are described herein with reference to the drawings.

FIG. 12A and FIG. 12B respectively illustrate examples of three downlink and uplink beam management procedures.

DETAILED DESCRIPTION

Figure 1A:
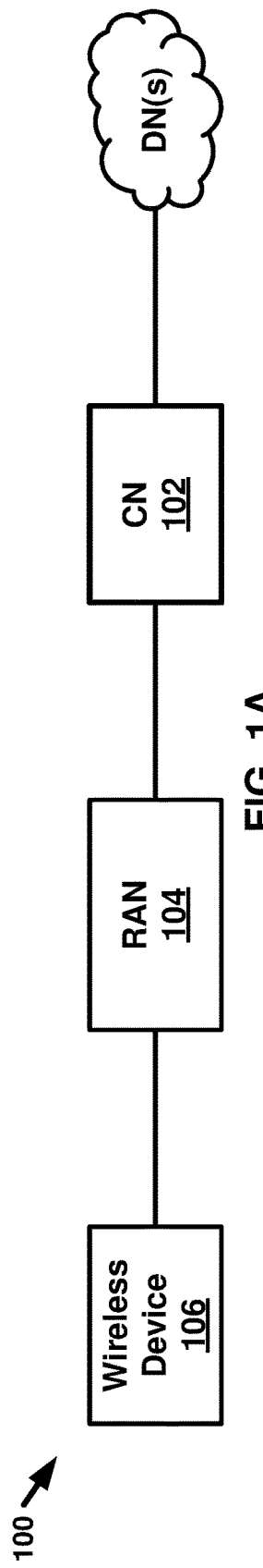
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as described. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is used or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
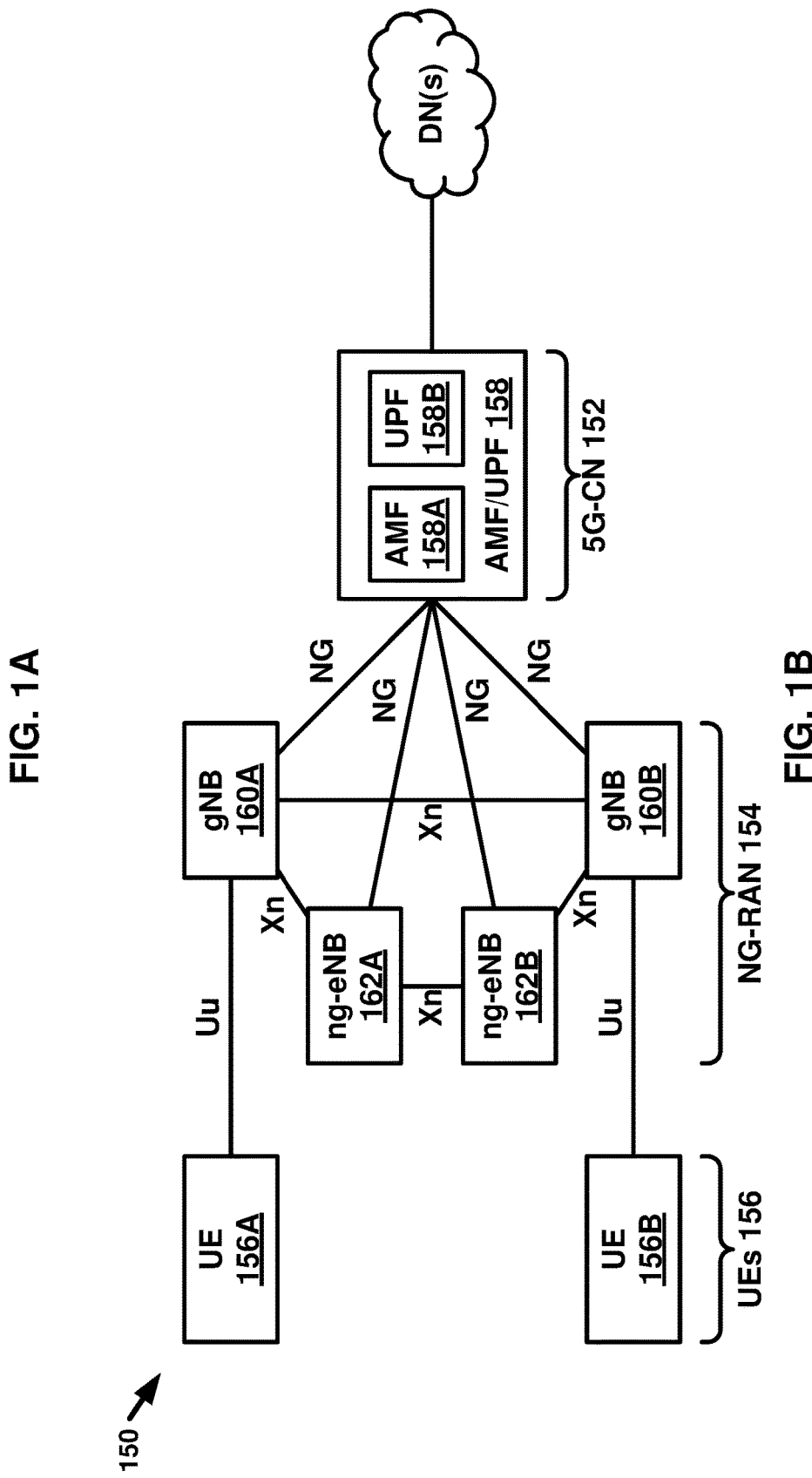

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNB s, illustrated as gNB 160A and gNB 160B (collectively gNBs 160) and/or one or more ng-eNB s, illustrated as ng-eNB 162A and ng-eNB 162B (collectively ng-eNB s 162). The gNBs 160 and ng-eNBs 162 may be more generically referred to as base stations. The gNBs 160 and ng-eNB s 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
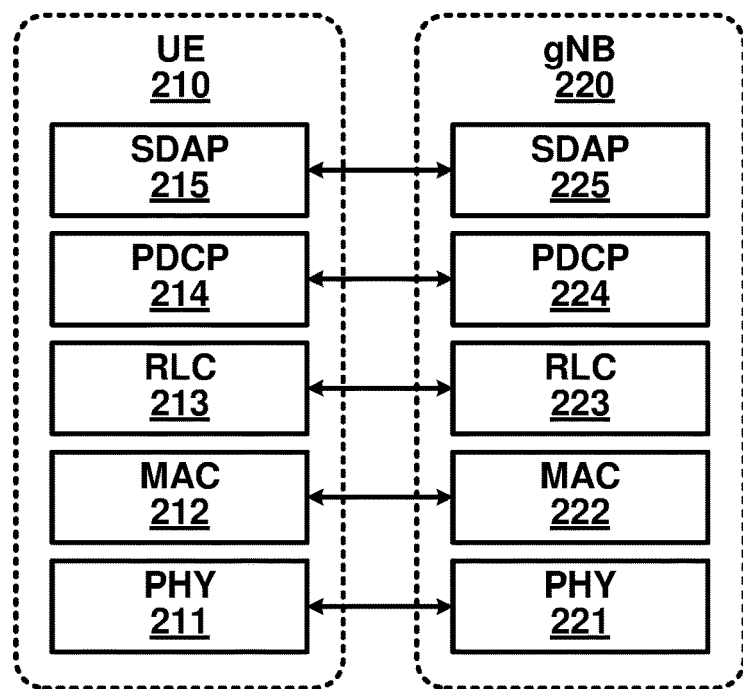
FIG. 2A and FIG. 2B respectively illustrate a New Radio (NR) user plane and control plane protocol stack.
Figure 2B:
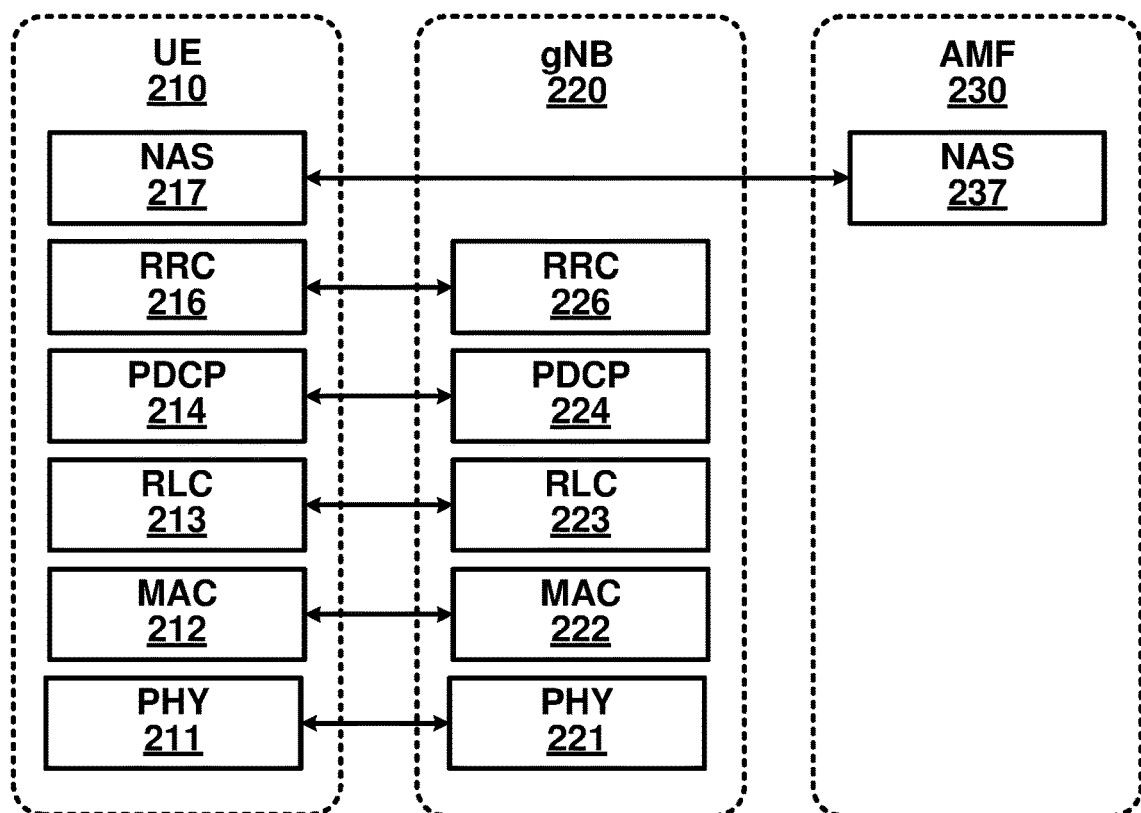

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
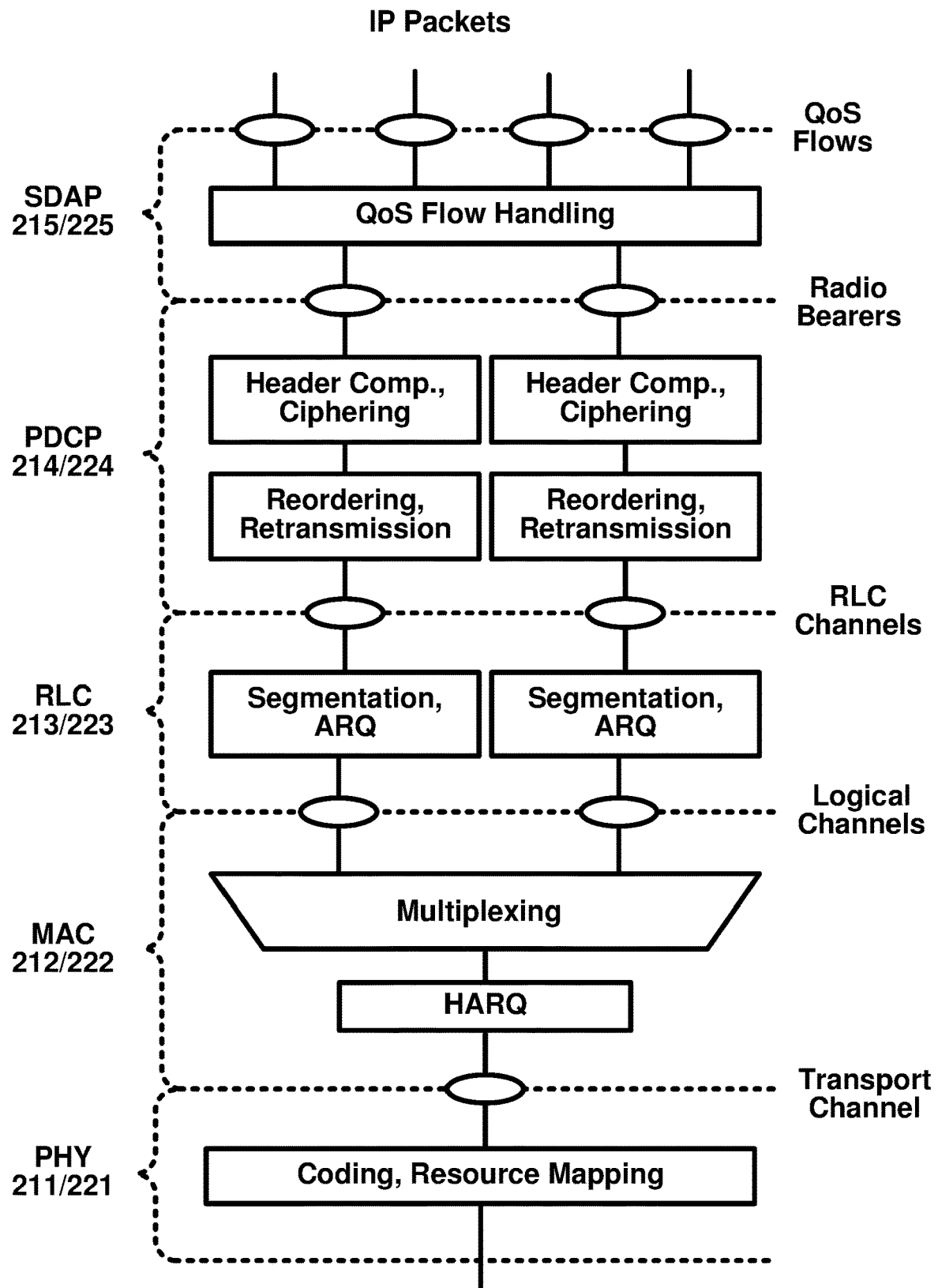
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS constraints (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that is transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services configured for high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
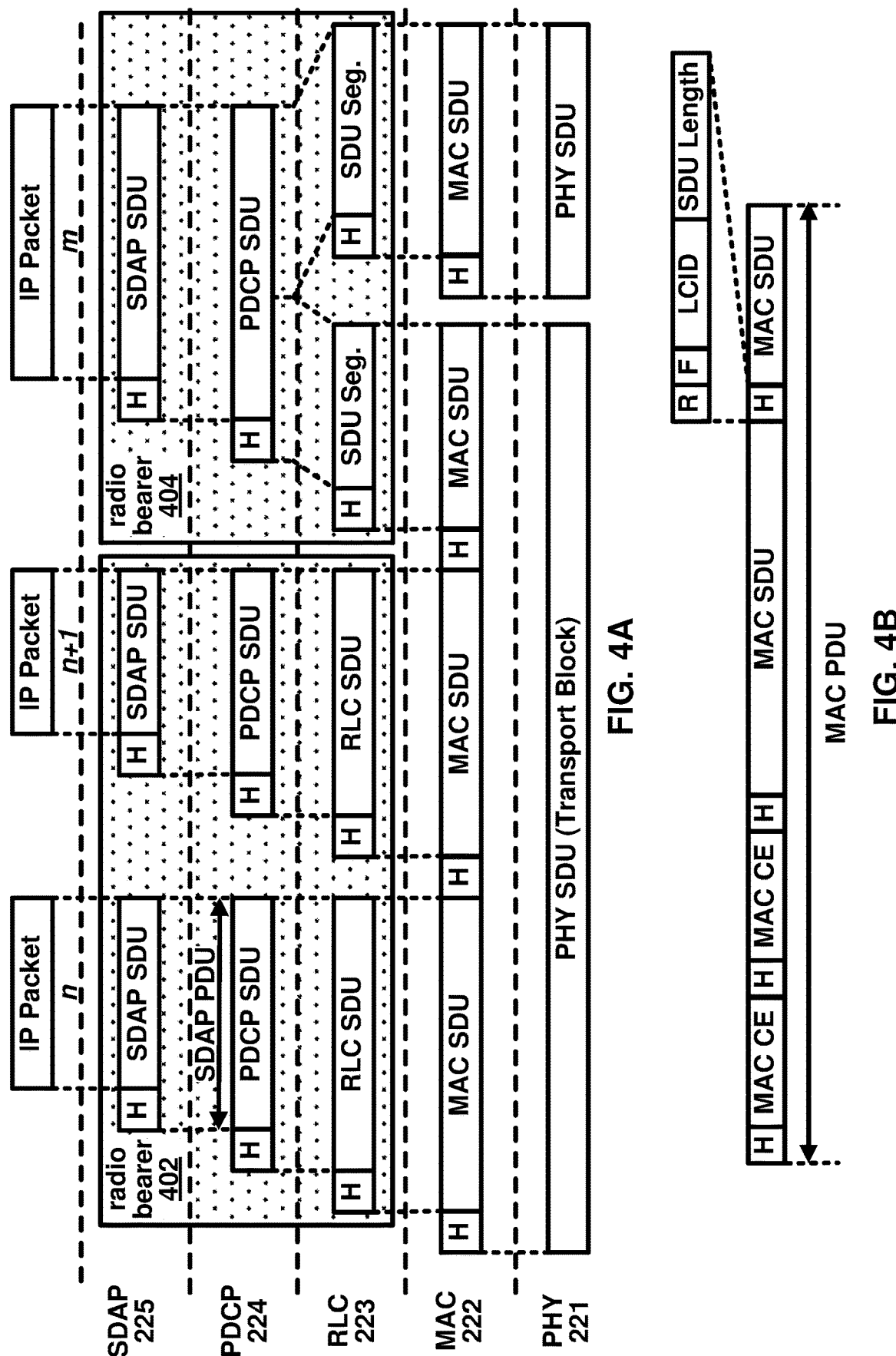
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
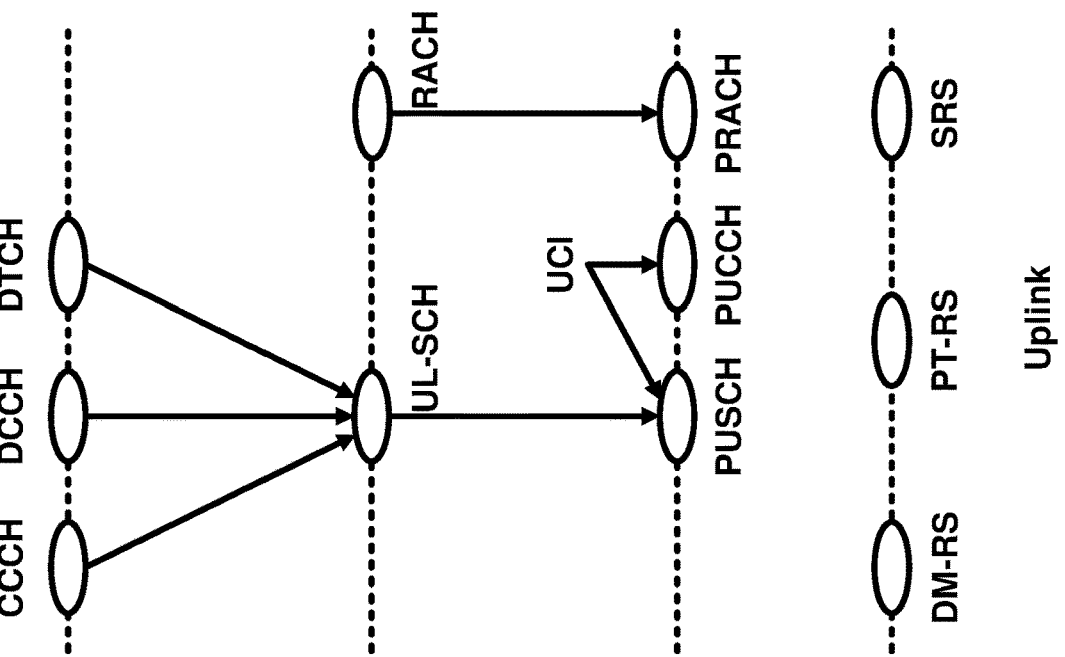
FIG. 5A and FIG. 5B respectively illustrate a mapping between logical channels, transport channels, and physical channels for the downlink and uplink.
Figure 5A:
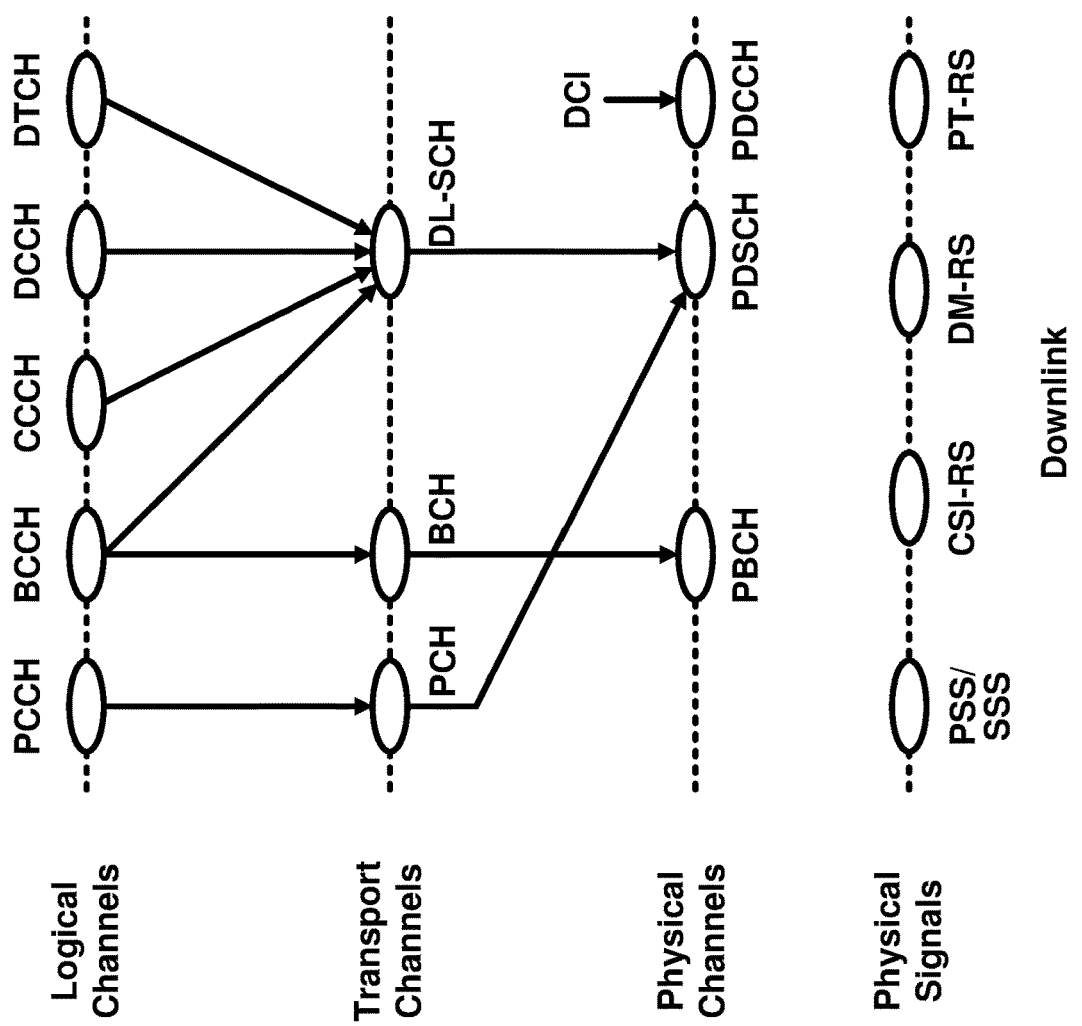

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
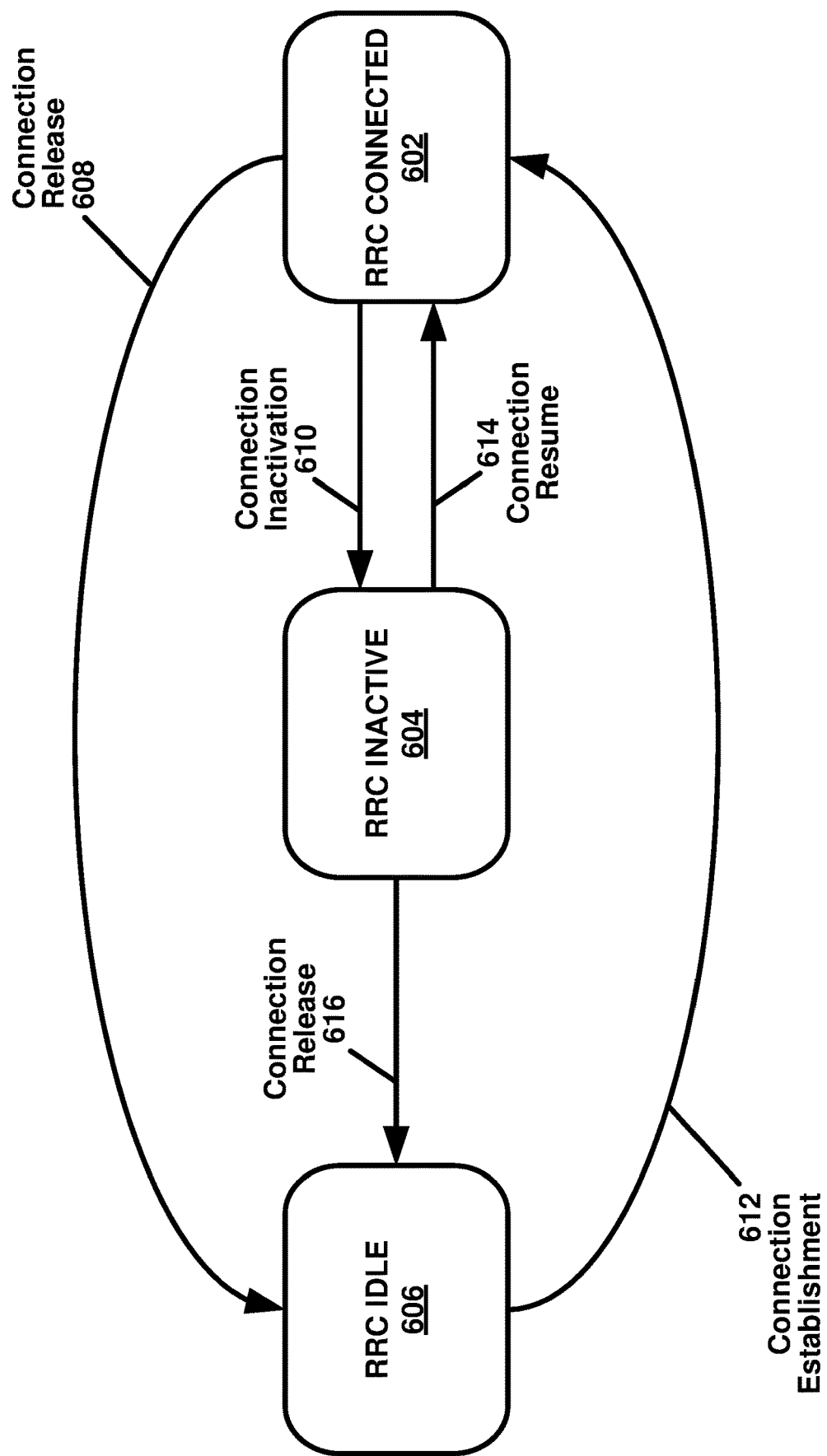
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNB s 160 or ng-eNB s 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
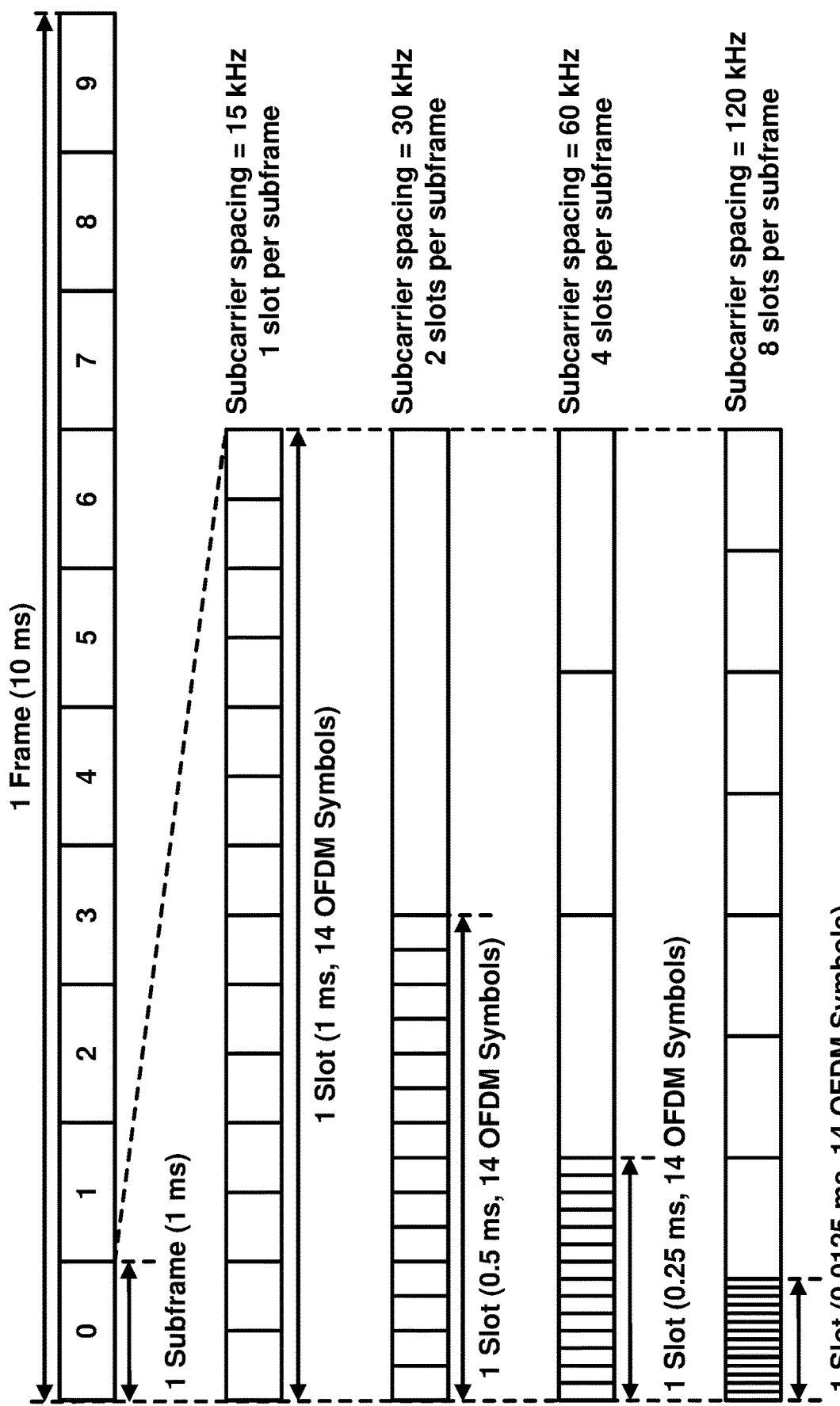
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols used for a transmission. These partial slot transmissions may be referred to as mini-slot or subslot transmissions.

Figure 8:
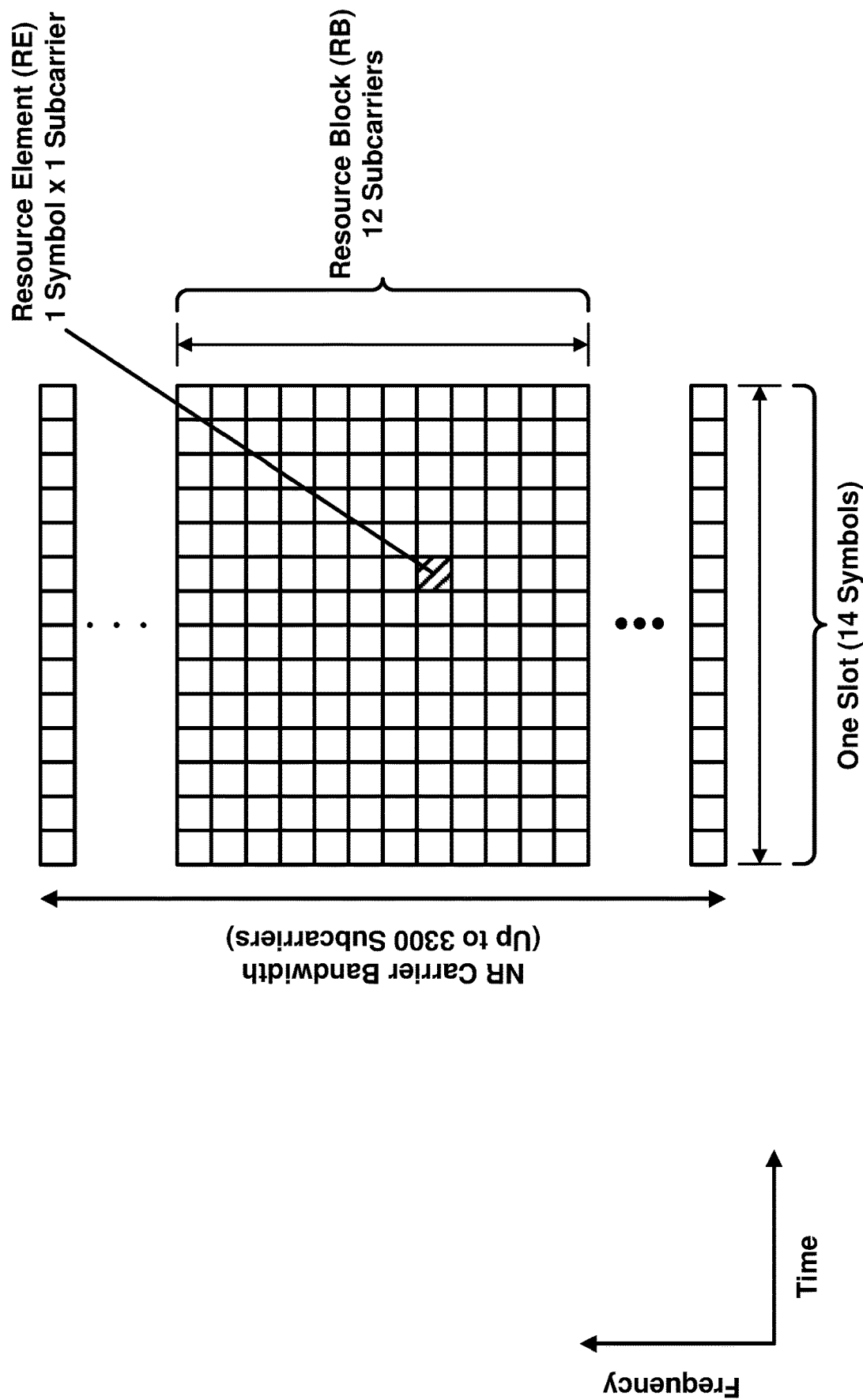
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
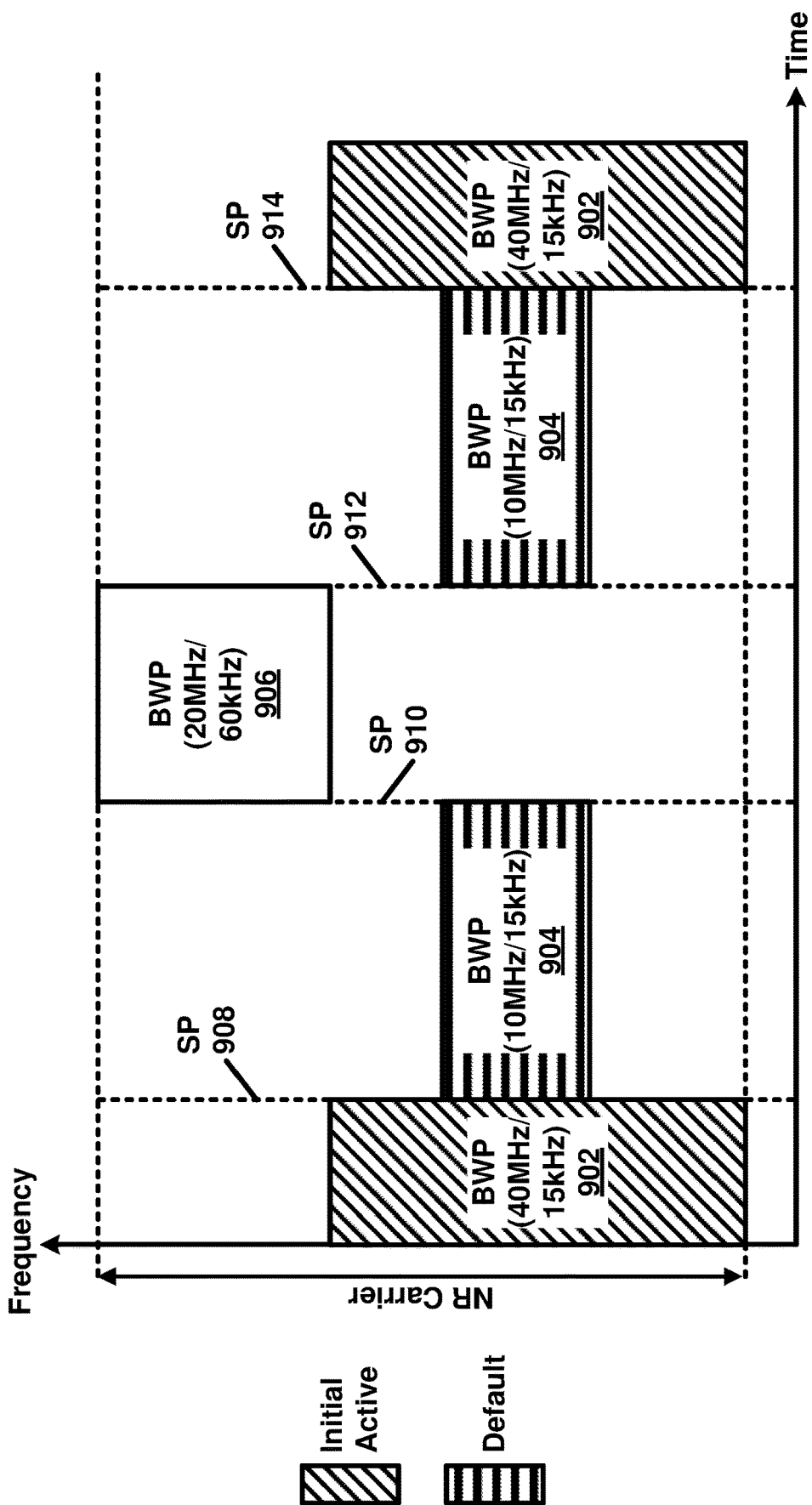
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
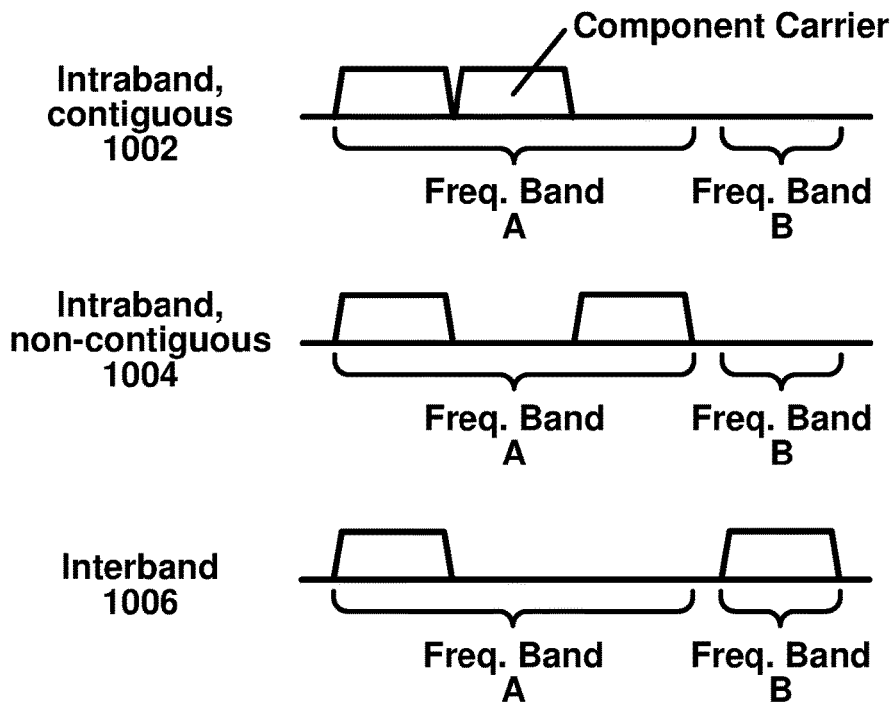
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
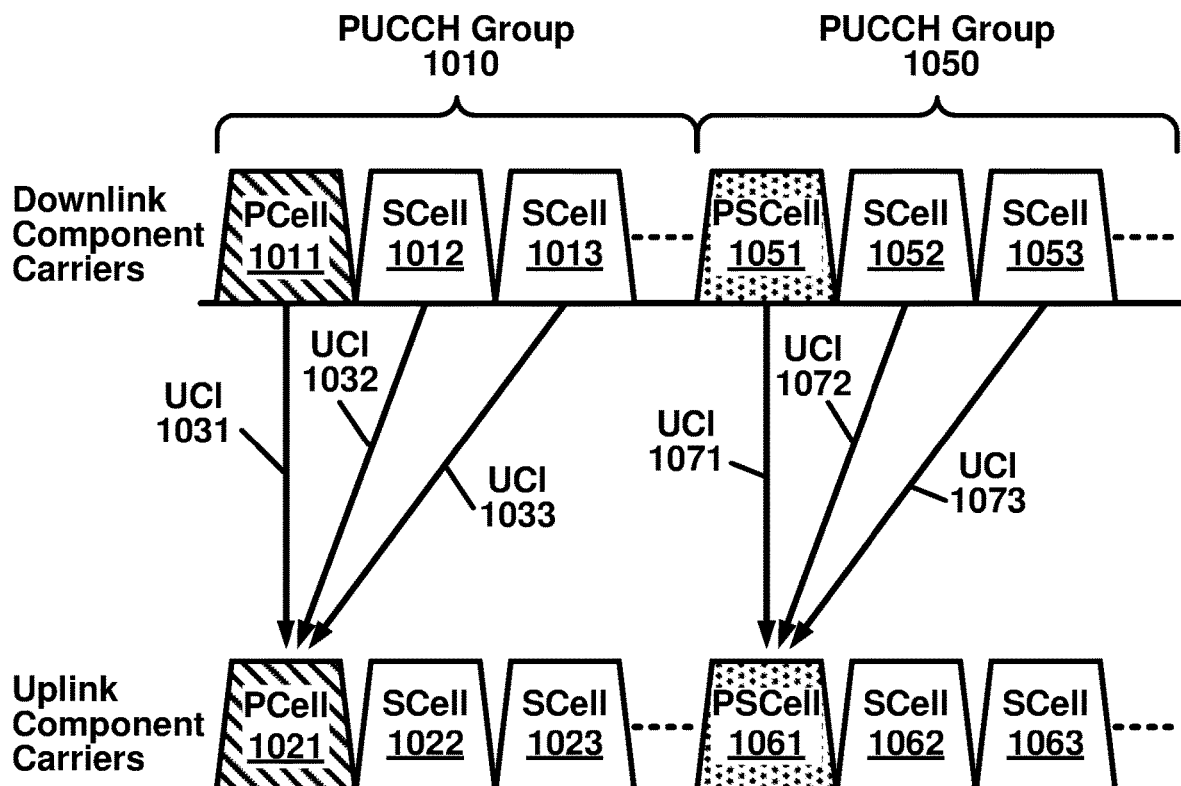
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell 1011, an Scell 1012, and an Scell 1013. The PUCCH group 1050 includes three downlink CCs in the present example: a Pcell 1051, an Scell 1052, and an Scell 1053. One or more uplink CCs may be configured as a Pcell 1021, an Scell 1022, and an Scell 1023. One or more other uplink CCs may be configured as a primary Scell (PScell) 1061, an Scell 1062, and an Scell 1063. Uplink control information (UCI) related to the downlink CCs of the PUCCH group 1010, shown as UCI 1031, UCI 1032, and UCI 1033, may be transmitted in the uplink of the Pcell 1021. Uplink control information (UCI) related to the downlink CCs of the PUCCH group 1050, shown as UCI 1071, UCI 1072, and UCI 1073, may be transmitted in the uplink of the PScell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell 1021 and the PScell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
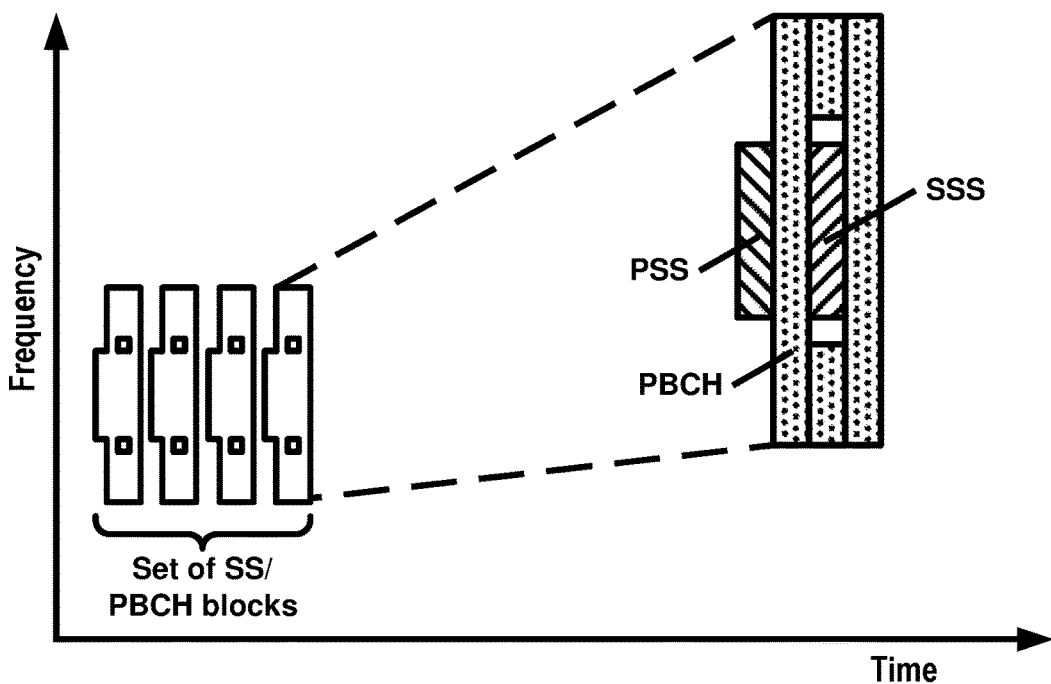
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information used by the UE to access the cell. The UE may use one or more parameters of the MIB to monitor PDCCH, which may be used to schedule PDSCH. The PDSCH may include the SIB 1. The SIB1 may be decoded using parameters provided in the MIB. The PBCH may indicate an absence of SIB 1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may use beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
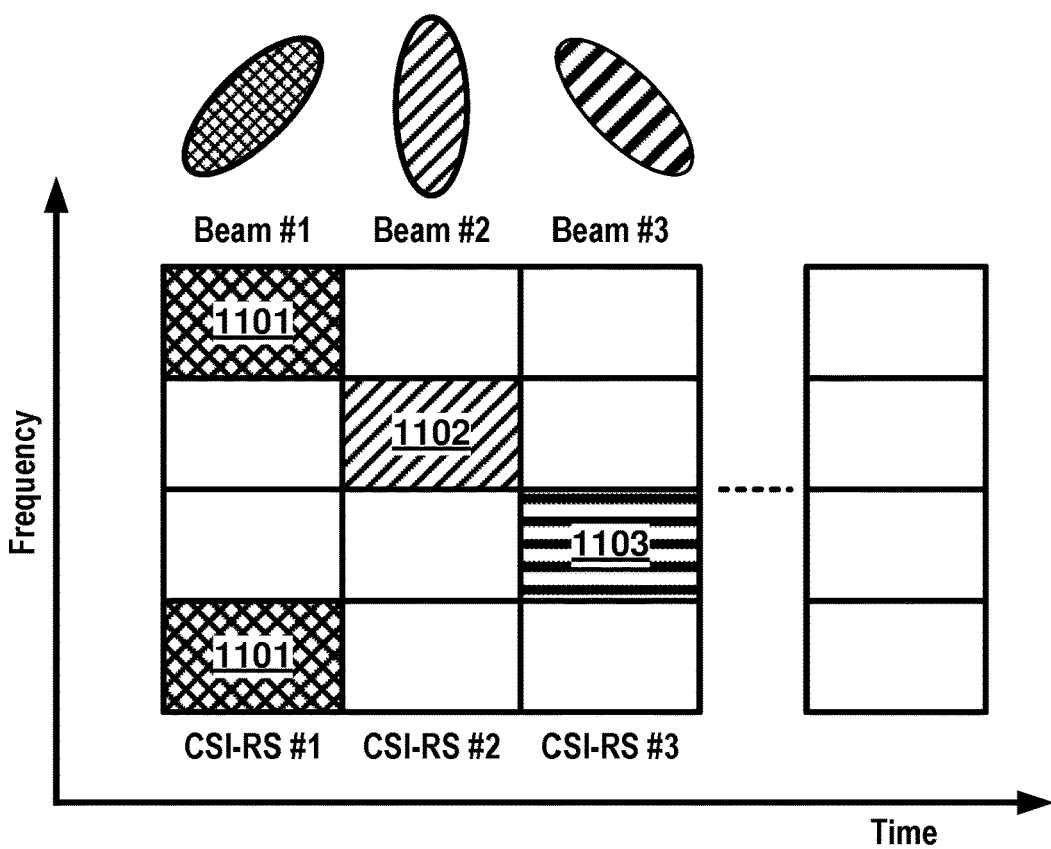
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
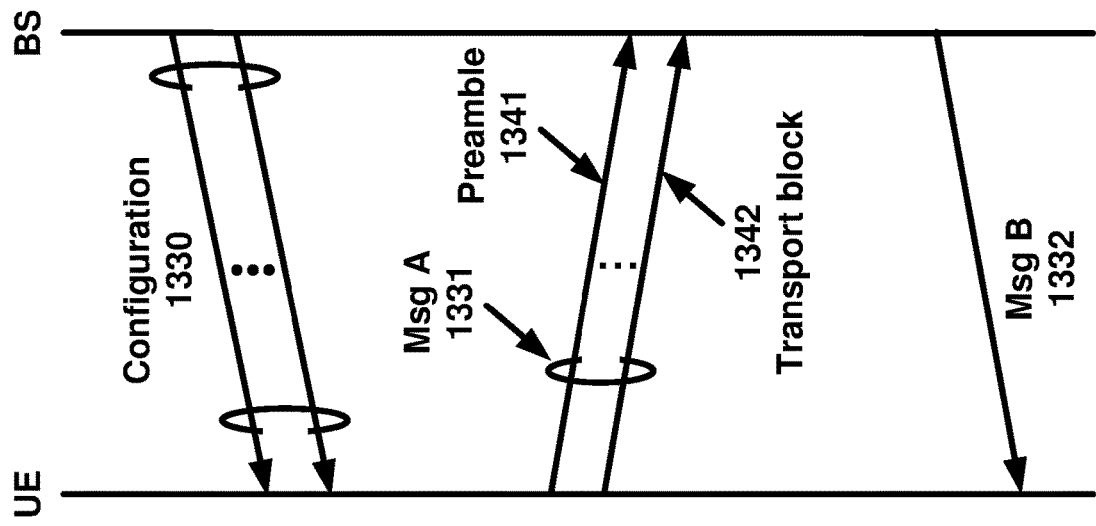
FIG. 13A, FIG. 13B, and FIG. 13C respectively illustrate a four-step contention-based random access procedure, a two-step contention-free random access procedure, and another two-step random access procedure.
Figure 13B:
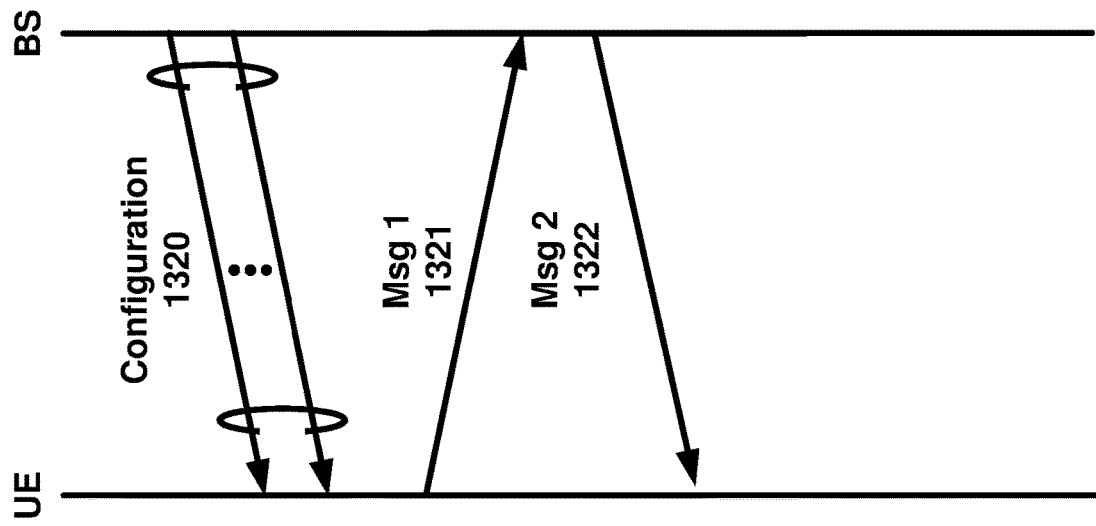
Figure 13A:
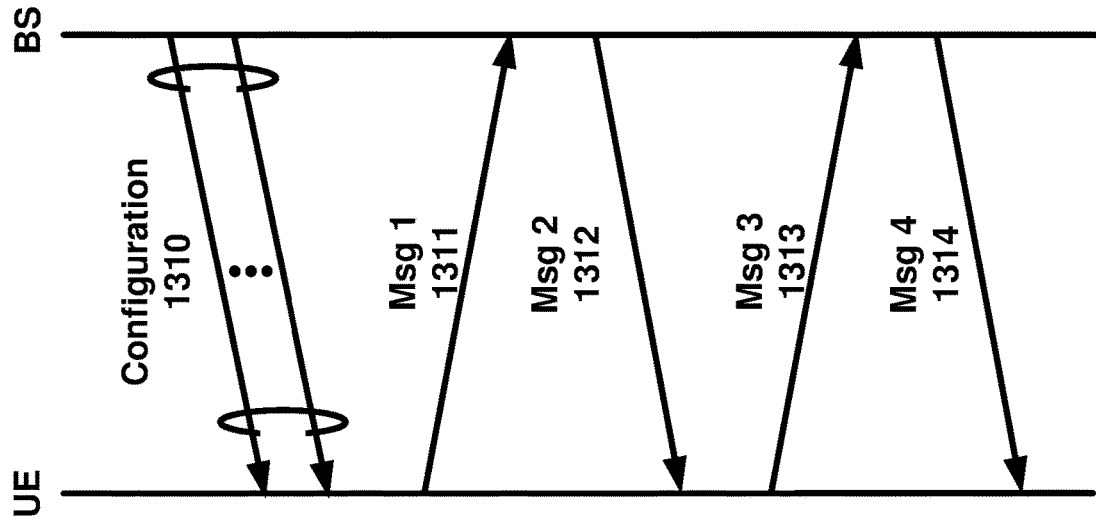

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
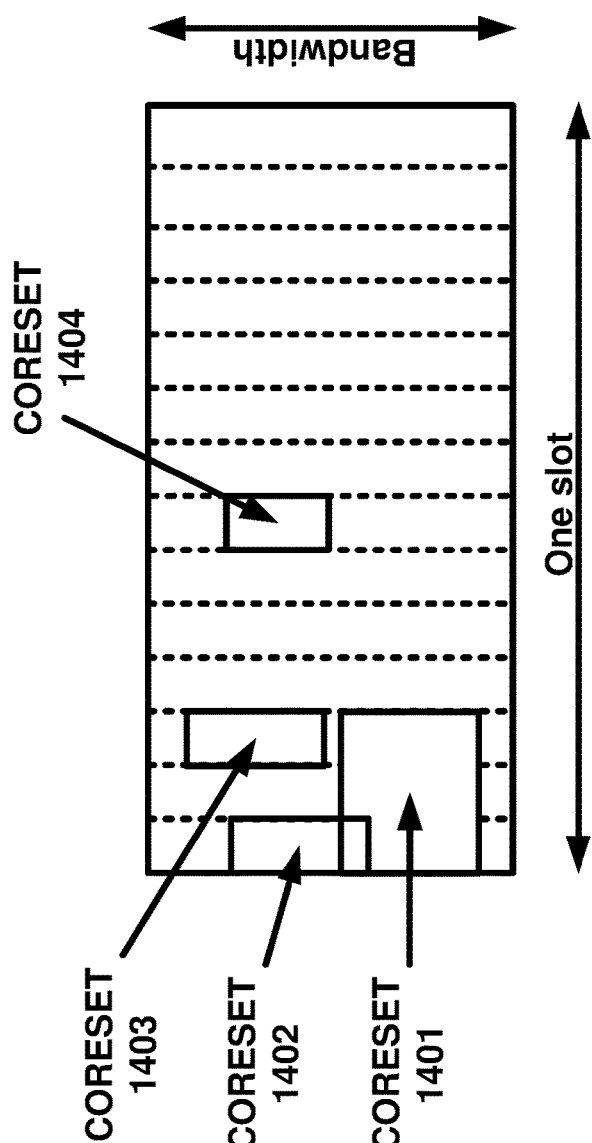
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
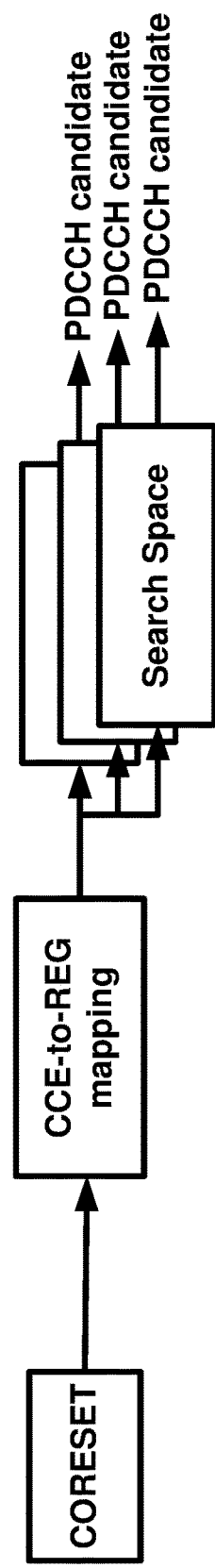
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
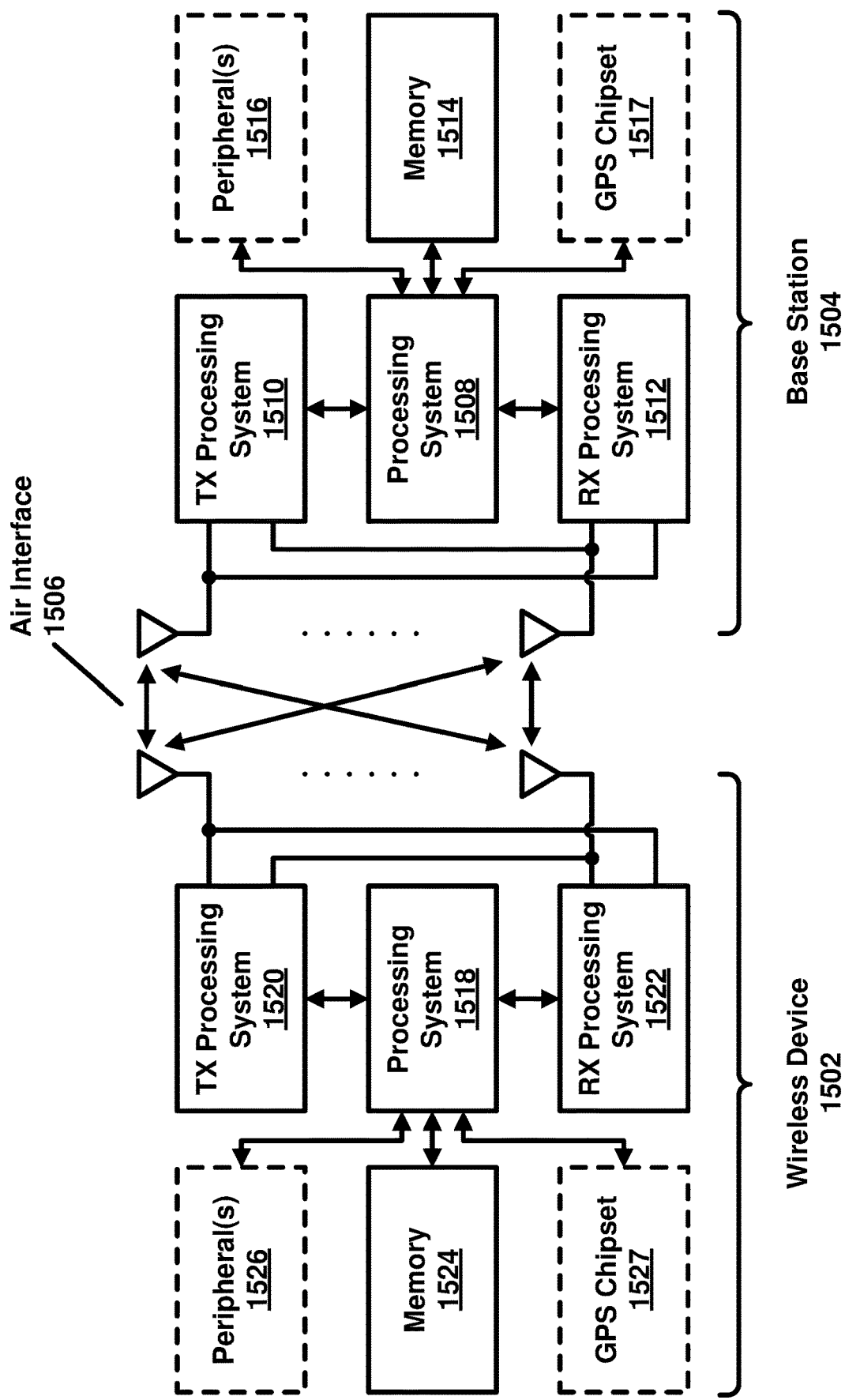
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
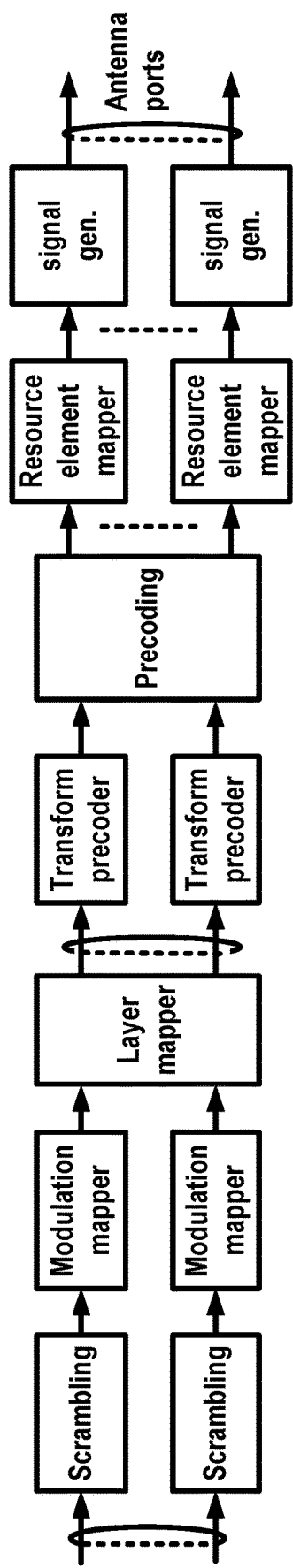
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16D:
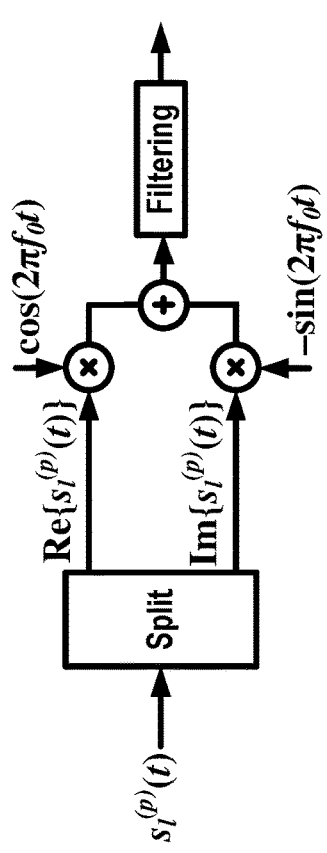
Figure 16B:
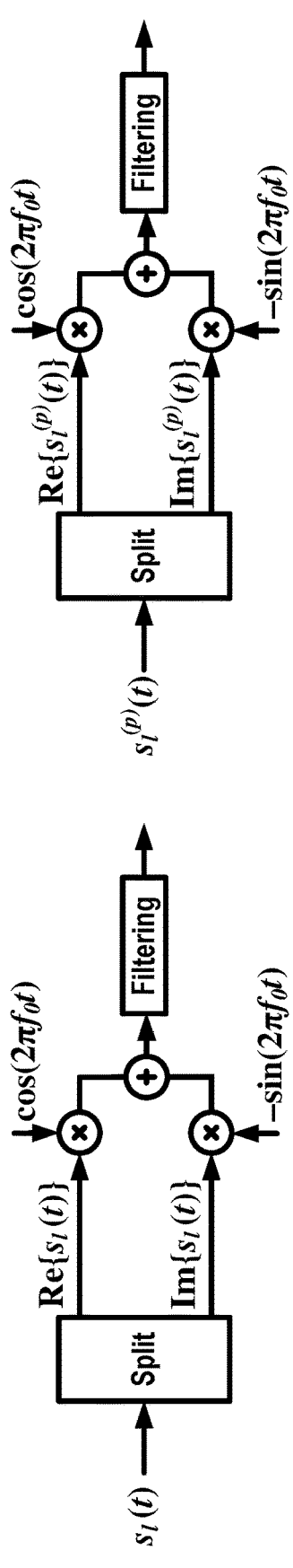

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
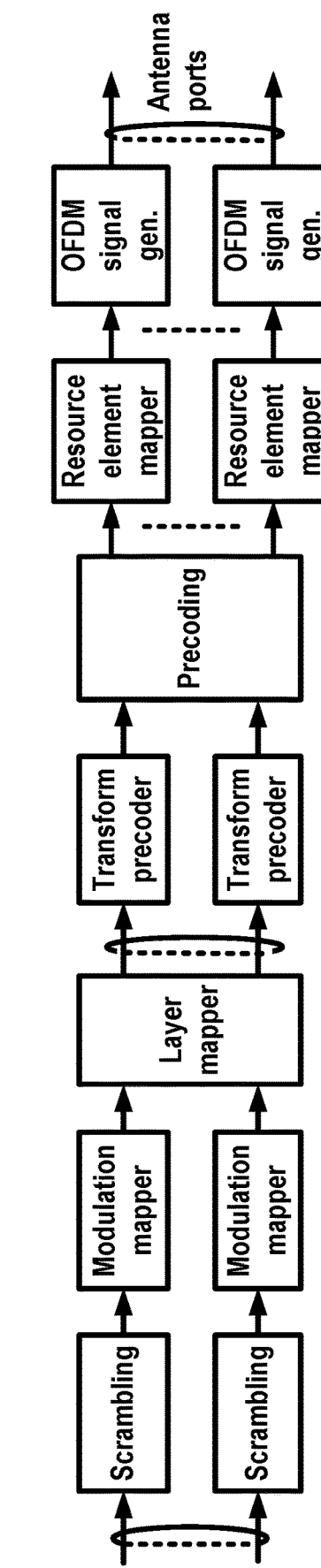

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
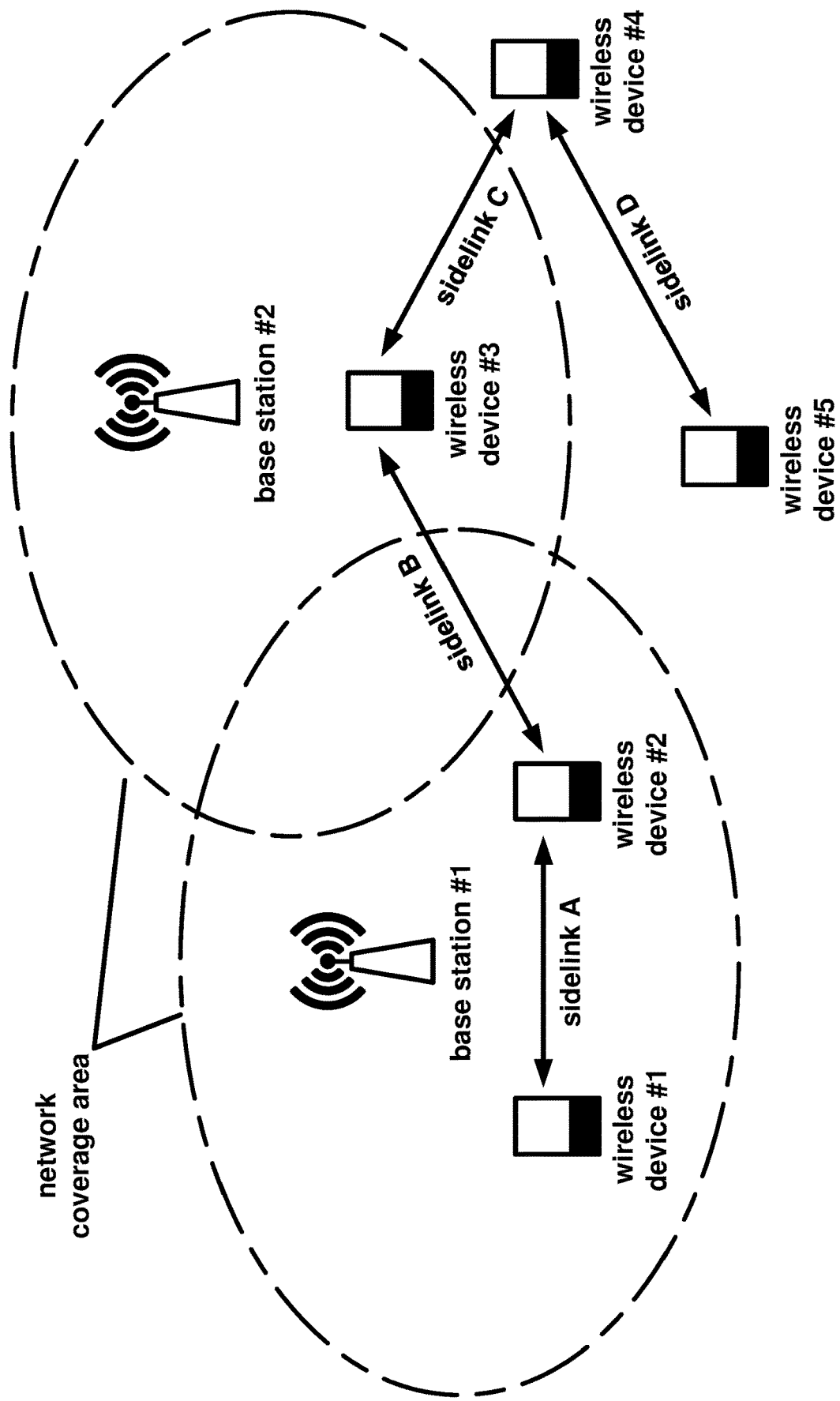
FIG. 17 illustrates an example of sidelink operation scenarios.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the figure, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
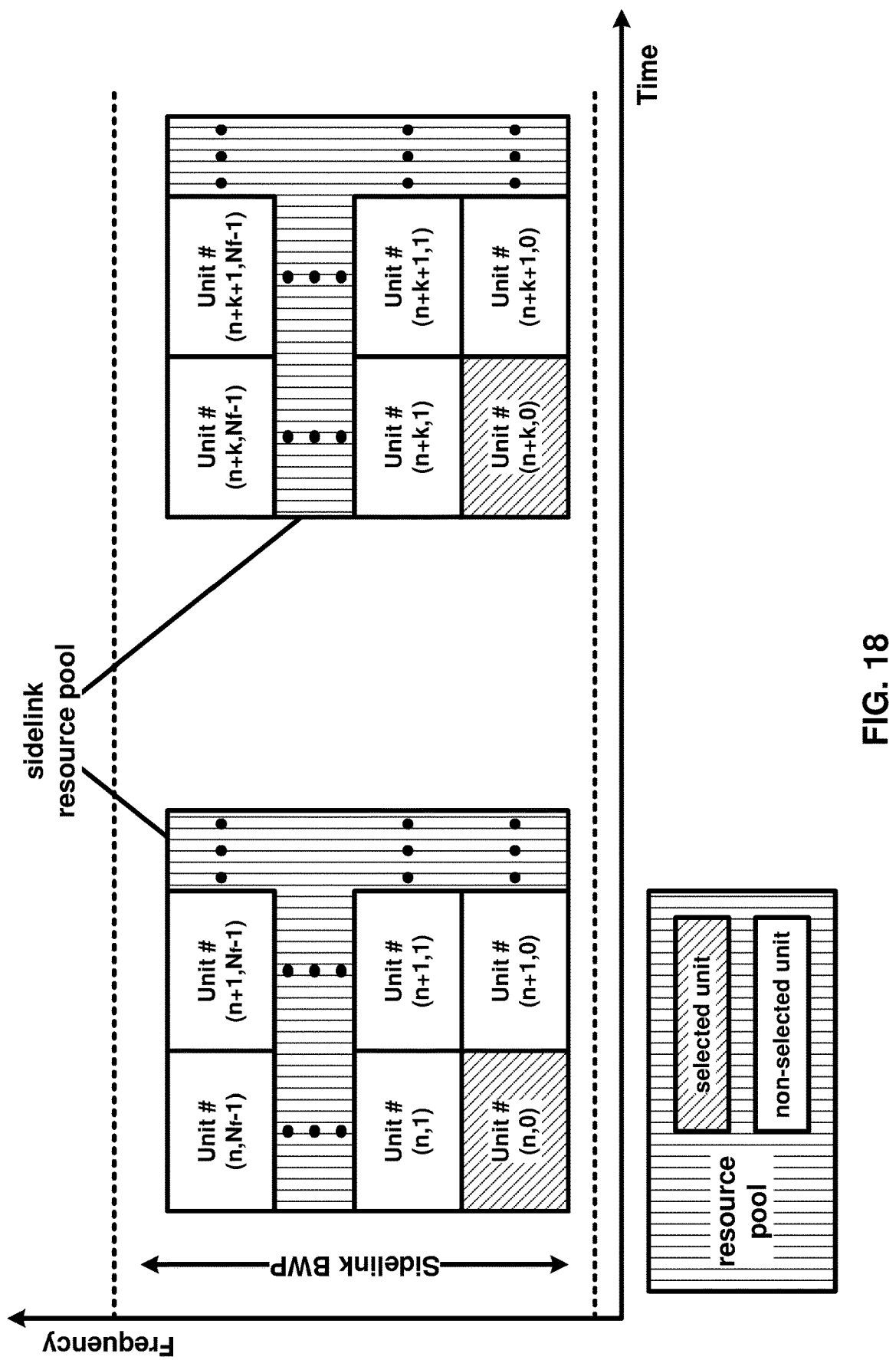
FIG. 18 illustrates an example of sidelink resource allocation.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n−k,0), then the wireless device may select resource unit (n,0), resource (n+k,0), etc. For example, if a sidelink transmission from another wireless device is detected in resource unit (n−k,1), then the wireless device may avoid selection of resource unit (n,1), resource (n+k,1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic may use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

In an example, a wireless system (e.g., 4G or 5G) may support multiple types of services, where different UEs may transmit different data packets for the different services. The multiple types of services may comprise at least one of: an ultra-reliable low-latency communication (URLLC); an enhanced mobile broadband service (eMBB); a machine type communication (MTC); and a vehicle to vehicle (or vehicle to everything) communication (V2X). In an example, a first data packet (e.g., a URLLC data packet) of a first wireless device may be multiplexed with a second data packet (e.g., a V2X data packet) of a second wireless device on one or more resources of an uplink cell (and/or a downlink cell). In an example, the first data packet may be transmitted with a first transmission format (e.g., a first numerology or a first scheduling granularity) on a first data channel (e.g., PUSCH) resource to a first target wireless device (e.g., a base station). In an example, the second data packet may be transmitted with a second transmission format (e.g., a second numerology or a second scheduling granularity) on a second data channel (e.g., PSSCH) resource to a second target wireless device (e.g., a third wireless device). In an example, time and frequency resources for the first data channel may partially or fully overlap with time and frequency resources for the second data channel. In an example, the time and frequency resources for the second data channel may be configured via a configured grant configuration and/or indicated via a dynamic scheduling DCI (e.g., a sidelink DCI comprising resource assignments for one or more sidelink transmissions, a uplink grant, a downlink scheduling DCI, etc.). For example, depending on priorities and/or quality of service constraints and/or potential performance degradations/impact from dropping of the first data channel and the second data channel, the first wireless device and the second wireless device may determine whether to continue transmission or drop the data channel respectively.

For example, the first data packet is used (or at least preferred) to be transmitted with a lower latency than the second data packet (e.g., given the respective service types associated with the first and second data packets), the first wireless device is indicated/configured/expected to transmit the first data packet whereas the second wireless device may be indicated/configured/expected to drop or partially drop the second data packet. Without knowing each other's transmission, the second wireless device may not be able to determine whether the second data packet is to be preempted or not. Simultaneous transmission from the first wireless device and the second wireless device may degrade reception performance at the first destination wireless device and the second wireless device due to interferences. To address this problem, a base station may transmit a DCI comprising fields indicating one or more uplink pre-emption indications/cancellation indications to a wireless device (e.g., the second wireless device) or a group of wireless devices (e.g., including the second wireless device), indicating whether one or more time/frequency resources are pre-empted (e.g., reserved for the first wireless device) or not.

Figure 19:
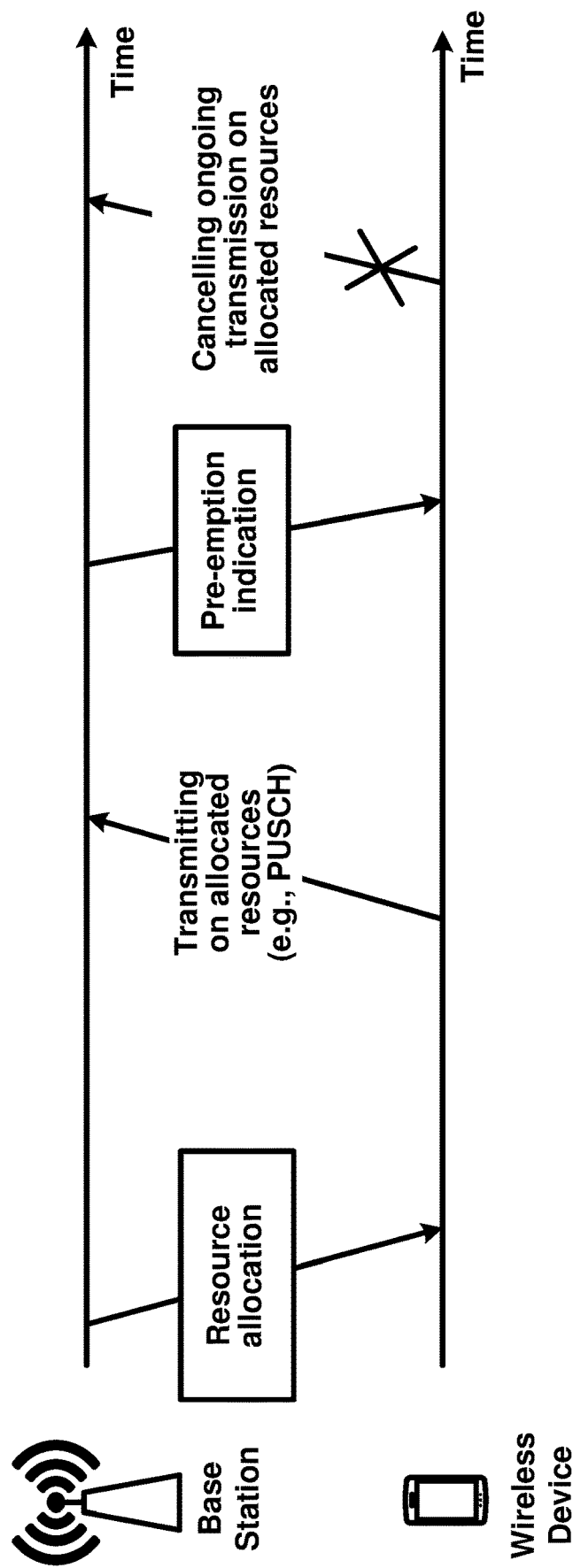
FIG. 19 illustrates an example of embodiments.

FIG. 19 shows an example of uplink pre-emption/cancellation mechanism. In an example, a base station (e.g., gNB in FIG. 19) may transmit to a wireless device (e.g., UE in FIG. 19), a first DCI comprising a first uplink grant. The uplink grant may comprise PUSCH resources. In response to the first DCI, the UE may start transmitting a TB on the first uplink grant. As shown in FIG. 19, the UE may receive an uplink pre-emption indication/cancellation indication from the base station. The uplink pre-emption indication/cancellation indication may comprise a cancellation indication, a stop indication, or a suspending indication. The uplink pre-emption indication/cancellation indication may indicate that at least a part of the PUSCH resources is pre-empted, or the wireless device may stop uplink transmission on the at least part of the PUSCH resources. As shown in FIG. 19, in response to the uplink pre-emption indication/cancellation indication, the wireless device may stop the ongoing uplink transmission on the at least part of the PUSCH resources, wherein the at least part of the PUSCH resources are pre-empted based on the uplink pre-emption indication/cancellation indication. In an example, the base station may transmit a DCI comprising the uplink pre-emption indication/cancellation indication. The DCI may be transmitted to a wireless device addressed by a C-RNTI, or be transmitted to a group of wireless devices addressed by a group RNTI. In an example, the base station may transmit a MAC CE comprising the uplink pre-emption indication/cancellation indication. In an example, the base station may transmit a signal sequence (e.g., a CSI-RS/DMRS) comprising the uplink pre-emption indication/cancellation indication. In an example, after transmitting the uplink pre-emption indication/cancellation indication, the base station may transmit a second DCI to a second UE (e.g., URLLC UE) indicating a second uplink grant comprising the at least part of the PUSCH resources, where the PUSCH resources are allocated in the first DCI for the first UE. The second UE, in response to receiving the second DCI, may transmit uplink data via the second uplink grant.

Figure 20:
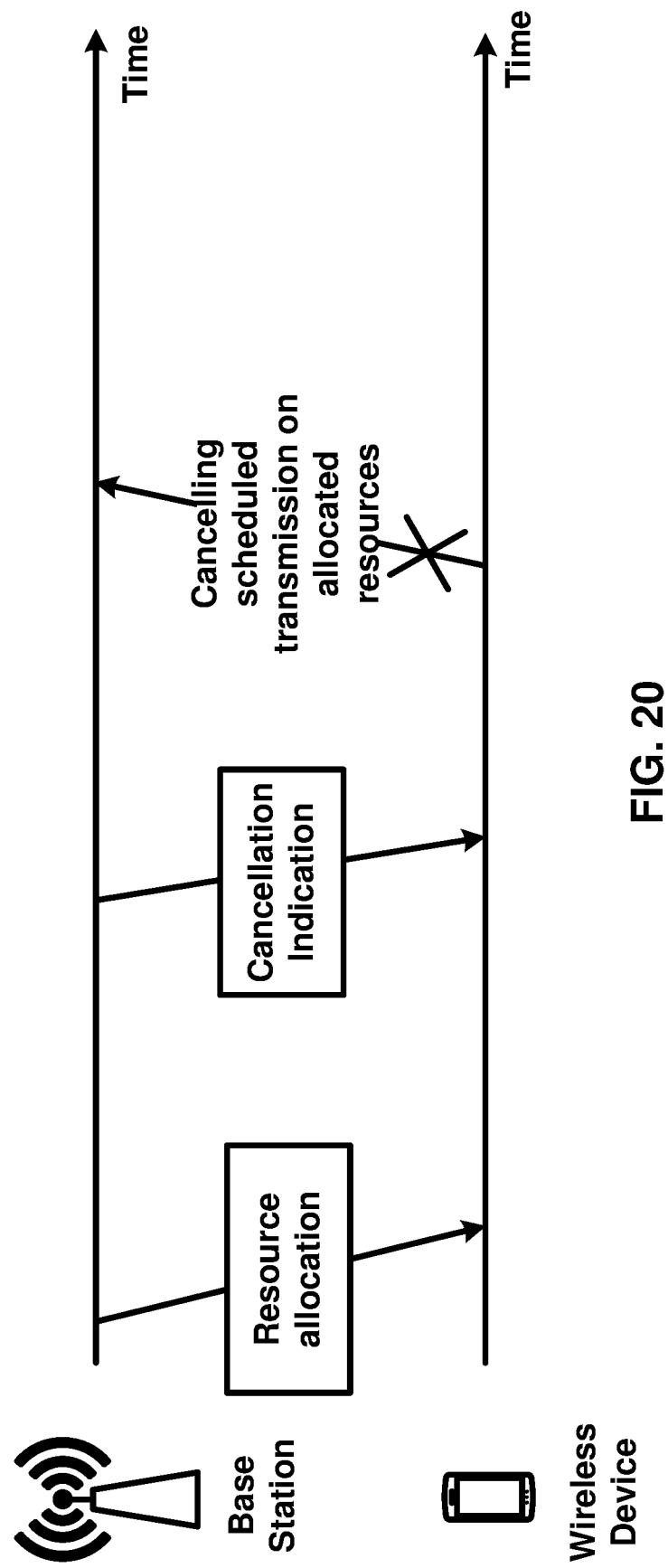
FIG. 20 illustrates an example of embodiments.

FIG. 20 shows an example of cancellation of scheduled (e.g., not started yet) uplink transmission based on uplink pre-emption indication/cancellation indication. In an example, a base station (e.g., gNB in FIG. 20) may transmit to a wireless device (e.g., UE in FIG. 20), a first DCI comprising a first uplink grant. The uplink grant may comprise PUSCH resources. In response to the first DCI, the UE may generate a TB based on the first DCI. As shown in FIG. 20, the UE, before starting uplink transmission of the TB, may receive an uplink pre-emption indication/cancellation indication from the base station. The uplink pre-emption indication/cancellation indication may comprise a cancellation indication, a stop indication, or a suspending indication. The uplink pre-emption indication/cancellation indication may indicate that at least a part of the PUSCH resources is pre-empted, or the wireless device may stop uplink transmission on the at least part of the PUSCH resources. As shown in FIG. 20, in response to the uplink pre-emption indication/cancellation indication, the wireless device may stop the scheduled (e.g., not started yet) uplink transmission on the at least part of the PUSCH resources, wherein the at least part of the PUSCH resources are pre-empted based on the uplink pre-emption indication/cancellation indication. In an example, the base station may transmit a DCI comprising the uplink pre-emption indication/cancellation indication. The DCI may be transmitted to a wireless device addressed by a C-RNTI, or be transmitted to a group of wireless devices addressed by a group RNTI. In an example, the base station may transmit a MAC CE comprising the uplink pre-emption indication/cancellation indication. In an example, the base station may transmit a signal sequence (e.g., a CSI-RS/DMRS) comprising the uplink pre-emption indication/cancellation indication. In an example, after transmitting the uplink pre-emption indication/cancellation indication, the base station may transmit a second DCI to a second UE (e.g., URLLC UE) indicating a second uplink grant comprising the at least part of the PUSCH resources, where the PUSCH resources are allocated in the first DCI for the first UE. The second UE, in response to receiving the second DCI, may transmit uplink data via the second uplink grant.

Figure 21:
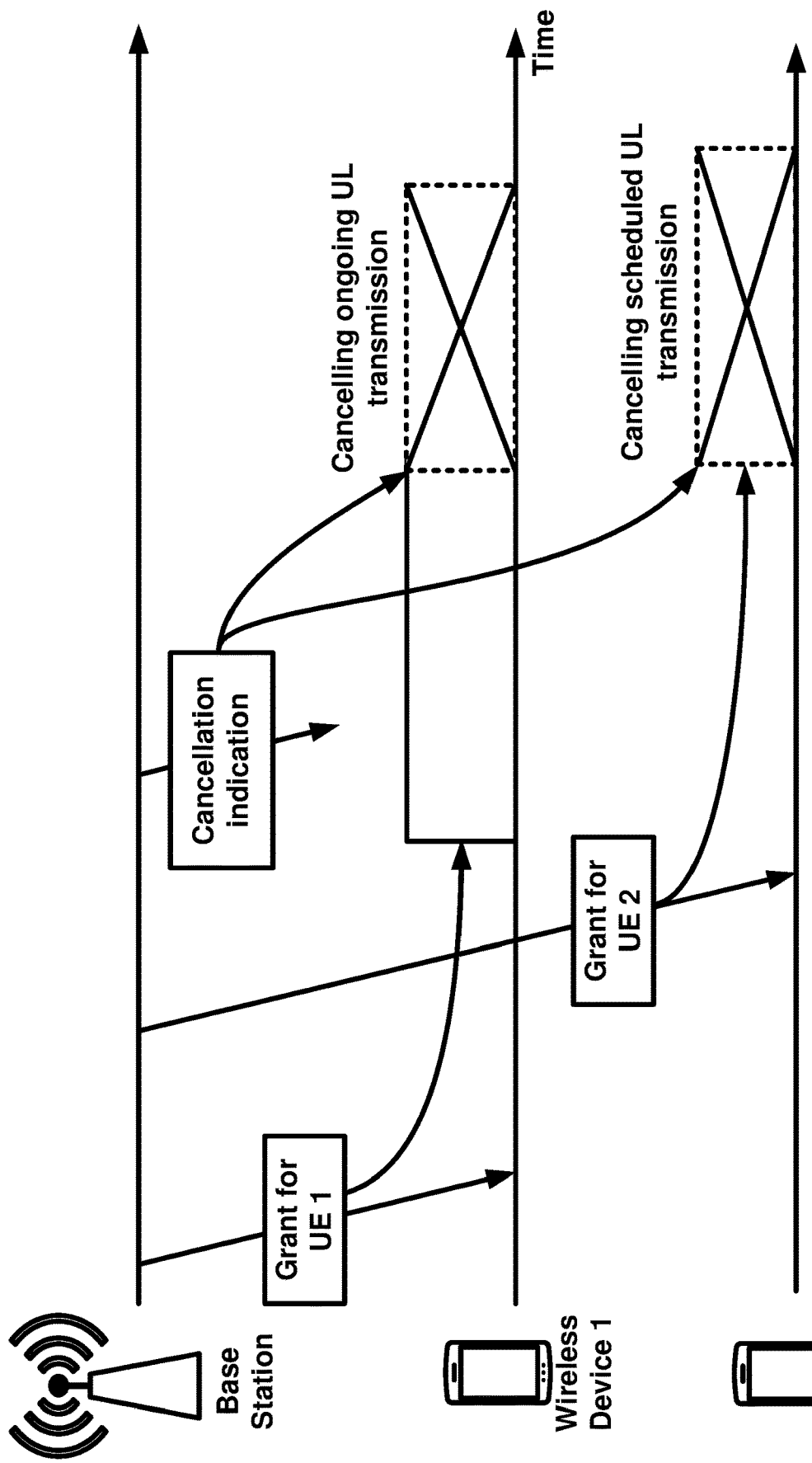
FIG. 21 illustrates an example of a pre-emption indication/cancellation indication.

FIG. 21 shows an example of group uplink cancellation based on uplink pre-emption indication/cancellation indication. In an example, a base station (e.g., gNB in FIG. 21) may transmit to a first wireless device (e.g., UE 1 in FIG. 21), a first DCI comprising a first uplink grant. The first uplink grant may comprise first PUSCH resources. The gNB may transmit to a second wireless device (e.g., UE 2 in FIG. 21), a second DCI comprising a second uplink grant. The second uplink grnat may comprise second PUSCH resources. As shown in FIG. 21, the gNB may transmit an uplink pre-emption indication/cancellation indication to UE 1 and UE 2 in a group command DCI.

In an example, UE 1 may receive the pre-emption indication/cancellation indication after UE 1 starts uplink transmission on the first uplink grant. UE 2 may receive the uplink pre-emption indication/cancellation indication before UE 2 starts uplink transmission on the second uplink grant.

In an example, the uplink pre-emption indication/cancellation indication may comprise a cancellation indication, a stop indication, or a suspending indication. In an example, a base station may transmit a DCI comprising the uplink pre-emption indication/cancellation indication. The DCI may be transmitted to a group of wireless devices (e.g., UE 1 and UE 2) addressed by a group RNTI. In the specification, a pre-emption indication may be used interchangeably with a cancellation indication.

In an example, UE 1 may start uplink transmission on the first uplink grant at a first symbol earlier than a second symbol on which uplink transmission shall be stopped according to the uplink pre-emption indication/cancellation indication.

In an example, the uplink pre-emption indication/cancellation indication may indicate uplink transmission shall be stopped on a first symbol earlier than a second symbol on which scheduled uplink transmission of UE 2 may occur.

As shown in FIG. 21, UE 1, after receiving the uplink pre-emption indication/cancellation indication, may stop ongoing uplink transmission on at least first part of the first uplink grant, based on the uplink pre-emption indication/cancellation indication. UE 2 may, after receiving the uplink pre-emption indication/cancellation indication, may stop scheduled uplink transmission on at least second part of the second uplink grant, based on the uplink pre-emption indication/cancellation indication. The uplink pre-emption indication/cancellation indication may indicate that the at least first part of the first uplink grant is pre-empted, and/or the at least second part of the second uplink grant is pre-empted. In an example, after transmitting the uplink pre-emption indication/cancellation indication, the base station may transmit a third DCI to a third UE (e.g., URLLC UE) indicating a third uplink grant comprising the at least first part of the first uplink grant and/or the at least second part of the second uplink grant. The third UE, in response to receiving the third DCI, may transmit uplink data via the third uplink grant.

In embodiments, an uplink pre-emption indication/cancellation indication is an uplink cancellation indication. In embodiments, an uplink pre-emption indication/cancellation indication is an uplink puncturing indication. In embodiments, an uplink pre-emption indication/cancellation indication is a cancellation indication for uplink and/or sidelink transmissions. In embodiments, an uplink pre-emption indication/cancellation indication is a puncturing indication for uplink and/or sidelink transmissions.

In an example, a wireless device may be configured to receive one or more cancellation indications for an uplink cell. The cancellation indication may be received, for example, via one or more DCIs. In an example, a wireless device may cancel an uplink transmission based on the one or more cancellation indications, when the wireless device may have received a scheduling information via a dynamic uplink grant or based on a configured grant configuration. The scheduling information may be of the uplink transmission. In a cancellation procedure of the uplink cell, the one or more cancellation indications may indicate cancellation resources that occur in the time domain after the one or more cancellation indications. When there is a sufficient gap between a first time of receiving the one or more cancellation indications and a second time of resources of the uplink transmission (e.g., the second time is after the first time with the gap), the wireless device may determine whether resources of the uplink transmission overlaps with the cancellation resources.

Cancelling or pre-empting scheduled uplink transmissions may be different from pre-empting downlink reception. For example, a wireless device may receive one or more pre-emption indications for a downlink cell. The one or more pre-emption indications may indicate past downlink pre-empting resources (e.g., the downlink pre-empting resources occur before receiving the one or more pre-emption indications). In response to the one or more pre-emption indications, the wireless device may remove or flush out received downlink data via resources overlapping with the downlink pre-empting resources.

A cancellation/pre-emption indication of an uplink carrier/cell may indicate resources occurring after the cancellation indication. Conversely, a pre-emption indication of a downlink carrier/cell may indicate resources occurred before the pre-emption indication.

In an example, a TCI state for a downlink cell/carrier may comprise a reference signal of a SSB or a CSI-RS. A second TCI state or a spatial domain filter parameter for an uplink cell/carrier may comprise a second reference signal of a SSB, a CSI-RS or a SRS.

In existing technologies, the wireless device may determine to drop one or more uplink transmissions in response to resource(s) of the one or more uplink transmissions overlapping in the time and frequency domains with cancellation resource(s) indicated by a cancellation indication.

Based on high frequencies and/or MIMO technologies, a base station and/or a wireless device may operate with a plurality of analog/digital beams. For example, a first transmission configured with a first beam may not interfere to a large extent with a second transmission configured with a second beam, even when the first and second transmissions are performed on overlapping time-frequency resources. Potential interference among analog/digital beams tends to decrease as the propagation paths of the beams become more distant. For example, a first uplink beam and a second uplink beam may respectively target a first TRP (or a first base station panel) and a second TRP (or a second base station panel) respectively. For example, the first TRP (or the first panel) and the second TRP (or the second panel) may be located in different physical locations, where antenna gain/ potential gain or potential interferences between the first uplink beam and the second uplink beam may be limited. Implementation of existing technologies of a cancellation procedure may lead to unnecessary drops of uplink signals/ transmissions, particularly when the uplink signals/transmissions may not interfere considerably on transmission(s) via pre-empting wireless device(s). Implementation of existing technologies may lead performance degradations and may limit an application of a cancellation procedure.

Example embodiments of the present disclosure are directed to a cancellation procedure for multi-beam systems. Example embodiments increase resource efficiency by reducing unnecessary cancellation/dropping of resources. In example embodiments, a base station configures, to a wireless device via RRC and/or MAC-CE signaling, one or more sets of spatial domain filter parameters (e.g., TCI states, SRS resource sets, spatial information configurations) for cancellation indications (CIs) for an uplink cell. For example, the base station may configure uplink TCI states for the CIs of the uplink cell.

The base station may schedule a first uplink transmission, with a first TCI state and via uplink resources of the uplink cell, for the wireless device. The wireless device may receive a DCI comprising a cancellation indication (CI) for the uplink cell, where the CI indicates cancellation resources overlapping with the uplink resources of the first uplink transmission. The wireless device may determine to drop the first uplink transmission via the PUSCH in response to the uplink TCI states comprising the first TCI state. The wireless device may not drop the first uplink transmission when the uplink TCI states do not comprise the first TCI state of the first uplink transmission.

For example, the wireless device may be scheduled with a second uplink transmission with a second TCI state. For example, the uplink TCI states may not comprise the second TCI state. The wireless device may not cancel or drop the second uplink transmission even if resources of the second uplink transmission overlaps with the cancellation resource (s).

Embodiments may allow a base station to flexibly configure and manage one or more TCI states for a cancellation indication where the one or more TCI states may represent uplink beams that may potentially interfere with pre-emption/cancellation resource(s) indicated by the cancellation indication. Embodiments may reduce unnecessary cancelling/dropping of uplink transmissions without degrading performance due to potential interference. Embodiments are beneficial for supporting coexistence between sidelink and uplink transmissions on a same frequency region. As long as sidelink transmission interference with an uplink transmission is low, the sidelink transmission and the uplink transmission may occur in parallel. Based on disclosed embodiments, the wireless device may be allowed to transmit the sidelink transmission in such cases.

In an example, a wireless device may be configured/activated with a plurality of TRPs comprising a first TRP and a second TRP. For example, a TRP may be presented as a coreset pool. For example, the first TRP may be associated with a first coreset pool, and the second TRP may be associated with a second coreset pool. In existing technologies, a first DCI, comprising a cancellation indication, transmitted via the first coreset pool may lead to dropping/canceling one or more uplink transmissions of the second coreset pool of a wireless device. This may degrade performance of the one or more uplink transmissions. Moreover, when the first TRP and the second TRP communicate via a backhaul with considerable latencies (e.g., non-ideal backhaul), the second TRP may not be able to identify causes of dropping of the one or more uplink transmissions. For example, whether the one or more uplink transmissions are dropped due to bad channel qualities or dropped due to scheduling conflict or cancellation indication. This may lead the second TRP to increase a transmission power for retransmission(s) for the one or more uplink transmissions, which may aggravate interferences or increase power consumption of the wireless device.

In an example embodiment, a wireless device may be configured with a first set of TCI states corresponding to a first TRP/a first coreset pool. The wireless device may be configured with a second set of TCI states corresponding to a second TRP/a second coreset pool. The wireless device may schedule a first uplink transmission (e.g., a PUSCH) via resources. The wireless device may schedule the first uplink transmission based on a DCI or based on a configured grant configuration. The first uplink transmission may be configured with a first TCI state. The wireless device may receive a second DCI comprising a cancellation indication via a coreset of the first coreset pool. The wireless device may determine the first set of TCI states in response to receiving the DCI via the first coreset pool. The wireless device may determine to drop the first uplink transmission in response to the resources of the first uplink transmission overlapping with cancellation resources indicated by the cancellation indication and the first set of TCI states comprising the first TCI state. The wireless device may not drop a second uplink transmission where the second uplink transmission is scheduled with a second TCI state associated with the second TRP (e.g., the first set of TCI states do not comprise the second TCI state).

Example embodiments may reduce dropping of uplink transmission(s) of a second TRP due to a cancellation indication transmitted via a first TRP. Example embodiments may reduce ambiguity at the second TRP by reducing interferences/impacts caused by the first TRP.

In an example, a base station may be equipped/configured/activated with a plurality of panels comprising a first panel and a second panel. Each panel may be associated with a set of TCI states. The base station may be able to receive a TCI state from each set of TCI states in a time. For example, the base station may be able to receive a first TCI of a first set of TCI states in parallel to receive a second TCI state of a second set of TCI states, where the first set of TCI states is associated with the first panel and the second set of TCI states is associated with the second panel. For example, the base station may schedule urgent data that may include cancelling some already scheduled resource(s). For example, the urgent data is for a wireless device where a first TCI state of the first set of TCI states are allocated for the urgent data. The base station may cancel resource(s), configured with a TCI state of the first set of TCI states, that may overlap with the urgent data. The base station may not cancel second resources, configured with a second TCI state of the second set of TCI states, as the base station is able to receive concurrently with the urgent data. Existing technologies may not allow a base station to configure a subset of TCI states to be affected by a cancellation indication for an uplink cell/carrier.

In an example embodiment, a base station may configure a first set of TCI states associated with a first cancellation indication (CI) for the uplink cell/carrier. The base station may configure a second set of TCI states associated with a second CI. For example, the first CI may be used to cancel/pre-empt resources for the first set of TCI states associated with a first panel. The second CI may be used to cancel/pre-empt resources for the second set of TCI states associated with a second panel. The wireless device may receive a first DCI comprising the first CI. The wireless device may determine to drop an uplink transmission, in response to the first CI, based on resources of the uplink transmission overlapping with cancellation resources indicated by the first CI and the first set of TCI states comprising a TCI state configured/scheduled for the uplink transmission. The wireless device may not drop a second uplink transmission when the first set of TCI states do not comprise a second TCI state configured/scheduled for the second uplink transmission, even when second resources of the second uplink transmission may overlap with the cancellation resources.

Example embodiments allow a base station to flexibly manage one or more TCI states affected by a CI based on capabilities of the base station. Example embodiments may reduce unnecessary dropping of uplink transmissions while keeping benefits of a cancellation procedure.

In example embodiments, a base station may configure, to a wireless device via RRC and/or MAC-CE signaling, one or more set of spatial domain filter parameters (e.g., TCI states, SRS resource sets, spatial information configurations) for a cancellation indication for an uplink cell. For example, the base station may configure two sets of spatial domain filter parameters comprising a first set of spatial domain filter parameters and a second set of spatial domain filter parameters. The first set of spatial domain filter parameter may be associated with a first TRP/coreset pool, a first panel of a base station, or a first group of downlink TCI states. The second set of spatial domain filter parameter may be associated with a second TRP/coreset pool, a second panel of the base station, or a second group of downlink TCI states.

The base station may schedule a first PUSCH for the wireless device via the uplink cell. The first PUSCH may be configured with a first spatial domain filter parameter. The wireless device may receive a DCI comprising a cancellation indication (CI) for the uplink cell and the DCI indicating a downlink TCI state. The wireless device may determine a set of spatial domain filter parameters based on the downlink TCI state. For example, the downlink TCI state may indicate a TRP index or a coreset pool index. For example, the downlink TCI state may indicate a panel index of the base station. For example, the downlink TCI state may indicate a group index of the first group of downlink TCI states or the second group of downlink TCI states. Based on the determining the set of spatial domain filter parameters, the wireless device may determine whether the set of spatial domain filter parameters may comprise the first spatial domain filter parameter. The wireless device may determine to drop the first PUSCH in response to a resource of the first PUSCH overlapping with cancellation resource(s) indicated by the CI and the set of spatial domain filter parameter comprising the first spatial domain filter parameter.

For example, the wireless device is scheduled with a second uplink transmission with a second spatial domain filter parameter, where the set of spatial domain filter parameters do not comprise the second spatial domain filter parameter. The wireless device may not cancel the second uplink transmission even if resource(s) of the second uplink transmission overlaps with the cancellation resource(s).

Example embodiments allow a base station to flexibly manage one or more groups of a plurality of TCIs based on capabilities of the base station. Example embodiments may reduce unnecessary dropping of uplink transmissions while keeping benefits of a cancellation procedure.

Figure 22:
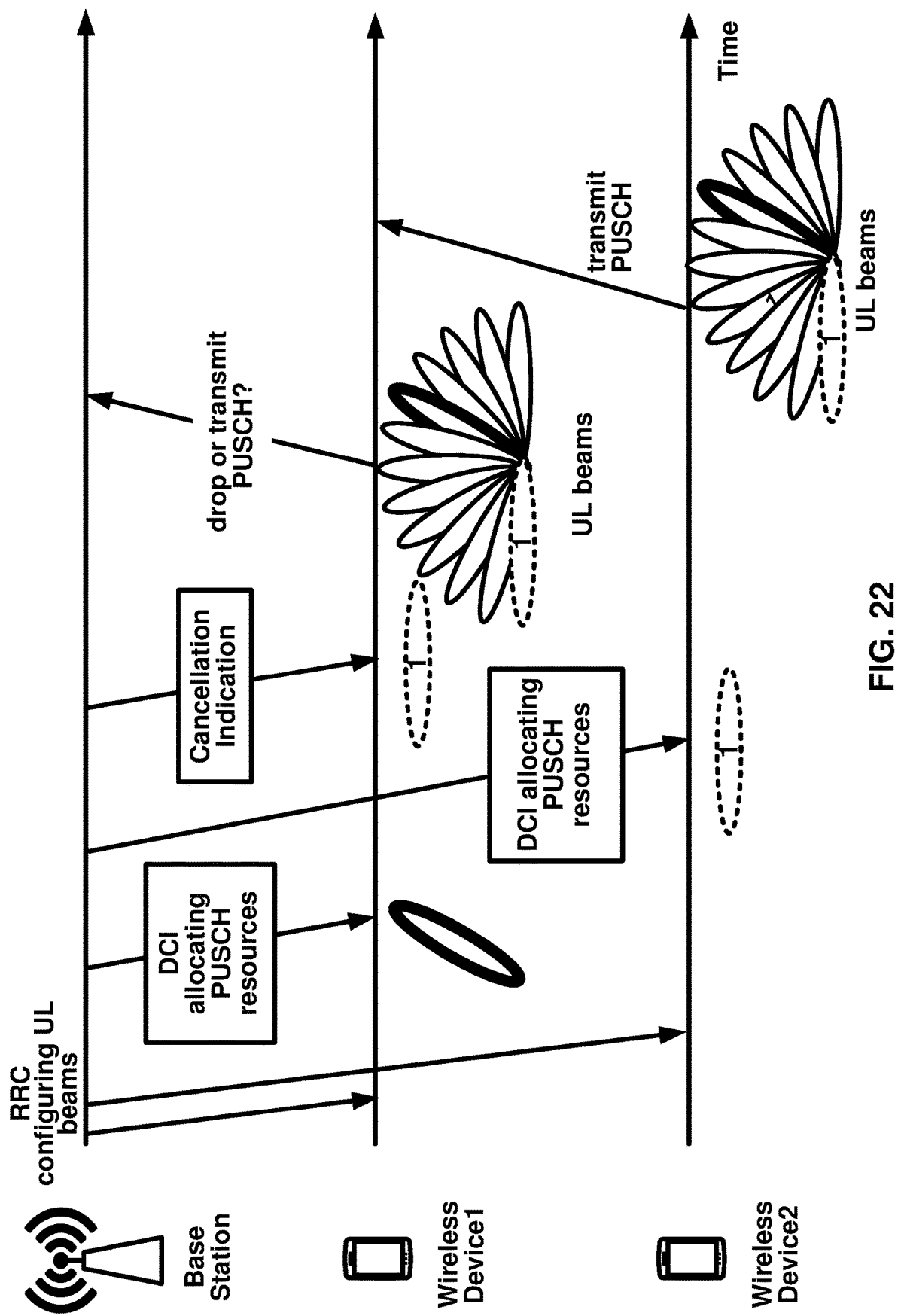
FIG. 22 illustrates an example of a pre-emption/cancellation in a multi-beam scenario.

For example, FIG. 22 illustrates a scenario of a multi-beam operation. A base station configures one or more first uplink beams for a first wireless device. The base station configures one or more second uplink beams for a second wireless device. The one or more first uplink beams comprise a first beam (shown in a dotted oval with a number 1), a second beam (shown in block oval), and a plurality of uplink beams (shown in white ovals). The one or more second uplink beams comprise the first beam, the second beam and the plurality of the uplink beams. For example, the base station transmits an uplink grant to allocate resources for a first PUSCH for the first wireless device, where the base station indicates that an uplink beam used for the PUSCH is the second beam. The base station schedules a second PUSCH to the second wireless device, where due to a scheduling constraint or quality of service constraint of the second PUSCH, the base station decides to overlap the resources of the second PUSCH with the first PUSCH. The base station indicates the first beam as an uplink beam for the second PUSCH. The base station transmits a pre-emption indication/cancellation indication indicating the first beam to the first wireless device. In response to receiving the pre-emption indication/cancellation indication, the first wireless device may not drop the first PUSCH as the first beam and the second PUSCH may have limited interference each other.

With multi-beam operation, pre-empting a first PUSCH configured with a first beam for a second PUSCH configured with a second beam may not be efficient, as the first PUSCH and the second PUSCH may be transmitted in parallel with each beam causing low interference with the transmission of the other beam.

Example embodiments of the present disclosure are directed to a pre-emption/cancellation mechanism for multi-beam systems. Example embodiments increase resource efficiency by reducing unnecessary pre-emption/cancellation of resources. In example embodiments, a base station configures one or more uplink beams for a pre-emption indication/cancellation indication for an uplink cell to a first wireless device. The base station may transmit the configuration to the first wireless device via RRC signaling, MAC CE signaling, or DCI signaling. The base station may schedule a first PUSCH for a second wireless device via the uplink cell, wherein the first PUSCH is configured with a first beam. The one or more uplink beams may comprise one or more analog/digital beams that may potentially interfere on the first PUSCH with the first beam, wherein the first PUSCH may be scheduled in overlapped resources to one or more uplink channels scheduled to the first wireless device. For example, when the first wireless device is scheduled with a first uplink transmission with a second uplink beam, wherein the second uplink beam belongs to the one or more uplink beams, the first wireless device may determine to drop the first uplink transmission depending on whether the first uplink transmission overlaps with resources indicated by a pre-emption indication/cancellation indication. When the first wireless device is scheduled with a second uplink transmission with a third uplink beam, wherein the third uplink beam does not belong to the one or more uplink beams, the first wireless device may continue transmission of the second uplink transmission. The second uplink transmission may not interfere considerably on the first PUSCH even if the second uplink transmission and the first PUSCH may overlap partially or fully in a time/frequency resource.

For example, based on an example of FIG. 22, the base station may configure to the first wireless device one or more uplink beams comprising a first beam (shown in dotted oval with a number 1). The first wireless device, in response to receiving the pre-emption indication/cancellation indication, may determine whether a scheduled PUSCH is configured with a second beam, wherein the one or more uplink beams comprise the second beam.

In the specification, a beam may be interchangeably used with an analog beam, a TCI state or a spatial domain filter parameter. A beam may be an analog beam. A beam may be represented based on a TCI state. A wireless device may determine a spatial domain filter parameter for a beam or based on a TCI state of the beam.

In the specification, an uplink beam may be represented by an uplink TCI state that comprise one or more reference signals. At least one of the one or more reference signals may provide a quasi-collocated type D (e.g., qcl property(s) of spatial domain filter parameter(s)) with a DM-RS of an uplink signal/channel. An uplink TCI state or an uplink beam may be represented as a spatial domain filter parameter that corresponds (e.g., a beam correspondence) to a downlink TCI state. An uplink TCI state or an uplink beam may be represented as a spatial domain filter parameter (e.g., a part of a SRS resource configuration).

In an example, a base station may operate a plurality of analog beams. The base station may configure, via RRC signaling and/or MAC CEs and/or DCIs, a plurality of transmission control information (TCI) states for uplink or sidelink transmissions to a wireless device. A TCI state may correspond to an analog beam. For example, one or more TCI states may correspond to an analog beam. An analog beam may correspond to one or more TCI states. For example, an analog beam may comprise one or more finer digital beams, where each digital beam may correspond to a TCI state. For example, the base station may operate one or more digital beams with different granularity or parameters for an analog beam. The base station may configure one or more reference signals associated with a TCI state. For example, a synchronization signal block (e.g., primary synchronization, secondary synchronization, DM-RS of physical broadcast channel) may be used as a reference for a first TCI state. For example, a CSI-RS may be used as a reference for a second TCI state.

In an example, a base station may configure, via RRC signaling and/or MAC CEs and/or DCIs, a plurality of sounding reference signal (SRS) resources, wherein a SRS resource may be mapped to an analog beam. One or more SRS resources may be mapped to an analog beam. The base station may configure, via RRC signaling and/or MAC CEs and/or DCIs, one or more pathloss reference signals and/or one or more downlink reference signals for each SRS resource and/or for each SRS resource set, wherein the one or more pathloss reference signals and/or one or more downlink reference signals are used to determine a spatial filter associated/used for the SRS resource. A wireless device may perform measurements on the one or more pathloss reference signals and/or the one or more downlink reference signals. Based on the measurements, the wireless device may determine one or more parameters for transmission filter for uplink or sidelink transmission, where the one or more parameters for transmission filter may align transmission beam accordingly to the one or more pathloss reference signals and/or the one or more downlink reference signals. Based on whether the wireless device supports a beam correspondence or may not support the beam correspondence, the wireless device may determine appropriate one or more parameters for the transmission filter. For example, the one or more downlink reference signals may be associated with one or more downlink transmission configuration indicator (TCI) states. For example, a downlink reference signal of the one or more downlink reference signals or a pathloss reference signal of the one or more pathloss reference signals may be configured to a TCI state. There may be a mapping between one or more downlink TCI states and one or more uplink TCI states (or one or more beam-corresponding downlink TCI states for the one or more uplink TCI states). There may be a mapping between one or more downlink TCI states and one or more uplink SRS resource sets/resources.

In an example, a base station may transmit one or more radio resource control (RRC) messages. The one or more RRC messages may comprise one or more parameters for a pre-emption indication/cancellation indication. The one or more parameters may comprise one or more uplink TCI states and/or one or more SRS resource indices and/or one or more downlink TCI states (that beam correspond to the one or more uplink TCI states or the one or more SRS resources). The one or more parameters may comprise frequency regions where a pre-emption indication/cancellation indication is applied. The one or more parameters may comprise a cell index or one or more cells where a pre-emption indication/cancellation indication is applied. The one or more parameters may comprise one or more parameters related to the time domain. For example, the one or more parameters may comprise a periodicity of a pre-emption indication/cancellation indication. For example, the one or more parameters may comprise a time domain duration of a pre-emption indication/cancellation indication. For example, the one or more parameters may comprise one or more slots and/or one or more OFDM symbols where a pre-emption indication/cancellation indication is applied. For example, the one or more parameters may comprise one or more slot indices and/or one or more OFDM symbol indices where a pre-emption indication/cancellation indication is applied. For example, the one or more parameters may comprise one or more frequency regions and/or one or more time regions where a pre-emption indication/cancellation indication is applied.

For example, a pre-emption indication/cancellation indication indicates a bitmap of K slots. The one or more parameters may indicate M slots, where K<M. For example, the one or more parameters may comprise a bitmap where the bitmap may indicate up to K slots among M slots where the pre-emption indication/cancellation indication is applied. For example, the wireless device may apply a downlink pre-emption indication/cancellation indication over one or more first slots, wherein each slot of the one or more first slots comprises a downlink OFDM symbol and/or a flexible OFDM symbol. For example, the wireless device may apply an uplink pre-emption indication/cancellation indication or a sidelink pre-emption indication/cancellation indication over one or more second slots, wherein each slot of the one or more second slots comprises an uplink OFDM symbol and/or a flexible OFDM symbol and/or a sidelink OFDM symbol. In the example, a downlink OFDM symbol is an OFDM symbol that may be used for downlink resource or may be indicated as downlink resource based on a slot formation indication or TDD-UL-DL-Config (and/or TDD-UL-DL-ConfigCommon). In an example, an uplink OFDM symbol is an OFDM symbol that may be used for uplink resource or may be indicated as uplink resource based on a slot formation indication or TDD-UL-DL-Config (and/or TDD-UL-DL-ConfigCommon). In an example, a flexible OFDM symbol is an OFDM symbol that may be used for downlink/uplink and/or sidelink resource or reserved. For example, a flexible OFDM symbol indicated by TDD-UL-DL-Config and/or TDD-UL-DL-ConfigCommon may be used/changed to downlink, uplink or reserved/unavailable OFDM symbol. For example, a dynamic slot formation indicator may indicate a flexible OFDM symbol to a reserved OFDM symbol or a downlink OFDM symbol or an uplink OFDM symbol. In an example, the wireless device may not receive or transmit via the reserved/unavailable OFDM symbol(s). In the example, a sidelink OFDM symbol is an OFDM symbol that may be used for sidelink resources.

In an example, a base station may configure, via RRC signaling and/or MAC CEs and/or DCIs, one or more uplink reference signals (e.g., one or more uplink TCI states) or one or more downlink reference signals (e.g., one or more downlink TCI states) for a pre-emption indication/cancellation indication for an uplink cell (e.g., an uplink carrier) or a sidelink cell (e.g., a sidelink carrier). The base station may transmit a DCI comprising one or more pre-emption indication/cancellation indication for one or more uplink cells and/or one or more sidelink cells. For example, a wireless device may apply the k-th pre-emption indication/cancellation indication of the one or more pre-emption indications/cancellation indications via the DCI for the uplink or the sidelink cell. For example, another wireless device may apply k+1-th pre-emption indication/cancellation indication of the one or more pre-emption indications/cancellation indications via the DCI for a second uplink or a second sidelink cell. The DCI is a group-common DCI, where one or more wireless devices may receive the DCI. For example, the wireless device may apply a first entry from the DCI for a first cell and may apply a second entry from the DCI for a second cell. The first cell may be an uplink cell or a sidelink cell. The second cell may be an uplink cell or a sidelink cell. The base station may configure one or more entries for one or more cells for each wireless device via UE-specific signaling such as RRC, MAC-CE and/or DCI signaling. The wireless device, in response to receiving the DCI, may determine whether to apply the indicated pre-emption indication/cancellation indication for the uplink cell or the sidelink cell based on (a) whether the wireless device has scheduled with any sidelink or uplink resource(s) which are partially or fully overlapping, in time and frequency domain, with resources indicated by the pre-emption indication/cancellation indication; (b) whether the sidelink or uplink resource(s) are configured/indicated with one or more parameters for a transmission filter, wherein the one or more uplink reference signals and/or the one or more downlink reference signals comprise the one or more parameters for the transmission filter or the transmission filter is aligned with one of the one or more uplink reference signals and/or the one or more downlink reference signals.

Figure 23:
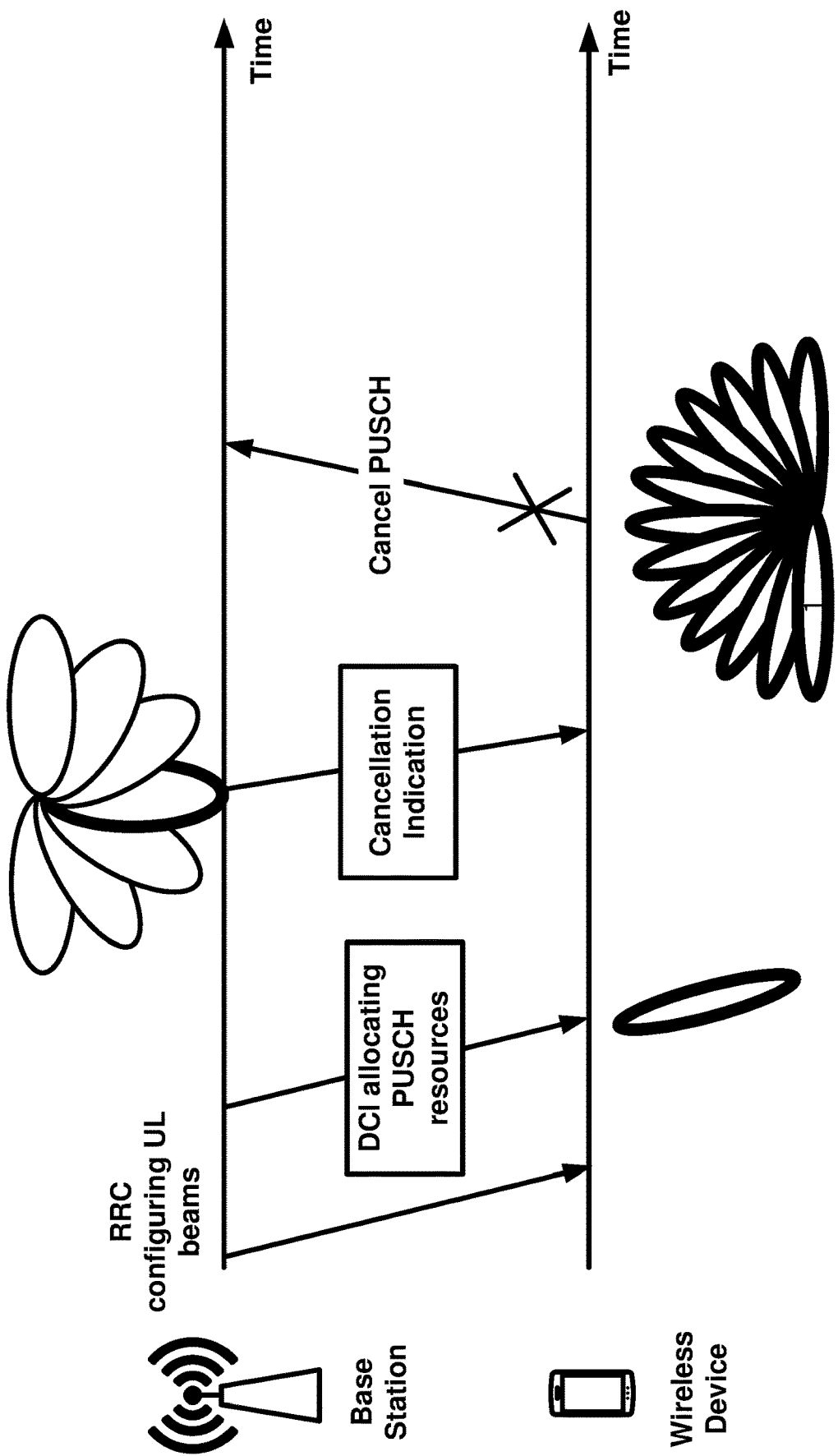
FIG. 23 illustrates an example of embodiments.

FIG. 23 illustrates an example. A base station may transmit one or more uplink beams (shown in dotted ovals in FIG. 23 for the wireless device) for a pre-emption indication/cancellation indication of an uplink cell. An index of an uplink beam may start from 1 and may increase in a clock-wise direction. The base station transmits a first DCI comprising a resource assignment for a PUSCH via an uplink cell. The first DCI indicates a first uplink beam direction (e.g., beam 5 in FIG. 23). The one or more uplink beams for the pre-emption indication/cancellation indication comprise the first uplink beam direction. The base station transmits a second DCI comprising one or more pre-emption indications/cancellation indications, wherein at least one pre-emption indication/cancellation indication for the uplink cell is indicated. Based on the at least one pre-emption indication/cancellation indication, the wireless device determines whether the scheduled PUSCH is overlapped with time/frequency resources indicated by the at least one pre-emption indication/cancellation indication. The wireless device determines that the first uplink beam of the scheduled PUSCH belongs to the one or more uplink beams for the pre-emption indication/cancellation indication of the uplink cell. In response to determining scheduled PUSCH at least partially overlaps and the first uplink beam belongs to the one or more uplink beams (e.g., the one or more uplink beams comprising the first uplink beam) for the pre-emption indication/cancellation indication of the uplink cell, the wireless device cancels the scheduled PUSCH based on the first uplink beam. When the wireless device is scheduled with a second PUSCH, wherein the second PUSCH does not overlap with the time/frequency resources for pre-emption/cancellation indicated by the at least one pre-emption indication/cancellation indication, the wireless device may transmit the second PUSCH. When the second PUSCH is indicated with a second uplink beam, wherein the second uplink beam (e.g., beam 2) does not belong to the one or more uplink beams (e.g., the one or more uplink beams does not comprise the second uplink beam), the wireless device may transmit the second PUSCH regardless of whether the second PUSCH may overlap or not overlap with the time/frequency resources for pre-emption/cancellation indicated by the at least one pre-emption indication/cancellation indication.

In an example, a base station may configure one or more first uplink beams for a first downlink TCI state of a BWP of a scheduling cell for pre-emption indication (e.g., cancellation indication) of an uplink cell. For example, the base station may configure the one or more first uplink beams for a first search space of the BWP of the scheduling cell for pre-emption indication (e.g., cancellation indication) of the uplink cell. For example, the base station may configure the one or more first uplink beams for a first CORESET of the BWP of the scheduling cell for pre-emption indication (e.g., cancellation indication) of the uplink cell. The base station may configure one or more second uplink beams for a second downlink TCI state of the BWP of the scheduling cell for the pre-emption/cancellation. The base station may configure the one or more second uplink beams for a second downlink TCI state for a second search space of the BWP of the scheduling cell for the pre-emption indication (e.g., cancellation indication). The base station may configure the one or more second uplink beams for a second CORESET of the BWP of the scheduling cell for the pre-emption indication (e.g., cancellation indication). The one or more first uplink beams may be configured via configuration of one or more uplink TCI states or configuration of one or more SRS resource indices/resource sets and/or one or more downlink TCI states (that beam correspond to the one or more uplink TCI states or the one or more SRS resources). A wireless device may monitor a first pre-emption indication (e.g., cancellation indication, PI, or CI) for the uplink cell via a coreset, where the coreset is associated with the first TCI state or the first search space. For example, the coreset may be the first CORESET. The wireless device may determine the one or more first uplink beams in response to receiving the first PI via the coreset. The wireless device may monitor a second PI for the uplink cell via a third coreset. The third coreset may be associated with the second TCI state or the second search space. For example, the third corset may be the second CORESET. The wireless device may determine the one or more second uplink beams in response to receiving the second PI via the third coreset. In response to receiving a first PI via the first TCI or the first search space or via the first CORESET, the wireless device may apply the one or more first uplink beams for the PI application/operation. The wireless device may drop a PUSCH, wherein the PUSCH overlaps with resources indicated by the first PI and an uplink beam of the PUSCH belongs to the one or more first uplink beams (e.g., the one or more first uplink beams comprise the uplink beam of the PUSCH).

In response to receiving a second PI via the second TCI, the second search space, or via the second CORESET, the wireless device may apply the one or more second uplink beams for the PI application. The wireless device may drop a second PUSCH, wherein the second PUSCH overlaps with resources indicated by the second PI and a second uplink beam of the second PUSCH belongs to the one or more second uplink beams (e.g., the one or more second uplink beams comprise the second uplink beam of the second PUSCH). In an example, the wireless device may determine the first TCI via the first CORESET, where the first CORESET is activated with the first TCI. The wireless device may receive the first PI via the first CORESET. The wireless device may apply the first TCI for the first PI. For example, if the wireless device receives a third PI via a third CORESET, where a third TCI state is associated with the third CORESET, the wireless device may apply the third TCI for the third PI. Based on the TCI state of the PI, the wireless device may determine one or more uplink beams affected by (e.g., applied for, determined for) the PI. For each TCI state, the wireless device may be configured with a set of uplink beams applied for each TCI state. When the wireless device is not configured with any uplink beam for a TCI state of a PI, the wireless device may apply one or more uplink beams configured for the wireless device for uplink transmissions or sidelink transmission on the uplink cell. When the wireless device is not configured with any uplink beam for the TCI state of the PI, the wireless device may apply no uplink beam uplink transmissions or sidelink transmission on the uplink cell. In an example, when a TCI state is configured/associated with a synchronization signal block (SSB) (e.g., the TCI state is configured with a synchronization signal as a downlink reference signal), one or more TCI states configured with one or more CSI-RSs, wherein the one or more CSI-RSs are quasi-collocated to the SSB, are considered as a same TCI state to the TCI state. In an example, the base station may configure one or more uplink beams for a first SSB. The one or more uplink beams may be applied to one or more TCI states, wherein one or more reference signals of the one or more TCI states are either the first SSB or quasi-collocated with the first SSB.

In an example, a base station may configure one or more first uplink beams (e.g., SRS resources, uplink TCI states, SRS resource sets, beam-corresponding downlink TCI states) for a downlink TCI state, for a SSB index, for a CORESET, for a search space, for a CORESET pool, for a cell, for one or more cells of a cell group, for a cell group, for each PUCCH group, or for a BWP. The one or more first uplink beams may be configured for one or more combinations of each option (e.g., for a downlink TCI state of a coreset pool, for a coreset pool of a cell group). Based on the configuration, wireless device determine the one or more first uplink beams corresponding to a pre-emption indication/cancellation indication. The wireless device may determine to perform pre-emption/cancellation for an uplink transmission or a sidelink transmission based on an uplink beam configured/indicated for the uplink transmission or the sidelink transmission and whether the uplink transmission or the sidelink transmission is overlapped with resources indicated by the pre-emption/cancellation. In determining the one or more first uplink beams corresponding to the pre-emption indication/cancellation indication for the uplink cell, the wireless device may use a DCI comprising the pre-emption indication/cancellation indication. For example, the DCI may indicate the one or more uplink beams via one or more DCI fields. For example, for the pre-emption indication/cancellation indication, the DCI may also comprise the one or more uplink beams which are applied for the pre-emption indication/cancellation indication. For example, a TCI state associated with the DCI may be used. For example, the TCI state of a CORESET, where the DCI has been transmitted may be used for determining the one or more uplink beams. The wireless device may determine the one or more uplink beams which are configured to be associated with the TCI state of the CORESET. For example, the DCI may indicate a second downlink TCI state. The wireless device may determine the one or more uplink beams which are configured to be associated with the second TCI state. For example, the base station may configure the PI with the one or more uplink beams. For example, the base station may configure an index/a location (e.g., PI location in a DCI) and one or more uplink beams for a DCI comprising one or more PIs, wherein the wireless device may apply the one or more uplink beams when there is a PI indication based on the indicated index among the one or more PIs of the DCI.

In an example, based on a base station capability, the base station may not be able to receive a first PUSCH and a second PUSCH overlapping in a same time/frequency resource, where a first uplink beam of the first PUSCH and a second uplink beam of the second PUSCH are not quasi-collocated. For example, the base station may be able to receive a single uplink analog beam at a time. Based on the capability, the base station may configure one or more uplink beams corresponding to a pre-emption indication/cancellation indication for an uplink cell or may skip configuration. When a wireless device has not received configuration of the one or more uplink beams, the wireless device may apply the pre-emption indication/cancellation indication for all configured and/or activated uplink beams for the uplink cell. In an example, the base station may configure one or more sidelink beams corresponding to the pre-emption indication/cancellation indication for the uplink cell regardless of its capability, as the base station may not receive the sidelink transmissions.

For example, when the base station supports a plurality of uplink beams to be received at a time, the base station may group one or more first uplink beams as a first group and one or more second uplink beams as a second group. The base station may configure to a first wireless device the one or more first uplink beams or the first group. The base station may configure to a second wireless device the one or more second uplink beams or the second group. The base station may configure to a third wireless device both the one or more first uplink beams and the one or more second uplink beams (or both groups). The base station may indicate a first group or a second group in a pre-emption indication/cancellation indication. The first wireless device may determine whether to drop a PUSCH when the first group is indicated in the pre-emption indication/cancellation indication. Otherwise, the first wireless device may not drop the PUSCH. The second wireless device may determine whether to drop a PUSCH when the second group is indicated in the pre-emption indication/cancellation indication. Otherwise, the second wireless device may not drop the PUSCH. The third wireless device may determine whether to drop a PUSCH when the pre-emption indication/cancellation indication indicates any group. For example, a group may correspond to a receive panel of the base station. For example, the base station, based on its capability, configure one or more groups of uplink beams.

Embodiments allow a base station to flexibly configure and manage uplink beams based on its capability and potential interferences among multiple uplink/sidelink transmissions. Embodiments allow a wireless device to reduce unnecessary pre-empting resources, where the resources may have limited interferences on other parallel transmissions. Embodiments are beneficial for coexisting between sidelink and uplink transmissions on a same frequency region. As long as a sidelink transmission impacts low interference to an uplink transmission, the sidelink transmission and the uplink transmission would occur in parallel. Based on enhancements, the wireless device is allowed to transmit the sidelink transmission in such cases.

Figure 24:
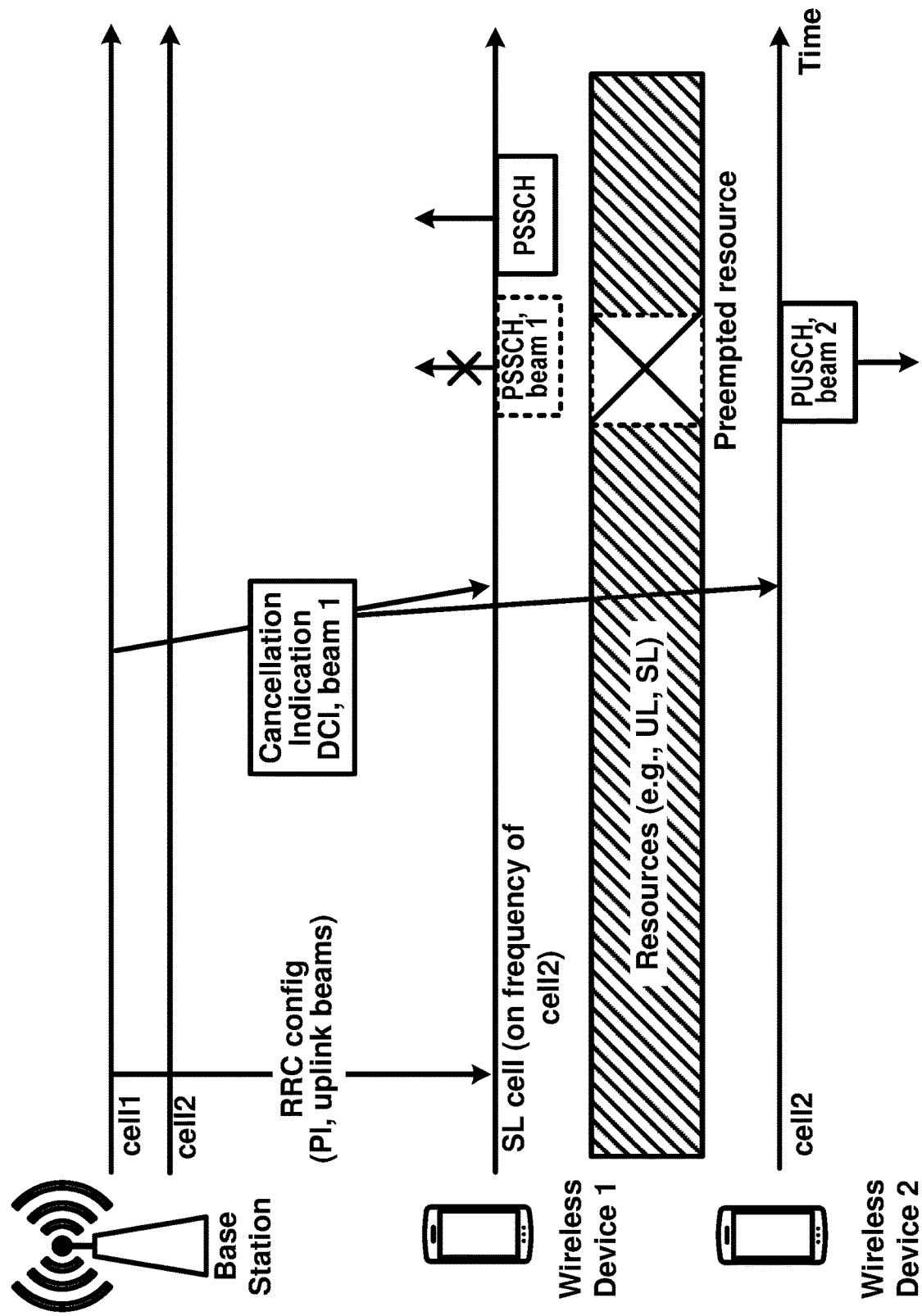
FIG. 24 illustrates an example of a pre-emption/cancellation mechanism.

FIG. 24 illustrates an example. A base station configures a first cell (cell 1) and a second cell (cell 2). The base station configures one or more parameters for pre-emption indications/cancellation indications and uplink beams. The base station configures a position of a pre-emption indication/cancellation indication for an uplink cell (cell 2) and one or more uplink beams corresponding to the position of the pre-emption indication/cancellation indication. The base station configures parameters for a first wireless device (wireless device 1). The base station configures second parameters for a second wireless device (wireless device 2). The first wireless device is operating a sidelink cell/carrier/BWP on a frequency on the second cell. The second wireless device is operating an uplink cell on the second cell. The sidelink cell/carrier/BWP of the first wireless device may operate in a same frequency range as the second cell. The first wireless device and the second wireless device share resources for sidelink and uplink operation respectively on the frequency of the second cell. The base station transmits a DCI comprising a pre-emption indication/cancellation indication. The DCI indicates that a first beam, wherein the first beam belongs to the one or more uplink beams, to apply the pre-emption indication/cancellation indication. The DCI is received by the first wireless device and the second wireless device. The first wireless device has scheduled a first PSSCH and a second PSSCH where the first PSSCH overlaps with time/frequency resources indicated by the pre-emption/cancellation. The first PSSCH and the second PSSCH are configured to transmit using the first beam (beam 1).

The first wireless device cancels the first PSSCH which overlaps with the resources indicated by the pre-emption indication/cancellation indication. The first wireless device transmits the second PSSCH as the second PSSCH does not overlap with resources indicated by the pre-emption indication/cancellation indication. The second wireless device is scheduled with a first PUSCH, where the first PUSCH is scheduled to transmit based on a second uplink beam (beam 2) which is not part of the one or more uplink beams. The resources indicated by the pre-emption indication/cancellation indication are shown in a box of the shared resources marked with an 'X'. The first wireless device and/or the second wireless device determine to drop or cancel a scheduled uplink or sidelink transmission based on whether the scheduled uplink or sidelink transmission overlaps with resources indicated by the pre-emption indication/cancellation indication and whether the uplink or the sidelink transmission is configured to transmit using a uplink/sidelink beam belonging to the one or more uplink beams.

In an example, a base station may operate a plurality of downlink beams. The base station may configure one or more TCI states, where a TCI state may correspond to a downlink beam. The base station may configure a first CORESET for a first wireless device. The base station may configure a first TCI state for the first CORESET. The base station may configure a second CORESET for a second wireless device. The base station may configure a second TCI state for the second CORESET. The base station may transmit a first DCI via the first CORESET. The first DCI comprises a first pre-emption indication/cancellation indication. The base station may configure one or more first uplink beams associated with the first pre-emption indication/cancellation indication. The base station may transmit a second DCI via the second CORESET. The second DCI comprises a second pre-emption indication/cancellation indication. The base station may configure one or more second uplink beams associated with the second pre-emption indication/cancellation indication. For example, the first wireless device may receive the first DCI. The second wireless device may receive the second DCI. The first wireless device may determine to drop a PUSCH based on the PUSCH overlaps with resources indicated by the first DCI and the PUSCH is transmitted with a first uplink beam, wherein the first uplink beam belongs to the one or more first uplink beams. The second wireless device may determine to drop a second PUSCH based on the second PUSCH overlaps with resources indicted by the second DCI and the second PUSCH is configured to transmit with a second uplink beam, wherein the second uplink beam belongs to the one or more second uplink beams.

In an example, a base station may configure, via RRC, MAC-CE, and/or DCI signaling, a first CORESET and a second CORESET to a first wireless device. The base station may configure, via RRC, MAC-CE, and/or DCI signaling, a first TCI state for the first CORESET. The base station may configure, via RRC, MAC-CE, and/or DCI signaling, a second TCI state for the second CORESET. The base station may configure, via RRC, MAC-CE, and/or DCI signaling, one or more first uplink beams associated with the first TCI state, the first CORESET or a first search space for a first pre-emption indication/cancellation indication via the first CORESET. The base station may configure, via RRC, MAC-CE, and/or DCI signaling, one or more second uplink beams associated with the second TCI state, the second CORESET, or a second search space for a second pre-emption indication/cancellation indication via the second CORESET. The wireless device may monitor the first pre-emption indication/cancellation indication via the first CORESET. The wireless device may monitor the second pre-emption indication/cancellation indication via the second CORESET. The wireless device may drop one or more first PUSCHs based on the first pre-emption/cancellation, wherein one or more beams of the one or more first PUSCHs are belonging to the one or more first uplink beams, and resources of the one or more first PUSCHs overlap with resources indicated by the first pre-emption indication/cancellation indication. The wireless device may drop one or more second PUSCHs based on the second pre-emption/cancellation, wherein one or more beams of the one or more second PUSCHs are belonging to the one or more second uplink beams, and resources of the one or more second PUSCHs overlap with resources indicated by the second pre-emption indication/cancellation indication.

Figure 25:
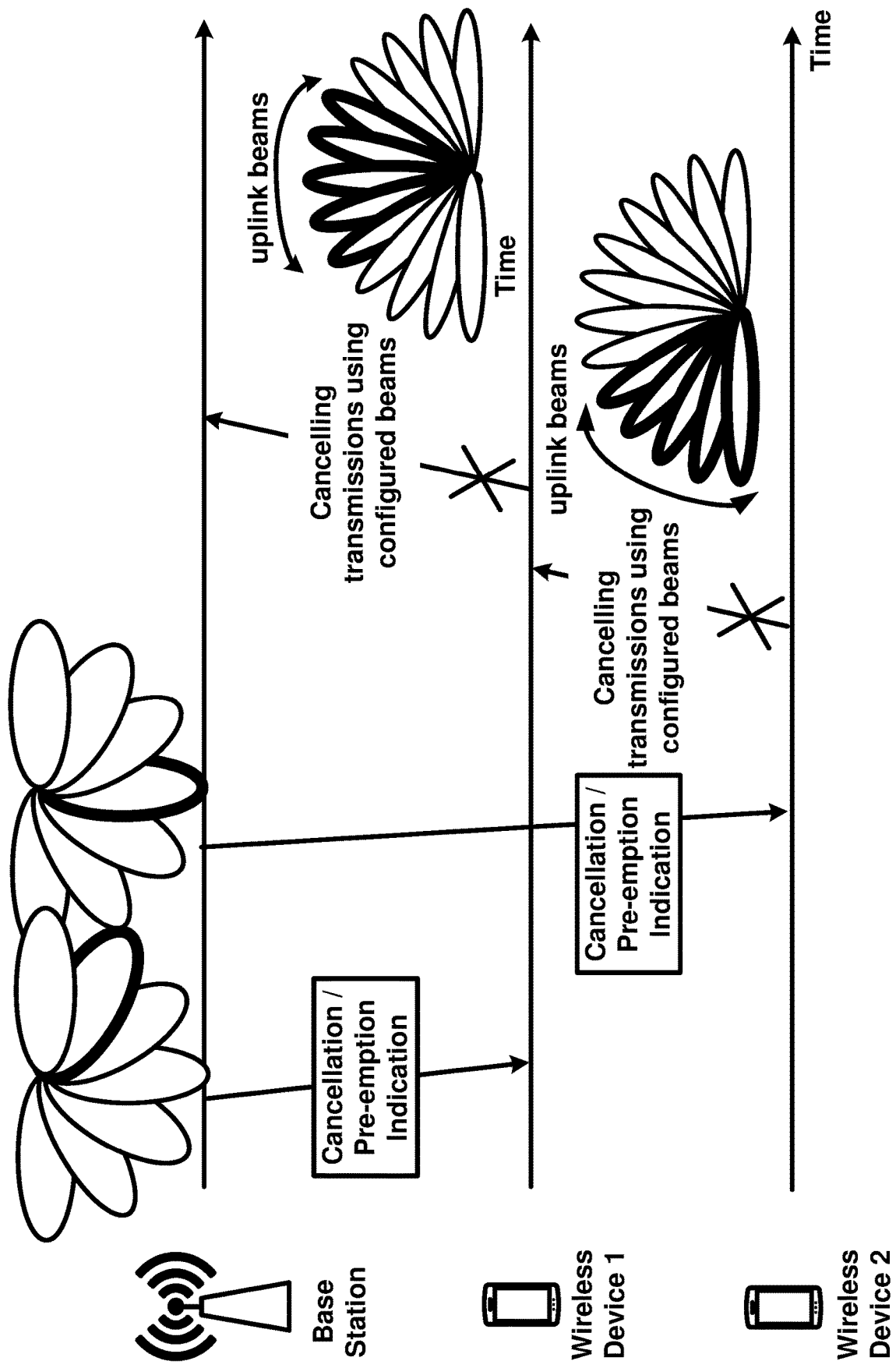
FIG. 25 illustrates an example of a multi-beam of a base station and a plurality of wireless devices.

FIG. 25 illustrates an example. A base station configures, via RRC, MAC-CE, and/or DCI signaling, a first TCI state to a first CORESET for a first wireless device (Wireless Device 1) for a first pre-emption indication/cancellation indication (PI #1). The base station configures, via RRC, MAC-CE, and/or DCI signaling, a second TCI state to a second CORESET for a second wireless device (Wireless Device 2) for a second pre-emption indication/cancellation indication (PI #2). The first wireless device is configured with one or more first uplink beams that are associated/configured with the first TCI state. The second wireless device is configured with one or more second uplink beams that are associated/configured with the second TCI state. The first wireless device, in response to receiving the first pre-emption indication/cancellation indication, cancels one or more first PUSCH transmissions, wherein the one or more first PUSCH transmissions overlap with resources indicated by the first pre-emption indication/cancellation indication and uplink beam(s) of the one or more first PUSCHs belong to the one or more first uplink beams (e.g., the one or more first uplink beams comprise the uplink beam(s)). The second wireless device, in response to receiving the second pre-emption indication/cancellation indication, cancel one or more second PUSCH transmissions, wherein the one or more second PUSCH transmissions overlap with resources indicated by the second pre-emption indication/cancellation indication and second uplink beam(s) of the one or more second PUSCHs belong to the one or more second uplink beams (e.g., the one or more second uplink beams comprise the second uplink beam(s)). In FIG. 25, the one or more first uplink beams may comprise uplink beams with index 5, 6, 7, 8, and 9 (shown in dotted ovals for the first wireless device). The one or more second uplink beams may comprise uplink beams with index 1, 2, 3, 4 and 5 for the second wireless device.

In an example, a base station may transmit one or more radio resource control (RRC) messages to a wireless device. The one or more RRC messages may comprise one or more parameters for a pre-emption indication/cancellation indication. The one or more parameters may comprise one or more CORESETs, wherein the wireless device may monitor/receive one or more DCIs for/indicating/comprising a pre-emption indication/cancellation indication for an uplink cell. The one or more parameters may comprise one or more search spaces, wherein the wireless device may monitor/receive the one or more DCIs for the pre-emption indication/cancellation indication for the uplink cell. The one or more parameters may comprise a cell index for the uplink cell. The one or more parameters may comprise a position in a DCI, which indicates the pre-emption/cancellation for the uplink cell, wherein the DCI may comprise one or more pre-emption indications/cancellation indications for one or more cells. The one or more parameters may comprise one or more uplink beams for the uplink cell. The one or more parameters may be configured for the wireless device via RRC signaling, MAC CEs and/or DCI signaling.

Figure 26:
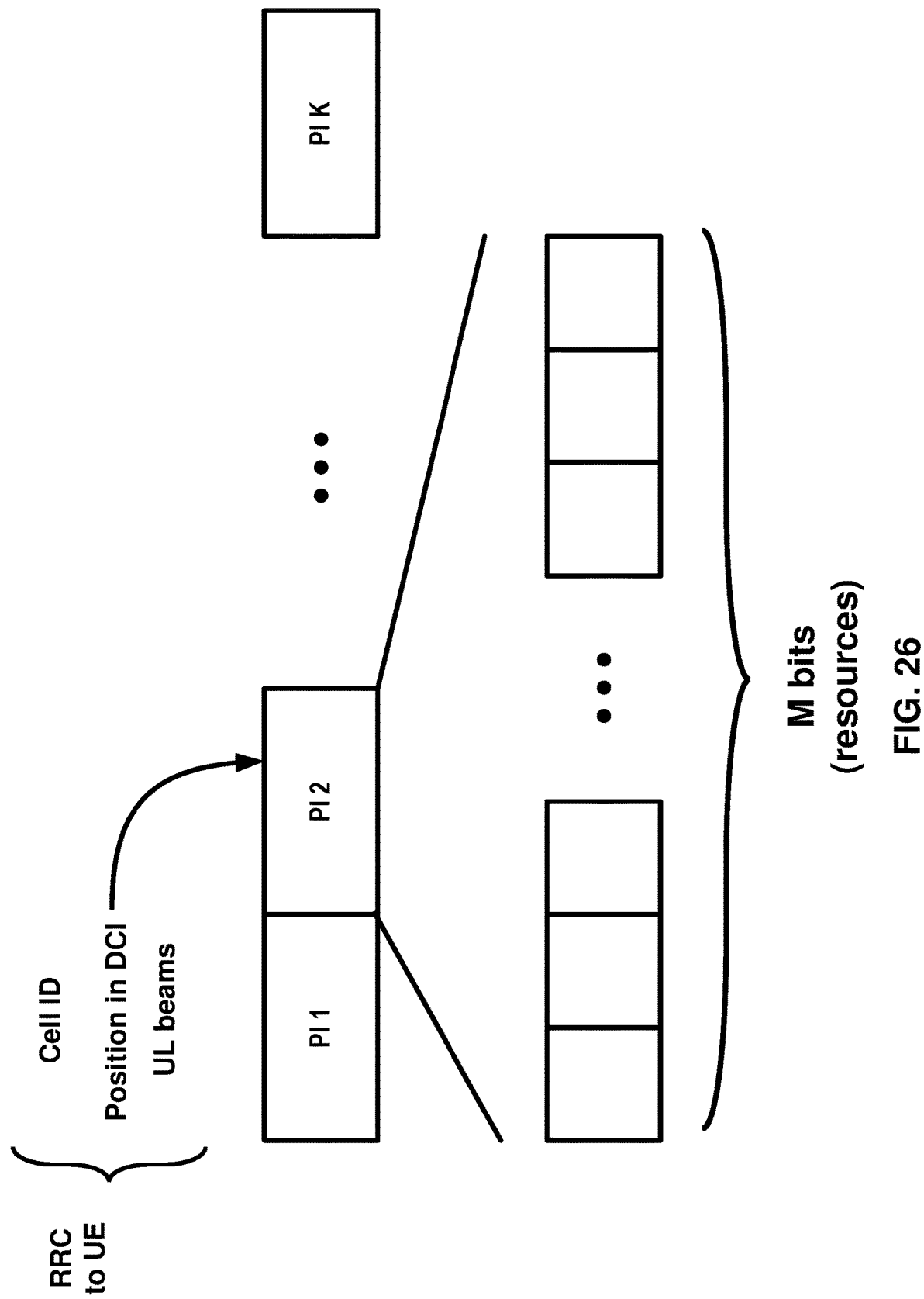
FIG. 26 illustrates an example of a DCI comprising one or more pre-emption indications.

FIG. 26 illustrates an example. A base station may transmit RRC messages. The RRC messages indicate one or more parameters. For example, the one or more parameters comprise a cell index (Cell ID), a position of a pre-emption indication/cancellation indication in a DCI (Position in DCI), and one or more uplink beams (UL beams). For example, the position of the pre-emption indication/cancellation indication in the DCI indicates a position/location/bit-index of the pre-emption indication/cancellation indication among one or more pre-emption indications/cancellation indications, wherein the DCI comprises the one or more pre-emption indications/cancellation indications. The pre-emption indication/cancellation indication comprises M bits, wherein the M bits indicate time/frequency resources for the pre-emption indication/cancellation indication for the uplink cell by the cell index. In response to receiving the DCI, the pre-emption indication/cancellation indication, the wireless device may determine whether to drop a PUSCH based on the PUSCH overlaps with the resources indicated by the pre-emption indication/cancellation indication and the PUSCH is configured to transmit with a beam belonging to the one or more uplink beams.

In an example, a base station may configure one or more parameters for a pre-emption indication/cancellation indication, such as a cell index and/or position, for the pre-emption indication/cancellation indication,
in a DCI. The base station may configure one or more sets of a downlink TCI state and one or more uplink beams associated with the downlink TCI state. The one or more sets may be configured for the pre-emption indication/cancellation indication for an uplink cell indicated by the cell index. The base station may configure a CORESET for monitoring one or more DCIs for the pre-emption indication/cancellation indication for the uplink cell. The base station may activate a TCI state for the CORESET. Based on UE mobility, the base station may change active TCI state associated with the CORESET. A wireless device may monitor a first DCI comprising the pre-emption indication/cancellation indication for the uplink cell, based on the one or more parameters for the pre-emption indication/cancellation indication. The wireless device may determine a downlink TCI state for the first DCI based on the CORESET, wherein the downlink TCI state is the active TCI state associated with the CORESET. Based on the downlink TCI state, the wireless device may determine one or more uplink beams based on the one or more sets. For example, the one or more uplink beams are configured for the downlink TCI state on the one or more sets.

Figure 27:
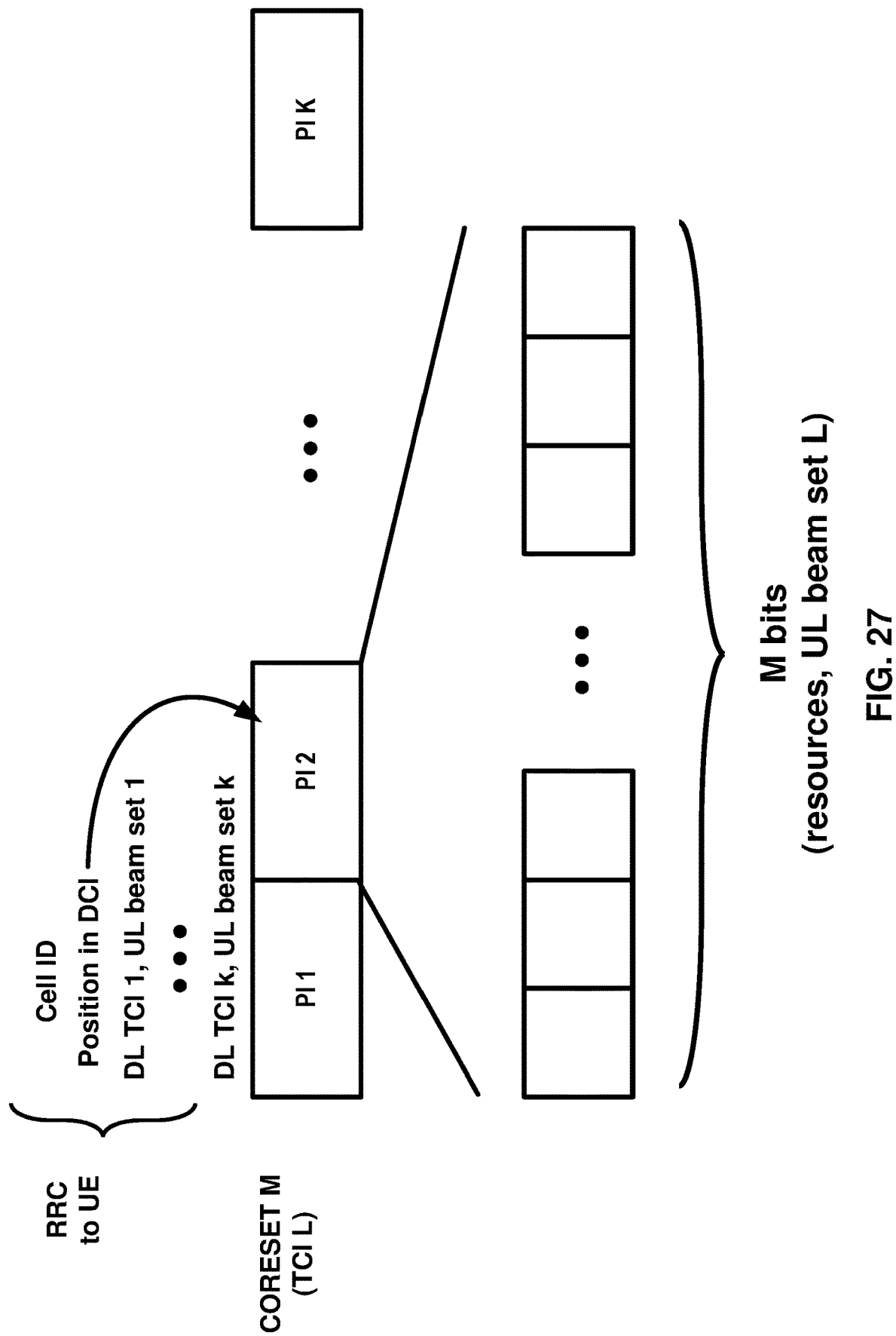
FIG. 27 illustrates an example of a DCI comprising one or more pre-emption indications.

FIG. 27 illustrates an example. A base station configures one or more parameters for a pre-emption indication/cancellation indication for an uplink cell. The one or more parameters comprise for example a cell index (Cell ID), a position of the pre-emption indication/cancellation indication in a DCI for the uplink cell, a set of {DL TCI state, one or more uplink beams}. For example, the set of {DL TCI states, one or more uplink beams} may comprise a first (DL) TCI state and one or more first uplink beams. The set may comprise a second (DL) TCI state and one or more second uplink beams, and so on. For example, the position in the DCI may be indicated as a second entry (e.g., PI 2) for the uplink cell. The pre-emption indication/cancellation indication for the uplink cell (PI2) includes M bits. Based on the CORESET where the DCI is transmitted, the wireless device determines a TCI state (TCI state L) of the CORESET, wherein the TCI state is an active TCI state of the CORESET. Based on the active TCI state of the CORESET, the wireless device determines one or more uplink beams associated/configured to be associated with the TCI state (TCL state L). For example, the base station configures {TCI state L, a first uplink beam, a second uplink beam} and {TCI state K, a third uplink beam, a fourth uplink beam}. In response to the TCI state L is an active TCI of the CORESET for the pre-emption indication/cancellation indication, the wireless device determines pre-emption/cancellation based on the first uplink beam and the second uplink beam (e.g., whether any uplink transmission is configured/scheduled with the first uplink or the second uplink beam). In response to the TCI state K is an active TCI of the CORESET for the pre-emption indication/cancellation indication, the wireless device determines pre-emption/cancellation based on the third uplink and the fourth uplink beam. The wireless device determines whether any uplink transmission is configured/scheduled to transmit using the third beam or the fourth beam in that case.

In an example, a base station may configure a first group of uplink beams (e.g., UL beam set 1) and a second group of uplink beams (e.g., UL beam set 2). The base station may indicate the first group or the second group via a pre-emption indication/cancellation indication. For example, the pre-emption indication/cancellation indication may comprise the indication of the first group only, the second group only, or the both first and second groups. For example, a TCI state associated with a CORESET, where the pre-emption indication/cancellation indication is transmitted may determine a group. For example, if the CORESET belongs to a first CORESET pool, the first group is used. If the CORESET belongs to a second CORESET pool, the second group is used. For example, for each TCI state, whether the TCI belongs to the first group only, the second group only or both groups may be configured. For example, for each CORESET, an association may be configured to the first group only, the second group only or both groups. For example, an active TCI state of the each CORESET may be associated with the first group only, the second group only or both groups.

In an example, a base station may indicate a downlink TCI state in a pre-emption indication/cancellation indication. One pre-emption indication/cancellation indication may comprise M bits for indicating time/frequency resources for pre-emption/cancellation and P bits for indicating a downlink TCI state where the pre-emption/cancellation is applied. The base station may configure a set of {DL TCI state, one or more UL beams} for a pre-emption indication/cancellation indication, wherein one pre-emption indication/cancellation indication is for a wireless device for an uplink frequency/cell or a sidelink frequency/cell. The wireless device may determine one or more uplink beams corresponding to indicated downlink TCI state. For example, the base station configures {a first DL TCI state, a first UL beam, a second UL beam} and {a second DL TCI state, a third UL beam, a fourth UL beam}. The base station may indicate the first DL state in a pre-emption indication/cancellation indication for an uplink cell. The wireless device may determine to drop a first PUSCH, wherein the first PUSCH overlaps with resources indicated by the pre-emption indication/cancellation indication and the first PUSCH is configured to transmit with the first UL beam or the second UL beam. For example, the base station may indicate the second DL state in a pre-emption indication/cancellation indication for the uplink cell. The wireless device may determine to drop a second PUSCH, wherein the second PUSCH overlaps with resources indicated by the pre-emption indication/cancellation indication and the second PUSCH is configured to transmit with the third UL beam or the fourth UL beam. In other cases, the wireless device may not drop the first PUSCH or the second PUSCH.

Figure 28:
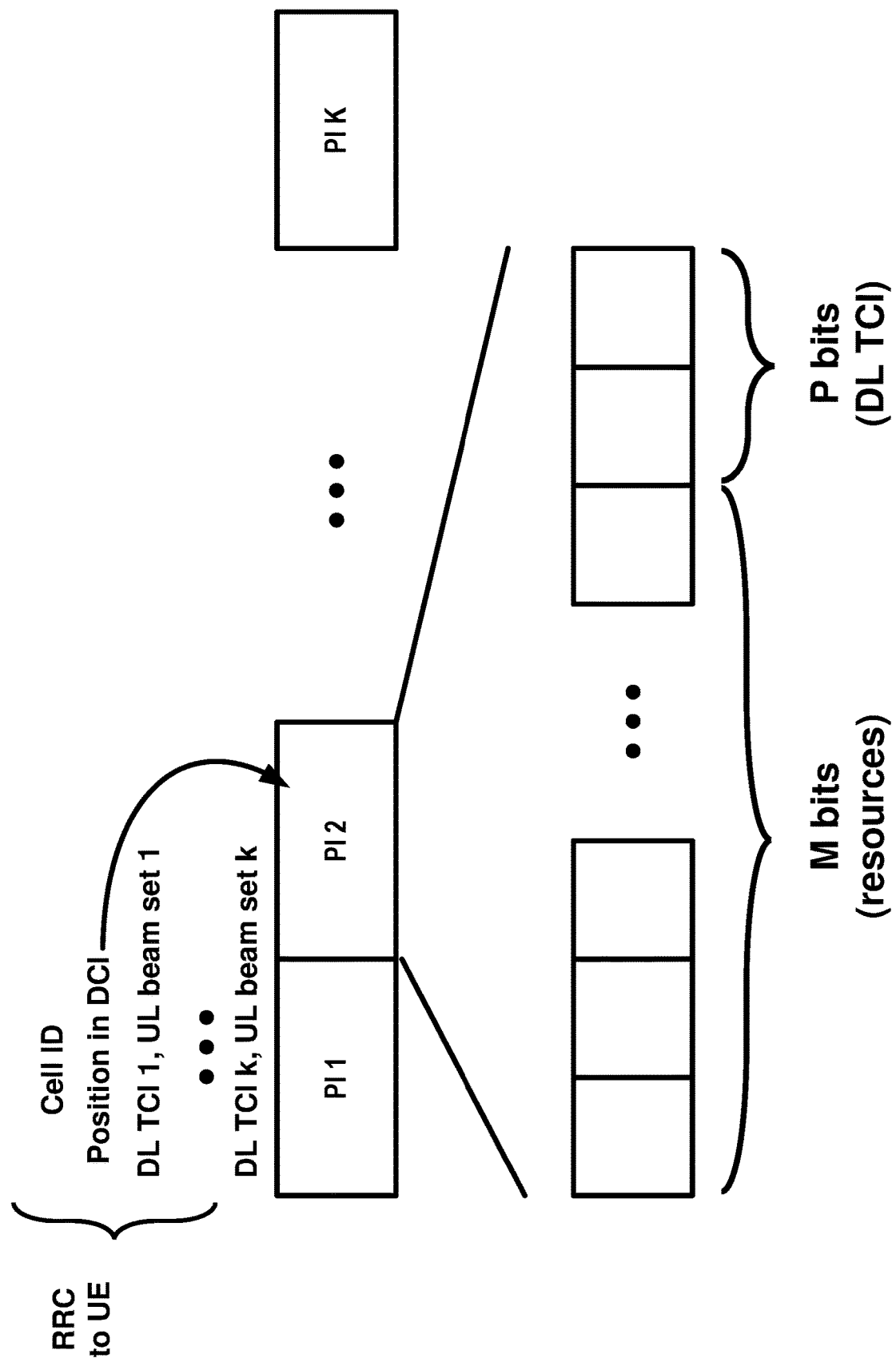
FIG. 28 illustrates a DCI comprising one or more pre-emption indications as per an aspect of an example embodiment of the present disclosure.

FIG. 28 illustrates an example of pre-emption indication/cancellation indication DCI signaling. A base station configures one or more parameters for a pre-emption indication/cancellation indication for an uplink cell to a wireless device. The one or more parameters comprise a cell index (Cell ID), a position of the pre-emption indication/cancellation indication among one or more pre-emption indication/cancellation indication carried in a DCI (Position in DCI), a set of {a DL TCI state, one or more uplink beams} (e.g., {DL TCI state 1, UL beam set 1}, {DL TCI state k, UL beam set k}). For example, UL beam set 1 may comprise a first UL beam and a second UL beam. The UL beam set k may comprise a M-th UL beam and a M+1-th UL beam. In the example, the base station may configure a UL TCI state (or a beam-corresponding DL TCI state) for a UL beam. In the example, the base station may configure a UL SRS resource for a UL beam. In the example, the base station may configure a UL SRS resource set for a UL beam. For example, in FIG. 27, the base station indicates a second PI (PI 2) as the pre-emption indication/cancellation indication for the uplink cell for the wireless device. The pre-emption indication/cancellation indication comprises M bits for indicating resources for pre-emption/cancellation wherein the wireless device applies the pre-emption/cancellation on the indicated resources. The pre-emption indication/cancellation indication comprises P bits for indicating a DL TCI state, wherein the pre-emption indication/cancellation indication is applied to one or more uplink beams configured in a same set where the set comprise the DL TCI state. For example, when the pre-emption indication/cancellation indication indicates the DL TCI state 1, the wireless device may determine the first UL beam and the second UL beam as UL beams where the pre-emption indication/cancellation indication is applied. For example, when the pre-emption indication/cancellation indication indicates the DL TCI state k, the wireless device may determine the M-th UL beam and the M+1-th UL beam as Ul beams where the pre-emption indication/cancellation indication is applied.

The base station may transmit a DCI comprising one or more pre-emption indication/cancellation indication. The wireless device determines a pre-emption indication/cancellation indication for an uplink cell based on the one or more parameters (e.g., Cell ID, Position in DCI). When the wireless device determines the pre-emption indication/cancellation indication, the wireless device determines resources and one or more uplink beams based on the pre-emption indication/cancellation indication. For example, the resources are indicated by the DCI based on a bitmap where a bit indicates a time/frequency resource (e.g., a frequency region of a slot), wherein the bitmap may comprise M time/frequency resources. A starting slot index where the bitmap is applied may be determined implicitly or explicitly. For example, the bitmap applies to a same slot where the DCI is transmitted. For example, the bitmap applies to a slot wherein the slot is a current slot+K slots, wherein the current slot is when the wireless device receives the DCI and K is an offset value configured by the network to apply the pre-emption indication/cancellation indication. The bitmap may be applied between [the current slot+K, the current slot+K+M], wherein the M is a bitmap size assuming the pre-emption/cancellation is applied to a frequency region.

In some cases, the base station may configure the frequency region where the pre-emption/cancellation is applied. The base station may divide one frequency region to N frequency blocks for the pre-emption indication/cancellation indication. The M bitmap may indicate [M/N]*N (slot/frequency block) resource blocks, wherein a resource block is a slot with a frequency block. The base station may configure N, where a default value for N may be 1. The base station may configure [M/N] or the wireless device may determine [M/N] based on a configuration of M value which is a duration or a number of slots where the pre-emption indication/cancellation indication is applied. The base station may configure S and N where S is a number of slots and N is a number of frequency blocks in the frequency region. The wireless device may determine M=S*N. The wireless device may determine P based on a number of sets configured for {DL TCI state, UL beams}. The base station may configure a number of bits (P bits) used for indicating DL TCI state. For example, the base station may indicate P=0 (e.g., no indication of DL TCI state). The wireless device may determine a TCI state of a CORESET, wherein the pre-emption indication/cancellation indication is transmitted, as the TCI state for determining corresponding UL beams of the pre-emption indication/cancellation indication.

For example, the wireless device resources based on the pre-emption/cancellation, where the bitmap of the pre-emption indication/cancellation indication indicates '1'. For example, if k-th bit of the bitmap indicates '1', k-th block of the resources is pre-empted. For example, if m-th bit of the bitmap indicates '0', m-th block of the resources is not pre-empted. The wireless device determines that a PUSCH scheduled on a slot K, where the PUSCH overlaps with any pre-empted resources based on the pre-emption indication/cancellation indication bitmap. The wireless device may not monitor the DCI comprising pre-emption indication/cancellation indication(s) when there is no scheduled uplink transmission during a duration, wherein the duration is indicated by the DCI comprising pre-emption indication/cancellation indication(s). For example, if the base station may transmits a DCI comprising one or more pre-emption indications/cancellation indications for an uplink cell for a duration of [slot k, slot k+m] and the wireless device does not have any scheduled uplink/sidelink transmission during the duration of [slot k, slot k+m] or does not have any scheduled uplink/sidelink transmission which performs pre-emption/cancellation function if there is indication during the duration of [slot k, slot k+m], the wireless device skips monitoring of the DCI. The wireless device determines a downlink TCI state for a pre-emption indication/cancellation indication when the pre-emption indication/cancellation indication is received based on monitoring a DCI comprising one or more pre-emption indications/cancellation indications. The wireless device determines one or more uplink beams corresponding to the downlink TCI state, wherein the one or more uplink beams are applied for the pre-emption indication/cancellation indication.

In an example, a wireless device is scheduled with a PSSCH, accompanied with a PSCCH. An uplink beam or a sidelink beam used for the PSCCH and PSSCH is assumed when the PSCCH and the PSSCH are scheduled on a same slot. The uplink beam or the sidelink beam for the PSCCH/PSSCH in a slot K may be indicated by another PSCCH. The another PSCCH may be transmitted before slot K, and the another PSCCH may reserve resources for the PSCCH/PSSCH. A PSCCH reserving a future resource may change an uplink/sidelink beam for transmissions via the reserved resource. For an initial PSCCH/PSSCH transmission, a wireless device may use a second uplink/sidelink beam, where the second uplink/sidelink beam is configured via RRC signaling, MAC CE signaling or DCI signaling before the initial PSCCH/PSSCH transmission. The wireless device determines an uplink/sidelink beam for a sidelink transmission. The wireless device determines to drop or transmit a sidelink transmission based on the determined uplink/sidelink beam compared to one or more uplink beams applied for a pre-emption indication/cancellation indication and whether the sidelink transmission overlaps with resources indicated by the pre-emption indication/cancellation indication.

In an example, a base station may configure one or more uplink beams for a CORESET or a CORESET pool. In the example, the base station may configure a set of one or more uplink beams for the CORESET or the CORESET pool. For example, the base station may transmit one or more RRC messages. The one or more RRC messages may indicate one or more first uplink beams/first uplink TCI states that are associated with a first coreset pool. The first coreset pool may correspond to a first TRP. The one or more RRC messages may indicate one or more second uplink beams/second uplink TCI states that are associated with a second coreset pool. The second coreset pool may correspond to a second TRP. The one or more first uplink beams/first uplink TCI states and the one or more second uplink beams/second uplink TCI states may be associated with an uplink cell that is configured for a pre-emption indication/cancellation indication. For example, the one or more first uplink beams/first uplink TCI states may comprise one or more TCI states of a first uplink panel. For example, the one or more second uplink beams/second uplink TCI states may comprise one or more TCI states of a second uplink panel. The base station may configure the set of one or more uplink beams for a downlink TCI state or a pathloss reference signal. For example, the set of one or more uplink beams may comprise one or more sets, wherein each set comprises one or more uplink beams. An uplink beam may be configured as an uplink TCI state or an SRS resource or an SRS resource set or uplink beam reference signal. A pre-emption indication/cancellation indication may comprise one or more resources for pre-emption/cancellation function. The pre-emption indication/cancellation indication may be carried via a DCI of a first CORESET. A wireless device may determine a TCI state of the first CORESET and/or a first CORESET pool of the first CORESET. Based on the determined TCI state and/or the first CORESET pool, the wireless device may determine a first set of one or more first uplink beams. For example, the base station may configure a set of one or more uplink beams for each TCI state and/or CORESET pool and/or a CORESET and/or a search space.

In an example, a wireless device may receive one or more RRC messages. The one or more RRC messages may indicate a first set of uplink TCI states for cancellation indication (CI) of a first coreset pool. The wireless device may receive a first DCI indicating an uplink resource of a PUSC with a first uplink TCI state. The wireless device may receive a second DCI comprising a CI indicating cancellation resources via the first coreset pool. For example, the wireless device may receive the second DCI via a coreset of the first corset pool. For example, the wireless device may receive the second DCI indicating a TCI state of the first coreset pool. For example, the wireless device may receive the second DCI configured with the TCI state of the first coreset pool. The wireless device may drop the PUSCH in response to the cancellation resources overlapping with the uplink resource of the PUSCH and the first set of uplink TCI states comprising the first uplink TCI state. For example, the first coreset pool may correspond to a first TRP and/or a first uplink panel.

For example, the wireless device may receive one or mor second RRC messages. The one or more second RRC messages may indicate a second set of uplink TCI states for second CIs of a second coreset pool. For example, the second coreset pool may correspond to a second TRP and/or a second uplink panel. The wireless device may receive, via the second coreset pool, a third DCI comprising a second CI indicating second cancellation resources. Based on the receiving the third DCI, the wireless device may determine not to drop the PUSCH in response to the second cancellation resources not overlapping with the uplink resources of the PUSCH or the second set of uplink TCI states not comprising the first uplink TCI state. The wireless device may receive a fourth DCI indicating a second uplink resource of a second PUSCH with a second uplink TCI state. The wireless device may determine to drop the second PUSCH in response to the second cancellation resources overlapping with the second uplink resource of the second PUSCH and the second set of uplink TCI states comprising the second uplink TCI state. The wireless device may transmit the second PUSCH in response to the second cancellation resources not overlapping with the second uplink resource of the second PUSCH or the second set of uplink TCI states not comprising the second uplink TCI state.

For example, the wireless device may determine the first set of uplink TCI states that comprise one or more TCI states or SRIs associated with the first coreset pool (e.g., a coreset pool index associated with a TCI state or an SRI being equal to an index of the first coreset pool).

The pre-emption indication/cancellation indication may also comprise an index among the set of one or more first uplink beams. For example, the set of one or more first uplink beams may comprise M sets, where each set comprises one or more uplink beams. The index may indicate the set among the M sets. The wireless device may determine the corresponding one or more uplink beams of the set among the M sets as the one or more first uplink beams corresponding to the pre-emption indication/cancellation indication. For example, the index may determine an uplink panel, where the wireless device is configured with at least a first set of uplink beams for a first uplink panel and the wireless device is configured with at least a second set of uplink beams for a second uplink panel. The pre-emption indication/cancellation indication may indicate the first uplink panel or the second uplink panel or both uplink panels for the pre-emption/cancellation. Based on the indication, the wireless device may apply the first set of uplink beams or the second set of uplink beams or both the first set of uplink beams and the second set of uplink beams.

In an example, the wireless device may acquire whether to apply a pre-emption indication/cancellation indication for a first uplink panel only, a second uplink panel only or both first and second uplink panels based on active uplink panels when the wireless device receives the pre-emption indication/cancellation indication. For example, if only the first uplink panel is active, the wireless device may determine the pre-emption indication/cancellation indication applies only for the first uplink panel. For example, if only the second uplink panel is active, the wireless device may determine the pre-emption indication/cancellation indication applies only for the second uplink panel. When both panels are active, the wireless device may apply the pre-emption indication/cancellation indication for both panels. When both panels are active, the base station may indicate whether to appl the pre-emption indication/cancellation indication the first panel only, the second panel only or both via the pre-emption indication/cancellation indication. For example, the base station may indicate whether the first panel only, the second panel only or both via the pre-emption indication/cancellation indication or via a DCI comprising the pre-emption indication/cancellation indication regardless of active panel(s) at the wireless device.

Figure 29:
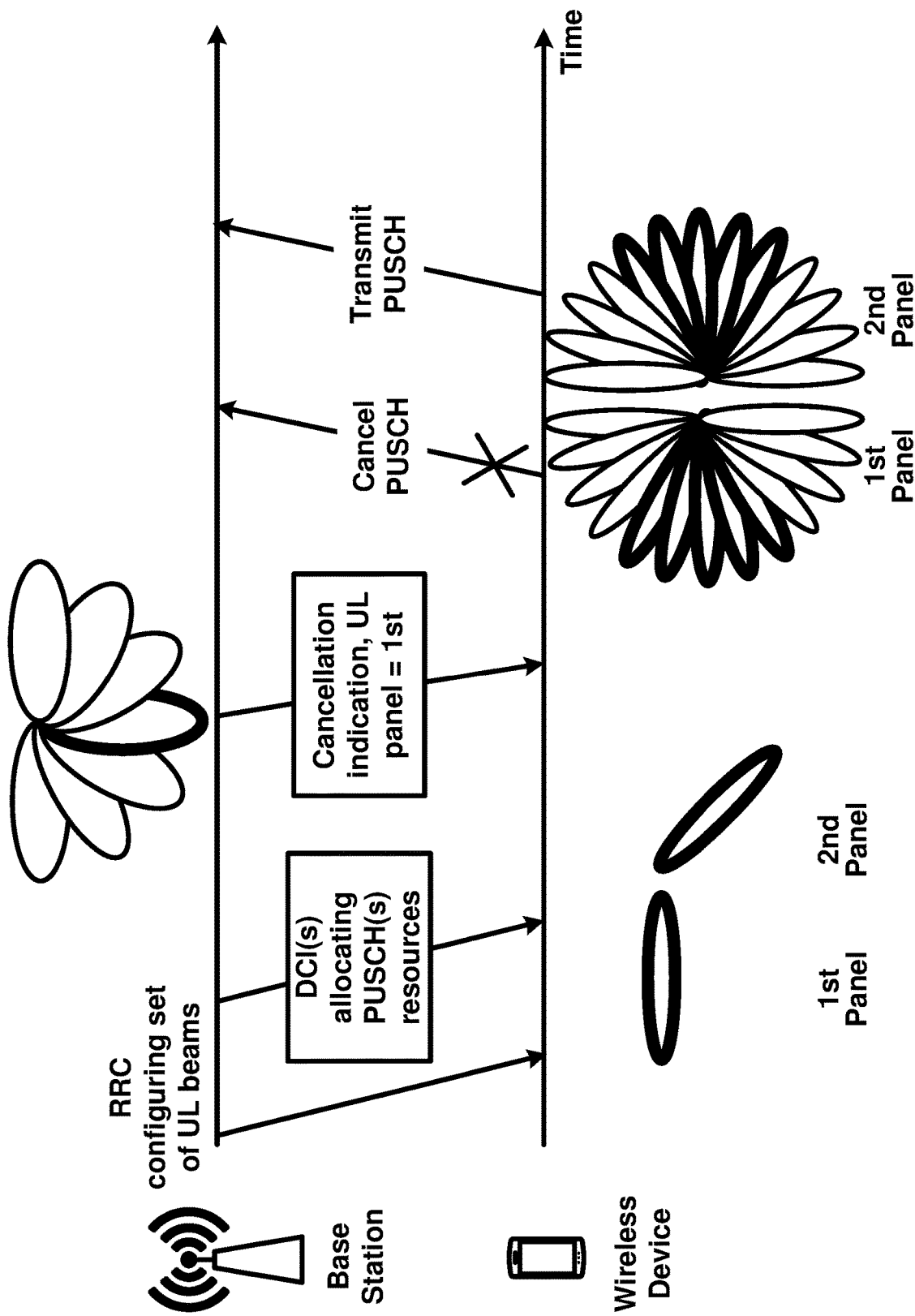
FIG. 29 illustrates an example of a multi-panel scenario.

FIG. 29 illustrates an example of multiple uplink panels. A base station may configure a set of one or more uplink beams via RRC signaling. An entry of the set may comprise one or more first uplink beams. The entry of the set may correspond to a first uplink panel or a second uplink panel. A plurality of entries of the set may correspond to the first uplink panel. A second plurality of entries of the set may correspond to the second uplink panel. In each entry, the base station may indicate the uplink panel index (e.g., the first uplink panel or the second uplink panel). For example, one or more first entries of the set may correspond to a first TRP or a first coreset pool. One or more second entries of the set may correspond to a second TRP or a second corset pool. In the example, the base station configures five uplink beams in the center (shown in dotted ovals with 1st panel) for the first panel associated with a pre-emption indication/cancellation indication for an uplink cell. For example, a plurality of beams of the first panel may be associated with a first TRP or a first coreset pool. In the example, the base station configures six uplink beams (shown in dotted ovals) in the center for the second panel associated with the pre-emption indication/cancellation indication for the uplink cell. For example, a second plurality of beams of the second panel may be associated with a second TRP or a second coreset pool. The base station schedules one or more uplink grants (DCIs) for PUSCHs via the first uplink panel and the second uplink panel. FIG. 29 shows that the wireless device receives an uplink grant of a PUSCH for the first panel with a first uplink TCI state (1st UL TCI) and a second uplink grant of a second PUSCH for the second panel with a second uplink TCI state (2nd UL TCI). The base station transmits a pre-emption indication/cancellation indication via a second DCI (pre-emption indication/cancellation indication) indicating the pre-emption/cancellation applies in the first uplink panel (e.g., UL panel=1st). The wireless device determines whether there is any uplink transmission/channel scheduled for the first uplink panel in response to receiving the second DCI. The wireless device determines whether the scheduled uplink transmission overlaps with resources indicated by the pre-emption indication/cancellation indication. In response to the determining, the wireless device determines whether an uplink beam of the scheduled uplink transmission (e.g., 1st UL TCI) belongs to one or more uplink beams of the first uplink panel configured for the pre-emption indication/cancellation indication (e.g., the one or more uplink beams of the first uplink panel comprising the first uplink TCI state, five TCI states comprising the 1st UL TCI). In response to the determining, the wireless device drops the scheduled uplink transmission. In FIG. 29, the wireless device drops a first PUSCH scheduled via the first uplink panel as the pre-emption indication/cancellation indication the first uplink panel, and the beam (1st UL TCI) of the first PUSCH belongs to the one or more first uplink beams of the first uplink panel (e.g., five uplink beams/TCI states) configured for the pre-emption indication/cancellation indication for the first uplink panel. The wireless device continues transmission of the second PUSCH scheduled via the second uplink panel as the pre-emption indication/cancellation indication is not intended for the second uplink panel. A second uplink beam (e.g., 2nd UL TCI, the second uplink TCI state) of the second PUSCH belongs to one or more second beams of the second uplink panel (e.g., the six uplink beams of the second panel) based on the configuration. As the pre-emption indication/cancellation indication is not for the second uplink panel, the wireless device may not apply the pre-emption indication/cancellation indication for the beams of the second uplink panel.

In an example, a set of one or more uplink beams may be configured for a multi-TRP scenario. For example, one or more first entries of the set may be configured for (or associated with) a first TRP and one or more second entries of the set may be configured for (or associated with) a second TRP. In an example, a set of one or more uplink beams may configured for a multi-TRP and a multi-panel scenario. For example, one or more first entries of the set are configured for a first TRP and a first panel. One or more second entries of the set are configured for the first TRP and a second panel. One or more third entries of the set are configured for a second TRP and the first panel. One or more fourth entries of the set are configured for the second TRP and the second panel. For example, one or more entries may be configured for both TRPs and/or both panels. Embodiments of the specification may be applied for different scenarios of a multi-TRP, a multi-panel and/or a combination of a multi-TRP and a multi-panel, and/or a single TRP, a single panel, and/or a combination of a single TRP and a single panel.

In an example, a pre-emption indication/cancellation indication or a DCI may indicate a TRP index (e.g., a first TRP or a second TRP, or a coreset pool index (e.g., a first coreset pool or a second coreset pool)) and/or a panel index (e.g., a first uplink panel or a second uplink panel) and/or a cell group index (e.g., a first cell group or a second cell group, a master cell group or a secondary cell group, a cell index of a plurality of cell groups). For example, the pre-emption indication/cancellation indication or the DCI may indicate an index of an entry of a set of one or more uplink beams. Based on the indication, a wireless device may determine the one or more first uplink beams, wherein the pre-emption indication/cancellation indication is applied. Embodiments allow extension of pre-emption indication/cancellation indication for a multi-panel and/or a multi-TRP and/or an inter-gNB/dual connectivity and/or a dual-stack scenario where a plurality of base stations and/or TRPs are connected to a wireless device.

In an example, a pre-emption indication/cancellation indication for an uplink cell may comprise an indication for one or more uplink beams, wherein a wireless device is expected to apply the pre-emption indication/cancellation indication for uplink transmissions configured with the one or more uplink beams. For example, the pre-emption indication/cancellation indication or a DCI comprising the pre-emption indication/cancellation indication may indicate an uplink TCI state. The wireless device may determine the one or more uplink beams, wherein an uplink beam of the one or more uplink beams is close to the indicated uplink TCI state. For example, a first PUSCH with the uplink beam may impact a second PUSCH with the uplink TCI state more than a threshold (e.g., the threshold is configured by a base station). For example, the uplink beam may be within a certain angle or range of angle from the indicated uplink TCI state. For example, the uplink beam is configured to a same uplink panel as to the uplink TCI state.

For example, the uplink beam belongs to a first uplink panel and the uplink TCI state is associated with the first uplink panel. For example, the uplink beam is configured to a same coreset pool or a TRP as to the uplink TCI state. For example, the uplink beam is associated with a first coreset pool or TRP and the uplink TCI state is associated with the first coreset pool or TRP. An uplink beam or a uplink TCI may be associated with a coreset pool or a TRP based on one or more conditions/rules. For example, an index associated with the uplink TCI state or the uplink beam may indicate an index of a coreset pool of the TRP. For example, the uplink TCI state or the uplink beam may be associated with an uplink panel that is associated with the TRP. For example, a resource associated with the uplink TCI state or the uplink beam may be configured with an index of the coreset pool or the TRP. For example, the uplink TCI state or the uplink beam may be associated with an SRS resource set of the coreset pool or the TRP. For example, when the resource associated with the uplink TCI state or the uplink beam may be configured with an SRS resource set with a set index=0 (first predefined value) (e.g., first SRS resource set), the uplink TCI state or the uplink beam is associated with a coreset pool or TRP with index=0 (first predefined value) (e.g., first TRPP or first corset pool). For example, when the resource associated with the uplink TCI state or the uplink beam may be configured with an SRS resource set with a set index=1 (second predefined value) (e.g., second SRS resource set), the uplink TCI state or the uplink beam is associated with a coreset pool or TRP with index=1 (second predefined value) (e.g., second TRPP or second corset pool).

For example, the uplink beam is active and the indicated uplink TCI state is active (e.g., the uplink beam and the uplink TCI state belong to one or more active uplink beams). The uplink beam may be configured based on an uplink TCI state, an SRS resource or an SRS resource set. The uplink TCI state may be configured as an uplink TCI state, an SRS resource or an SRS resource set.

For example, the base station may configure one or more uplink TCI states for the pre-emption indication/cancellation indication of the uplink cell. The base station may indicate, via a pre-emption indication/cancellation indication or via RRC signaling, an index to indicate an uplink TCI from the one or more uplink TCI states. The wireless device may determine whether the indicated uplink TCI state is currently active. When the uplink TCI state is currently active, the wireless device applies the pre-emption indication/cancellation indication for one or more active uplink beams. When the uplink TCI state is not currently active (e.g., the uplink TCI state has not been activated by the base station or by the wireless device), the wireless device may not apply the pre-emption indication/cancellation indication. When the wireless device does not apply the pre-emption indication/cancellation indication, the wireless device continues transmission of one or more uplink channels/transmissions. For example, a base station may activate, based on one or more MAC CEs, one or more active uplink TCI states from the one or more uplink TCI states. When a pre-emption indication/cancellation indication indicates a uplink TCI state of the one or more active uplink TCI states, the wireless device may determine to drop one or more PUSCH overlapping with resources indicated by the pre-emption indication/cancellation indication. Otherwise, the wireless device may not drop the one or more PUSCHs.

For example, the wireless device may be configured with one or more first uplink TCI states associated with a first uplink panel and/or a first TRP/coreset pool. The wireless device may be configured with one or more second uplink TCI state associated with a second uplink panel and/or a second TRP/coreset pool. The base station may transmit a DCI indicating a pre-emption indication/cancellation indication with a UL TCI state or a DL TCI state. The wireless device may determine a TCI state based on the DCI. For example, the wireless device may determine the TCI state based on a TCI state of a coreset where the wireless device receives the DCI. The wireless device may determine a TCI state based on an indication by the DCI. The wireless device may receive one or more MAC CEs activating one or more first active uplink TCI states of the one or more first uplink TCI states. The wireless device may determine whether the one or more first active uplink TCI states comprises the TCI state. In response to the one or more first active uplink TCI states comprising the TCI state, the wireless device may drop one or more PUSCHs in response to the one or more PUSCHs being configured/scheduled with one or more TCI states of the one or more first active uplink TCI states and overlapping with resources indicated by the pre-emption indication/cancellation indication.

In an example, a wireless device is configured with a first TRP and a second TRP (e.g., a first CORESET pool and a second CORESET pool). In response to receiving a DCI comprising a pre-emption indication/cancellation indication for an uplink cell, the wireless device may determine whether the DCI comes from the first CORESET pool or the second CORESET pool. When the DCI is transmitted via the first CORESET pool (e.g., is transmitted via a first coreset of the first coreset pool), the wireless device may apply the pre-emption indication/cancellation indication based on one or more first uplink TCI states associated with the first TRP/the first CORESET pool When the DCI is transmitted via the second CORESET pool (e.g., is transmitted via a second coreset of the second coreset pool), the wireless device may apply the pre-emption indication/cancellation indication based on one or more second uplink TCI states associated with the second TRP/the second CORESET pool.

An uplink TCI state is associated with the first CORESET pool or the first TRP, wherein the uplink TCI state is configured with a CORESET pool index of '0' (or a value indicating the first CORESET pool) indicating the first TRP. Similarly, a second uplink TCI is associated with the second TRP or the second CORESET pool, wherein the second uplink TCI state is configured with a CORESET pool index of '1' (or a value indicating the second CORESET pool).

In an example, a base station may configure a set of {a UL TCI state (or a beam-corresponding DL TCI state), one or more UL beams} for a pre-emption indication/cancellation indication for an uplink cell. The base station may indicate one index to indicate an entry from the set with the pre-emption indication/cancellation indication. The pre-emption indication/cancellation indication indicates the UL TCI state (or the beam-corresponding DL TCI state). A wireless device may apply the pre-emption indication/cancellation indication for corresponding one or more UL beams associated/configured with the indicated UL TCI state (or the beam-corresponding DL TCI state).

Figure 30:
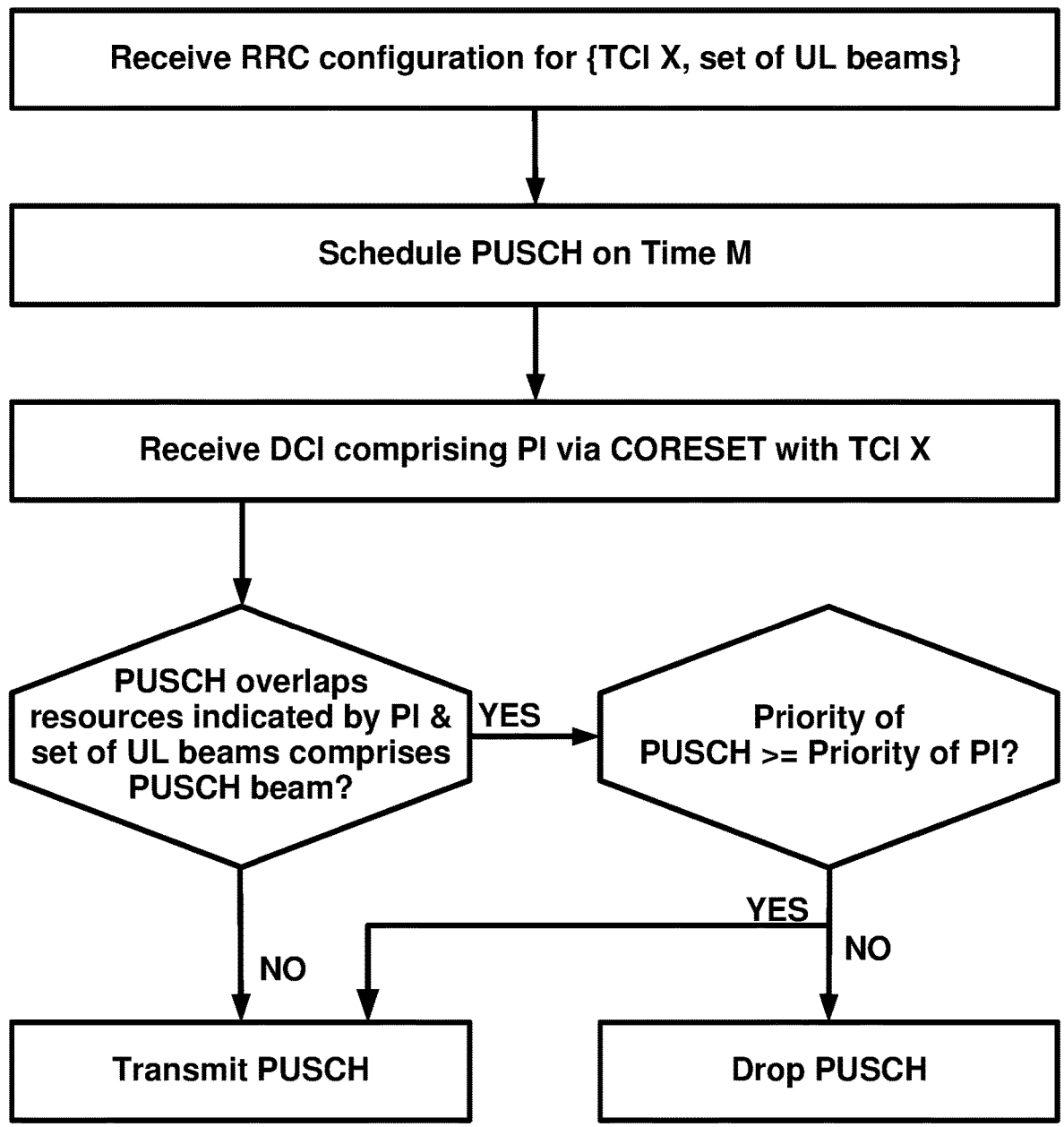
FIG. 30 illustrates an example flow diagram of an embodiment.

FIG. 30 illustrates a flow chart of embodiments. A wireless device receives one or more RRC configuration parameters for supporting pre-emption/cancellation function. The one or more RRC configuration parameters comprise one or more CORESETs to monitor a DCI comprising a pre-emption indication/cancellation indication, one or more search spaces to monitor the DCI, a position in the DCI to indicate the pre-emption indication/cancellation indication, a cell index for an uplink cell or a sidelink cell for the pre-emption indication/cancellation indication, and one or more uplink beams associated with the pre-emption indication/cancellation indication for the uplink cell or the sidelink cell. The wireless device receives a scheduled PUSCH via a first DCI at a time m (e.g., slot m). The wireless device receives a second DCI comprising one or more pre-emption indications/cancellation indications. The wireless device determines a first pre-emption indication/cancellation indication for the uplink cell or the sidelink cell, wherein the one or more pre-emption indications/cancellation indications comprise the first pre-emption indication/cancellation indication.

In some cases, the first pre-emption/cancellation comprises one or more resources to be pre-empted on the uplink cell or on the sidelink cell. The wireless device determines whether the scheduled PUSCH overlaps with the one or more resources partially or fully. When the PUSCH overlaps with the one or more resources, the wireless device determines whether the PUSCH is configured to transmit with an uplink beam (or an uplink TCI state, or an uplink spatial domain filter parameter), wherein the one or more uplink beams configured for the pre-emption indication/cancellation indication comprises the uplink beam. Based on the determining, the wireless device determines that the PUSCH may be pre-empted depending on a prioritization. The wireless device determines a priority of the PUSCH compared to the pre-emption indication/cancellation indication.

When the priority of the PUSCH is higher than or equal to the priority of the pre-emption indication/cancellation indication or the priority of the PUSCH is high or the priority of the PUSCH is not configured to be pre-empted by a pre-emption indication/cancellation indication, or the PUSCH is for URLLC/V2X traffic, the wireless device determines to transmit the PUSCH. When the priority of the PUSCH is lower than the priority of the pre-emption indication/cancellation indication or the priority of the PUSCH is low or the priority of the PUSCH is configured to be pre-empted in response to the pre-emption indication/cancellation indication or the PUSCH is for eMBB traffic, the wireless device drops, based on the determining, the PUSCH. When the determining is negative (e.g., no overlap with the one or more resources or the UL beam does not belong to the one or more uplink beams), the wireless device transmits the PUSCH. The priority of the PUSCH may be indicated by an uplink grant scheduling the PUSCH or may be indicated by a RRC signaling for a configured grant configuration scheduling resource(s) for the PUSCH.

Figure 31:
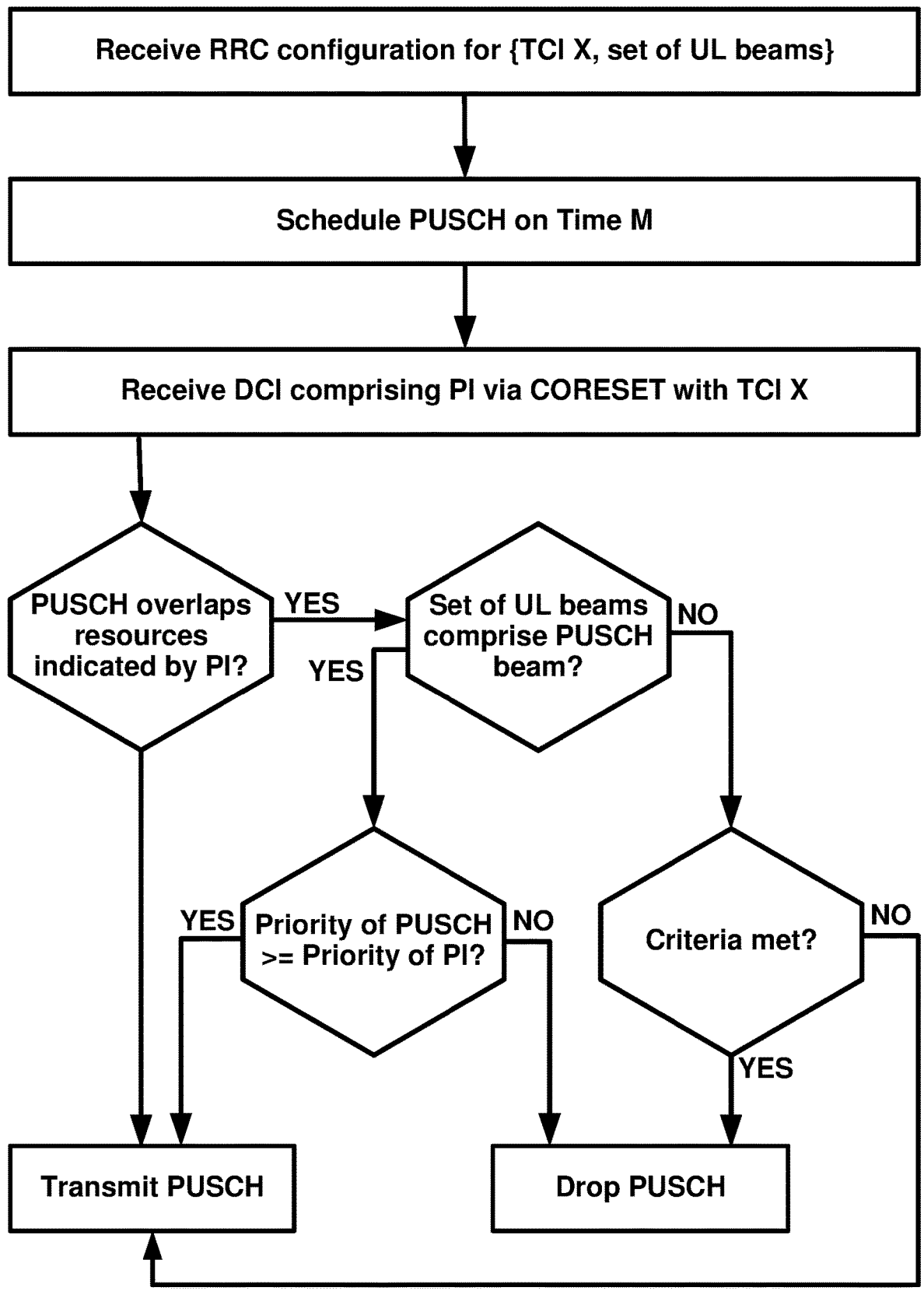
FIG. 31 is a flow diagram of an aspect of an example embodiment of the present disclosure.

FIG. 31 illustrates a flow chart for embodiments. A wireless device receives RRC configuration parameters. The RRC configuration parameters comprise one or more CORESETs to monitor a DCI comprising a pre-emption indication/cancellation indication, one or more search spaces to monitor the DCI, a position in the DCI to indicate the pre-emption indication/cancellation indication, a cell index for an uplink cell or a sidelink cell for the pre-emption indication/cancellation indication, and a set of {a downlink TCI state, one or more uplink beams associated with the downlink TCI state for the uplink cell or the sidelink cell}. The wireless device receives a scheduled PUSCH via a first DCI at a time m (e.g., slot m). The wireless device receives a second DCI comprising one or more pre-emption indications/cancellation indications. The wireless device determines a first pre-emption indication/cancellation indication for the uplink cell or the sidelink cell, wherein the one or more pre-emption indications/cancellation indications comprise the first pre-emption indication/cancellation indication.

In some cases, the first pre-emption/cancellation comprises one or more resources to be pre-empted on the uplink cell or on the sidelink cell. The wireless device determines whether the scheduled PUSCH overlaps with the one or more resources partially or fully. When the PUSCH overlaps with the one or more resources, the wireless device determines a downlink TCI state of the pre-emption indication/cancellation indication. For example, the downlink TCI state is transmitted with the pre-emption indication (e.g., the pre-emption indication/cancellation indication comprises an index of the downlink TCI state or a set index of sets of {a downlink TCI state, one or more uplink beams}, an index to indicate one or more uplink beams). For example, the downlink TCI state is determined based on an active TCI state of a CORESET, wherein the wireless device receives the second DCI via the CORESET. Based on the determined downlink TCI state and the RRC configuration parameters, the wireless device determines corresponding one or more second uplink beams.

The wireless device determines whether the PUSCH is configured to transmit with an uplink beam, wherein the one or more second uplink beams comprises the uplink beam. Based on the determining, the wireless device determines that the PUSCH may be pre-empted depending on a prioritization. The wireless device determines a priority of the PUSCH compared to the pre-emption indication/cancellation indication. If the priority of the PUSCH is higher than or equal to the priority of the pre-emption indication/cancellation indication or the priority of the PUSCH is high or the priority of the PUSCH is not configured to be pre-empted by a pre-emption indication/cancellation indication, or the PUSCH is for URLLC/V2X traffic, the wireless device determines to transmit the PUSCH. When the priority of the PUSCH is lower than the priority of the pre-emption indication/cancellation indication or the priority of the PUSCH is low or the priority of the PUSCH is configured to be pre-empted in response to the pre-emption indication/cancellation indication or the PUSCH is for eMBB traffic, the wireless device drops, based on the determining, the PUSCH. When the determining is negative (e.g., no overlap with the one or more resources or the UL beam does not belong to the one or more second uplink beams), the wireless device transmits the PUSCH.

For example, when the first uplink beam does not belong to the one or more second uplink beams, the wireless device may further determine whether a criterion is met. If the criterion is met, the wireless device still drops the PUSCH. For example, the criteria may comprise that a RSRP is greater than or equal to a RSRP threshold (configured by the base station). For example, the criteria may comprise that the first uplink beam is a near beam to one or more second uplink beams. For example, an angle difference between the first uplink beam and a second uplink beam from the one or more second uplink beams is smaller than or equal to an angle threshold, the wireless device determines that the criteria is being met. For example, the criteria may be determined based on a potential gain or a potential impact of the first uplink beam on the second uplink beam of the one or more second uplink beams. If the potential gain or the potential impact is greater than or equal to a certain threshold, the wireless device determines that the criteria is being met.

In embodiments, an uplink beam may indicate a sidelink beam. In embodiments, uplink and sidelink may be interchangeably used. In embodiments, a pathloss reference signal may be replaced for a downlink TCI state. In embodiments, a downlink TCI state may comprise one or more TCI states or one or more pathloss reference signals. At least some embodiments of the specification may be applied for pre-emption indication of a downlink cell/carrier.

In an example, a wireless device may receive one or more radio resource control (RRC) messages. The one or more RRC messages may comprise a parameter of a pre-emption indication/cancellation indication radio network temporary identifier (PI-RNTI) for a downlink control information (DCI). The DCI may notify a pre-emption indication/cancellation indication. The one or more RRC messages may comprise one or more parameters. The one or more parameters may comprise a location parameter for receiving the pre-emption indication/cancellation indication for the wireless device. The one or more parameters may comprise an index of an uplink cell, wherein the pre-emption indication/cancellation indication applies on the uplink cell. The one or more parameters may comprise one or more spatial filter parameters indicating one or more spatial filters for applying the pre-emption indication/cancellation indication for the uplink cell. The wireless device may receive a first DCI. The first DCI may comprise an uplink resource of a PUSCH. The PUSCH may be configured with a first spatial filter. For example, the first DCI may comprise a resource assignment for one or more sidelink transmissions (e.g., PSCCH/PSSCH). The one or more sidelink transmissions may be configured with the first spatial filter. For example, the first DCI may comprise an indication to request an uplink transmission such as PUCCH, SRS, or CSI feedback. The uplink transmission may be configured with the first spatial filter. The wireless device, based on the PI-RNTI, may receive a second DCI comprising a plurality of blocks. The location parameter may indicate a location of a block of the plurality of blocks. The block may comprise a pre-emption indication/cancellation indication for pre-empting resources for the uplink cell. The wireless device may determine to drop the PUSCH based on the uplink resource of the PUSCH is overlapping with the resources indicated by the PI for the uplink cell, a transmission control information (TCI) state indicated by the second DCI, and the one or more spatial filters comprise the first spatial filter. Based on the determining, the wireless device may drop the PUSCH.

In some examples, the wireless device may determine the first spatial filter based on a sounding reference signal (SRS) resource index (SRI) indicated in the first DCI. The wireless device may determine the first spatial filter based on an uplink TCI (UL TCI) state index indicated in the first DCI. The wireless device may determine the first spatial filter based on a lowest SRI among one or more configured SRS resources for PUSCH transmissions, wherein the first DCI does not comprise an SRI. For example, the wireless device may determine the first spatial filter based on an index of a lowest UL TCI state (or a lowest beam-corresponding DL TCI state) among one or more configured UL TCI states (or beam-corresponding DL TCI states) for PUSCH transmissions. For example, the first DCI may not comprise an UL TCI state (or a beam-corresponding DL TCI state).

In some cases, the one or more spatial filter parameters for applying the PI may be configured via one or more SRS resources. The one or more spatial filter parameters for applying the PI may be configured via one or more UL TCI states (or one or more beam-corresponding DL TCI states).

In some examples, the second DCI is a group-common DCI, where the second DCI is transmitted to one or more wireless devices.

For example, the PI comprises a bitmap indicating one or more frequency sub-blocks. A frequency sub-block of the one or more frequency sub-blocks comprises one or more resource blocks during one or more OFDM symbols. For example, the one or more OFDM symbols comprise 14 OFDM symbols with a normal cyclic prefix and 12 OFDM symbols with an extended cyclic prefix (e.g., a slot). The one or more RRC messages further comprise a first parameter of a size of the bitmap for the PI. The size of the bitmap is a number of the one or more frequency sub-blocks. The one or more RRC messages may comprise a second parameter of a frequency region or a size of the one or more resource blocks of the frequency sub-block. For example, the frequency region or the size of the one or more resource blocks of the frequency sub-block is equal to one or more second resource blocks of an active uplink bandwidth part of the uplink cell. The frequency region or the size of the one or more resource blocks of the frequency sub-block is equal to one or more third resource blocks of an active sidelink bandwidth part of the sidelink cell. The one or more RRC messages comprise a third parameter of one or more third resource blocks, wherein the PI is applied over the one or more third resource blocks.

For example, the one or more RRC messages comprise parameters of one or more second spatial filter parameters for the uplink cell. The one or more second spatial filter parameters may comprise the one or more first spatial filter parameters. The wireless device may determine the one or more first spatial filter parameters from the one or more second spatial filter parameters, wherein a second spatial filter of the one or more first spatial filter parameters is activated. The second spatial filter is activated by the base station or the wireless device. The second DCI may comprise the TCI state information. The TCI state indicated by the second DCI is determined based on a second TCI state activated with a CORESET, where the second DCI is transmitted via the CORESET. The wireless device may determine the one or more first spatial filter parameters comprise the TCI state indicated by the second DCI. In response to the determining, the wireless device may drop the PUSCH, wherein the PUSCH overlaps with the resources indicated by the PI. In the example, a first priority of the PUSCH is lower than a second priority of the PI. The second priority of the PI is a high priority. The second priority of the PI is configured with a priority assigned to a URLLC service.

In an example, a wireless device may receive one or more radio resource control (RRC) messages. The one or more RRC messages may comprise a parameter of a pre-emption indication/cancellation indication radio network temporary identifier (PI-RNTI) for a downlink control information (DCI). The DCI may notify a pre-emption indication/cancellation indication. The one or more RRC messages may comprise one or more parameters. The one or more parameters may comprise a location parameter for receiving the pre-emption indication/cancellation indication for the wireless device. The one or more parameters may comprise an index of an uplink cell, wherein the pre-emption indication/cancellation indication applies on the uplink cell. The one or more parameters may comprise one or more set of parameters, wherein one set of parameters comprise a second spatial filter parameter and one or more second spatial filter parameters indicating the one or more second spatial parameters for applying the PI for the uplink cell. The wireless device may receive a first DCI. The first DCI may comprise an uplink resource of a PUSCH. The PUSCH may be configured with a first spatial filter. For example, the first DCI may comprise a resource assignment for one or more sidelink transmissions (e.g., PSCCH/PSSCH). The one or more sidelink transmissions may be configured with the first spatial filter. For example, the first DCI may comprise an indication to request an uplink transmission such as PUCCH, SRS, or CSI feedback. The uplink transmission may be configured with the first spatial filter. The wireless device, based on the PI-RNTI, may receive a second DCI comprising a plurality of blocks. The location parameter may indicate a location of a block of the plurality of blocks. The block may comprise a pre-emption indication/cancellation indication for pre-empting resources for the uplink cell. The wireless device may determine one or more spatial filters based on a transmission control information (TCI) state indicated by the second DCI and the one or more set of parameters. The wireless device may determine to drop the PUSCH based on the resources indicated by the PI are overlapping with the uplink resource of the PUSCH for the uplink cell, a transmission control information (TCI) state indicated by the second DCI, and the one or more spatial filters comprise the first spatial filter. Based on the determining, the wireless device may drop the PUSCH.

For example, the wireless device may determine the one or more spatial filters from the one or more set of parameters, wherein the TCI state is configured to an entry of the set of parameters as the second spatial filter parameter.

In an example, a wireless device may receive one or more radio resource control (RRC) messages. The one or more RRC messages may comprise a parameter of a pre-emption indication/cancellation indication radio network temporary identifier (PI-RNTI) for a downlink control information (DCI). The DCI may notify a pre-emption indication/cancellation indication. The one or more RRC messages may comprise one or more parameters. The one or more parameters may comprise a location parameter for receiving the pre-emption indication/cancellation indication for the wireless device. The one or more parameters may comprise an index of an uplink cell, wherein the pre-emption indication/cancellation indication applies on the uplink cell. The one or more parameters may comprise one or more first spatial filter parameters indicating one or more spatial filters for the uplink cell. The wireless device may receive a command indicating to activate one or more second spatial filters, wherein the one or more first spatial filters comprise the one or more second filters. The wireless device may receive a first DCI. The first DCI may comprise an uplink resource of a PUSCH. The PUSCH may be configured with a first spatial filter. For example, the first DCI may comprise a resource assignment for one or more sidelink transmissions (e.g., PSCCH/PSSCH). The one or more sidelink transmissions may be configured with the first spatial filter. For example, the first DCI may comprise an indication to request an uplink transmission such as PUCCH, SRS, or CSI feedback. The uplink transmission may be configured with the first spatial filter. The wireless device, based on the PI-RNTI, may receive a second DCI comprising a plurality of blocks. The location parameter may indicate a location of a block of the plurality of blocks. The block may comprise a pre-emption indication/cancellation indication for pre-empting resources for the uplink cell. The block may comprise a parameter indicating a second spatial filter. The wireless device may determine to drop the PUSCH based on the resources indicated by the PI are overlapping with the uplink resource of the PUSCH for the uplink cell and the one or more second spatial filters comprise the second spatial filter indicated by the block of the second DCI. Based on the determining, the wireless device may drop the PUSCH.

In an example, a wireless device may receive one or more radio resource control (RRC) messages. The one or more RRC messages may comprise a parameter of a pre-emption indication/cancellation indication radio network temporary identifier (PI-RNTI) for a downlink control information (DCI). The DCI may notify a pre-emption indication/cancellation indication. The one or more RRC messages may comprise one or more parameters. The one or more parameters may comprise a location parameter for receiving the pre-emption indication/cancellation indication for the wireless device. The one or more parameters may comprise an index of a sidelink cell, wherein the pre-emption indication/cancellation indication applies on the sidelink cell. The one or more parameters may comprise one or more spatial filter parameters indicating one or more spatial filters for applying the pre-emption indication/cancellation indication for the sidelink cell. The wireless device may receive a first DCI. The first DCI may comprise a sidelink resource of a sidelink transmission. The wireless device may select the sidelink resource of the sidelink transmission. The sidelink transmission may be configured with a first spatial filter. The wireless device, based on the PI-RNTI, may receive a second DCI comprising a plurality of blocks. The location parameter may indicate a location of a block of the plurality of blocks. The block may comprise a pre-emption indication/cancellation indication for pre-empting resources for the uplink cell. The wireless device may determine to drop the PUSCH based on the sidelink resource is overlapping with the resources for the uplink cell indicated by the PI and the one or more spatial filters comprise the first spatial filter. Based on the determining, the wireless device may drop the sidelink transmission.

What is claimed is:
1. A method comprising:
  receiving, by a wireless device, one or more radio resource control (RRC) messages indicating uplink transmission configuration indicator (TCI) states associated with cancellation indications (CIs);
  receiving a first DCI scheduling a transmission via uplink resources and indicating a first uplink TCI state;

receiving a second DCI comprising a cancellation indication (CI) indicating cancellation resources that overlaps with the uplink resources; and dropping the scheduled transmission via the uplink resources before the scheduled transmission is performed, in response to the uplink TCI states comprising the first uplink TCI state.

2. The method of claim 1, wherein the one or more RRC messages indicate that the uplink TCI states are associated with a first control resource set (coreset) pool of a transmission and reception point (TRP).

3. The method of claim 2, wherein the second DCI is received via a coreset of the first coreset pool.

4. The method of claim 3, wherein:
the one or more RRC messages are one or more first RRC messages;
the uplink TCI states are first TCI states;
the CIs are first CIs; and
the method further comprises receiving one or more second RRC messages indicating second uplink TCI states for second CIs of a second coreset pool.

5. The method of claim 4, wherein:
the CI included in the second DCI is a first CI;
the cancellation resources indicated by the first CI are first cancellation resources; and
the method further comprises receiving, via the second coreset pool, a third DCI comprising a second CI indicating second cancellation resources that overlaps with the uplink resources.

6. The method of claim 5, further comprising determining, based on the third DCI, not to drop the scheduled transmission in response to the second uplink TCI states not comprising the first uplink TCI state.

7. The method of claim 6, wherein the second DCI indicates a downlink TCI state for the first CI.

8. The method of claim 7, further comprising determining the uplink TCI states based on the downlink TCI state of the second DCI.

9. The method of claim 8, wherein:
the downlink TCI state is a TCI state of the coreset of the first coreset pool; and
the wireless device receives the second DCI via the coreset of the first coreset pool.

10. The method of claim 9, wherein the uplink TCI states are associated with the first coreset pool.

11. A wireless device comprising:
one or more processors; and
memory storing instructions that, when executed by the one or more processors, cause the wireless device to:
receive one or more radio resource control (RRC) messages indicating uplink transmission configuration indicator (TCI) states associated with cancellation indications (CIs);
receive a first DCI scheduling a transmission via uplink resources and indicating a first uplink TCI state;
receive a second DCI comprising a cancellation indication (CI) indicating cancellation resources that overlaps with the uplink resources; and
drop the scheduled transmission via the uplink resources before the scheduled transmission is performed, in response to the uplink TCI states comprising the first uplink TCI state.

12. The wireless device of claim 11, wherein the one or more RRC messages indicate that the uplink TCI states are associated with a first control resource set (coreset) pool of a transmission and reception point (TRP).

13. The wireless device of claim 12, wherein the second DCI is received via a coreset of the first coreset pool.

14. The wireless device of claim 13, wherein:
the one or more RRC messages are one or more first RRC messages;
the uplink TCI states are first TCI states;
the CIs are first CIs; and
the instructions, when executed by the one or more processors, further cause the wireless device to receive one or more second RRC messages indicating second uplink TCI states for second CIs of a second coreset pool.

15. The wireless device of claim 14, wherein:
the CI included in the second DCI is a first CI;
the cancellation resources indicated by the first CI are first cancellation resources; and
the instructions, when executed by the one or more processors, further cause the wireless device to receive, via the second coreset pool, a third DCI comprising a second CI indicating second cancellation resources that overlaps with the uplink resources.

16. The wireless device of claim 15, wherein the instructions, when executed by the one or more processors, further cause the wireless device to determine, based on the third DCI, not to drop the scheduled transmission in response to the second uplink TCI states not comprising the first uplink TCI state.

17. The wireless device of claim 16, wherein the second DCI indicates a downlink TCI state for the first CI.

18. The wireless device of claim 17, wherein the instructions, when executed by the one or more processors, further cause the wireless device to determine the uplink TCI states based on the downlink TCI state of the second DCI.

19. The wireless device of claim 18, wherein:
the downlink TCI state is a TCI state of the coreset of the first coreset pool;
the wireless device receives the second DCI via the coreset of the first coreset pool; and
the uplink TCI states are associated with the first coreset pool.

20. A system comprising:
a base station; and
a wireless device comprising:
one or more processors; and
memory storing instructions that, when executed by the one or more processors, cause the wireless device to:
receive, from the base station, one or more radio resource control (RRC) messages indicating uplink transmission configuration indicator (TCI) states associated with cancellation indications (Cis);
receive a first DCI scheduling a transmission via uplink resources and indicating a first uplink TCI state;
receive a second DCI comprising a cancellation indication (CI) indicating cancellation resources that overlaps with the uplink resources; and
drop the scheduled transmission via the uplink resources before the scheduled transmission is performed, in response to the uplink TCI states comprising the first uplink TCI state.

* * * * *